US010303525B2

(12) United States Patent
Ould-Ahmed-Vall et al.

(10) Patent No.: US 10,303,525 B2
(45) Date of Patent: May 28, 2019

(54) SYSTEMS, APPARATUSES, AND METHODS FOR DATA SPECULATION EXECUTION

(71) Applicant: Intel Corporation, Santa Clara, CA (US)

(72) Inventors: Elmoustapha Ould-Ahmed-Vall, Chandler, AZ (US); Christopher J. Hughes, Santa Clara, CA (US); Robert Valentine, Kiryat Tivon (IL); Milind B. Girkar, Sunnyvale, CA (US); Hideki Ido, Sunnyvale, CA (US); Youfeng Wu, Palo Alto, CA (US); Cheng Wang, San Ramon, CA (US)

(73) Assignee: Intel Corporation, Santa Clara, CA (US)

( * ) Notice: Subject to any disclaimer, the term of this patent is extended or adjusted under 35 U.S.C. 154(b) by 279 days.

(21) Appl. No.: 14/582,717

(22) Filed: Dec. 24, 2014

(65) Prior Publication Data
US 2016/0188382 A1 Jun. 30, 2016

(51) Int. Cl.
G06F 12/00 (2006.01)
G06F 9/52 (2006.01)
G06F 9/30 (2018.01)
G06F 9/38 (2018.01)

(52) U.S. Cl.
CPC .......... G06F 9/528 (2013.01); G06F 9/30087 (2013.01); G06F 9/30145 (2013.01); G06F 9/3834 (2013.01); G06F 9/3842 (2013.01); G06F 9/3863 (2013.01)

(58) Field of Classification Search
CPC ..... G06F 9/528; G06F 9/30145; G06F 9/3834
See application file for complete search history.

(56) References Cited

U.S. PATENT DOCUMENTS 4,864,930 A    9/1989  Runyan et al.
5,511,172 A    4/1996  Kimura et al.
5,872,047 A    2/1999  Lee et al.
5,872,947 A    2/1999  Narayan
(Continued)

FOREIGN PATENT DOCUMENTS

CN    101611380 A    12/2009
EP       0815507 B1    6/2013
(Continued)

OTHER PUBLICATIONS

Search Report from foreign counterpart Taiwan Patent Application No. 104138798, dated Nov. 14, 2016, 1 page.
(Continued)

Primary Examiner — Kalpit Parikh
(74) Attorney, Agent, or Firm — Nicholson De Vos Webster & Elliott LLP

(57) ABSTRACT

Systems, methods, and apparatuses for data speculation execution (DSX) are described. In some embodiments, a hardware apparatus for performing DSX comprises a hardware decoder to decode an instruction, the instruction to include an opcode and an operand to store a portion of a fallback address, execution hardware to execute the decoded instruction to initiate a data speculative execution (DSX) region by activating DSX tracking hardware to track speculative memory accesses and detect ordering violations in the DSX region, and storing the fallback address.

19 Claims, 41 Drawing Sheets

(56) References Cited

U.S. PATENT DOCUMENTS

| | | | |
|---|---|---|---|
| 6,128,703 | A | 10/2000 | Bourekas et al. |
| 6,279,101 | B1 | 8/2001 | Witt et al. |
| 6,629,234 | B1 | 9/2003 | Col |
| 6,640,315 | B1 | 10/2003 | Hwu et al. |
| 6,854,048 | B1 | 2/2005 | Dice |
| 6,950,925 | B1 | 9/2005 | Sander et al. |
| 7,856,537 | B2 | 12/2010 | Kumar et al. |
| 8,689,221 | B2 | 4/2014 | Gooding et al. |
| 9,262,206 | B2 | 2/2016 | Cain, III et al. |
| 9,454,370 | B2 | 9/2016 | Greiner et al. |
| 2004/0049657 | A1* | 3/2004 | Kling ............... G06F 9/30138 712/208 |
| 2004/0162948 | A1 | 8/2004 | Tremblay et al. |
| 2004/0163082 | A1 | 8/2004 | Tremblay et al. |
| 2004/0230960 | A1 | 11/2004 | Nair et al. |
| 2005/0204119 | A1 | 9/2005 | Saha |
| 2005/0210224 | A1 | 9/2005 | Col et al. |
| 2007/0006195 | A1 | 1/2007 | Braun et al. |
| 2007/0118696 | A1 | 5/2007 | McCauley et al. |
| 2008/0184011 | A1 | 7/2008 | Busck et al. |
| 2008/0263280 | A1 | 10/2008 | Gara et al. |
| 2009/0187740 | A1 | 7/2009 | Greenhalgh et al. |
| 2009/0288075 | A1 | 11/2009 | Song et al. |
| 2010/0023703 | A1 | 1/2010 | Christie et al. |
| 2010/0095091 | A1 | 4/2010 | Asanaka |
| 2011/0029490 | A1 | 2/2011 | Agarwal et al. |
| 2012/0079245 | A1 | 3/2012 | Wang et al. |
| 2012/0227045 | A1 | 9/2012 | Knauth et al. |
| 2013/0205119 | A1 | 8/2013 | Rajwar et al. |
| 2013/0275715 | A1 | 10/2013 | Caprioli et al. |
| 2013/0339615 | A1 | 12/2013 | Alexander et al. |
| 2013/0339711 | A1 | 12/2013 | Kosarev et al. |
| 2013/0339960 | A1 | 12/2013 | Greiner et al. |
| 2014/0040551 | A1 | 2/2014 | Blainey et al. |
| 2014/0059333 | A1 | 2/2014 | Dixon et al. |
| 2014/0115305 | A1 | 4/2014 | Johnson et al. |
| 2015/0032998 | A1* | 1/2015 | Rajwar ............... G06F 9/30145 712/208 |
| 2016/0188328 | A1 | 6/2016 | Ould-Ahmed-Vall et al. |
| 2016/0188329 | A1 | 6/2016 | Ould-Ahmed-Vall et al. |
| 2016/0188330 | A1 | 6/2016 | Ould-Ahmed-Vall et al. |
| 2016/0188342 | A1 | 6/2016 | Ould-Ahmed-Vall et al. |
| 2016/0188343 | A1 | 6/2016 | Ould-Ahmed-Vall et al. |
| 2016/0357556 | A1 | 12/2016 | Ould-Ahmed-Vall et al. |

FOREIGN PATENT DOCUMENTS

| | | | |
|---|---|---|---|
| TW | 200506715 | A | 2/2005 |
| TW | I231450 | B | 4/2005 |
| TW | I305323 | B | 1/2009 |
| TW | 201218080 | A | 5/2012 |
| TW | 201403473 | A | 1/2014 |
| TW | 201423584 | A | 6/2014 |
| WO | 03093983 | A1 | 11/2003 |
| WO | 2013115818 | A1 | 8/2013 |

OTHER PUBLICATIONS

Advanced Micro Devices, "Advanced Synchronization Facility: Proposed Architectural Specification", 2009, 43 pages.
Chung et al., "ASF: AMD64 Extension for Lock-free Data Structures and Transactional Memory", IEEE, 2010, 12 pages.
Intel 64 and IA-32 Architectures Software Developer's Manual, Intel, Sep. 2013, pp. 4-554 to 4-567.
Intel "Intel® 64 and IA-32 Architectures Software Developer's Manual," Combined vols. 1, 2A, 2B, 2C, 2D, 3A, 3B, 3C and 3D, Chapter 16, Programming with Intel® Transactional Synchronization Extensions, Sep. 2016, vol. (1), pp. 16-1 to 16-8.
International Search Report and Written Opinion for Application No. PCT/US2015/062249, dated Mar. 8, 2016,11 pages.
International Search Report and Written Opinion for Application No. PCT/US2015/062255, dated Apr. 26, 2016, 13 pages.
International Search Report and Written Opinion for Application No. PCT/US2015/062257, dated Apr. 26, 2016, 11 pages.
International Search Report and Written Opinion for Application No. PCT/US2015/062259, dated Apr. 22, 2016, 9 pages.
International Search Report and Written Opinion for Application No. PCT/US2015/062293, dated Mar. 7, 2016, 12 pages.
International Search Report and Written Opinion for Application No. PCT/US2015/062299, dated Mar. 8, 2016, 12 pages.
International Search Report and Written Opinion for Application No. PCT/US2015/062301, dated Apr. 26, 2016, 11 pages.
International Search Report and Written Opinion for Application No. PCT/US2015/062303, dated Mar. 9, 2016, 10 pages.
Jacobi et al., "Transactional Memory Architecture and Implementation for the IBM System z", IEEE, 2012, pp. 25-36.
McDonald A., et al., "Architectural Semantics for Practical Transactional Memory," IEEE, 2006, 12 pages.
Non-Final Office Action from U.S. Appl. No. 14/582,776 dated Dec. 1, 2016, 9 pages.
Non-Final Office Action from U.S. Appl. No. 14/582,820 dated Dec. 14, 2016, 7 pages.
Non-Final Office Action from U.S. Appl. No. 14/582,878 dated Dec. 29, 2016, 6 pages.
Non-Final Office Action from U.S. Appl. No. 14/582,897 dated Dec. 14, 2016, 7 pages.
Notice of Allownace and Search Report from foreign counterpart Taiwan Patent Application No. 104138793, dated Nov. 18, 2016, 4 pages. (translation available only for Search Report).
Notice of Allownace and Search Report from foreign counterpart Taiwan Patent Application No. 104138797, dated Oct. 28, 2016, 4 pages. (translation available only for Search Report).
Office Action and Search Report from foreign counterpart Taiwan Patent Application No. 104138790, dated Jan. 24, 2017, 10 pages.
Office Action and Search Report from foreign counterpart Taiwan Patent Application No. 104138799, dated Aug. 22, 2016, 7 pages.
Office Action and Search Report from foreign counterpart Taiwan Patent Application No. 104138800, dated Jan. 24, 2017, 6 pages.
Rajwar R., et al., "Intel® Transactional Synchronization Extensions," IDF2012 Intel Developer forum, ARCS004, 2012, 40 pages.
Restriction Requirement from U.S. Appl. No. 14/582,791, dated Feb. 1, 2017, 6 pages.
Restriction Requirement from U.S. Appl. No. 14/582,806, dated Feb. 2, 2017, 6 pages.
Abandonment from U.S. Appl. No. 14/582,820 mailed Sep. 17, 2015, 2 pages.
Decision on Rejection from foreign counterpart Taiwan Patent Application No. 104138799, dated Mar. 10, 2017, 7 pages.
Devuyst M., et al., "Runtime Parallelization of Legacy Code on a Transactional Memory System," ACM, 2011, 10 pages.
Final Office Action from U.S. Appl. No. 14/582,820, dated May 24, 2017, 9 pages.
International Preliminary Report on Patentability for Application No. PCT/US2015/062249, dated Jul. 6, 2017, 8 pages.
International Preliminary Report on Patentability for Application No. PCT/US2015/062255, dated Jul. 6, 2017, 9 pages.
International Preliminary Report on Patentability for Application No. PCT/US2015/062257, dated Jul. 6, 2017, 8 pages.
International Preliminary Report on Patentability for Application No. PCT/US2015/062259, dated Jul. 6, 2017, 6 pages.
International Preliminary Report on Patentability for Application No. PCT/US2015/062293, dated Jul. 6, 2017, 8 pages.
International Preliminary Report on Patentability for Application No. PCT/US2015/062299, dated Jul. 6, 2017, 9 pages.
International Preliminary Report on Patentability for Application No. PCT/US2015/062301, dated Jul. 6, 2017, 8 pages.
International Preliminary Report on Patentability for Application No. PCT/US2015/062303, dated Jul. 6, 2017, 7 pages.
Non-Final Office Action from U.S. Appl. No. 14/582,791, dated Jun. 7, 2017, 7 pages.
Non-Final Office Action from U.S. Appl. No. 14/582,806, dated Jun. 6, 2017, 7 pages.
Notice of Allowance and Search Report from foreign counterpart Taiwan Patent Application No. 104138798, dated Nov. 18, 2016, 4 pages. (translation available only for Search Report).

(56) References Cited

OTHER PUBLICATIONS

Notice of Allowance from U.S. Appl. No. 14/582,776, dated Jun. 29, 2017, 6 pages.
Notice of Allowance from U.S. Appl. No. 14/582,878, dated Jul. 7, 2017, 14 pages.
Notice of Allowance from U.S. Appl. No. 14/582,897, dated May 25, 2017, 5 pages.
Office Action and Search Report from foreign counterpart Taiwan Patent Application No. 104138794, dated Mar. 22, 2017, 14 pages.
Office Action and Search Report from foreign counterpart Taiwan Patent Application No. 104138795, dated May 25, 2017, 11 pages.
Office Action from foreign counterpart Taiwan Patent Application No. 104138794, dated Sep. 30, 2017, 15 pages.
Notice of Allowance from U.S. Appl. No. 14/582,791, dated Jan. 19, 2018, 8 pages.
Notice of Allowance from U.S. Appl. No. 14/582,806, dated Jan. 19, 2018, 8 pages.
Office Action from foreign counterpart Taiwan Patent Application No. 104138799, dated Feb. 27, 2018, 4 pages.
Abandonment from U.S. Appl. No. 14/582,859 dated Sep. 17, 2015, 2 pages.
Extended European Search Report for Application No. 15873991.2, dated Jul. 16, 2018, 11 pages.
Extended European Search Report for Application No. 15873992.0, dated Jul. 16, 2018, 11 pages.
Office Action from foreign counterpart Taiwan Patent Application No. 104138794, dated Jul. 25, 2018, 7 pages.
Chaudhry S., et al., "Rock: A High-Performance SPARC CMT Processor," IEEE Micro, HOT Chips 20, Mar./Apr. 2009, 11 pages.
Final Office Action from U.S. Appl. No. 14/582,820, dated Jun. 26, 2018, 9 pages.
Lupon M., et al., "A Dynamically Adaptable Hardware Transactional Memory," Dec. 2010, 43rd Annual IEEE/ACM International Symposium on Microarchitecture (MICRO), 12 pages.
Non-Final Office Action from U.S. Appl. No. 14/582,820, dated Dec. 26, 2017, 8 pages.
Notice of Allowance from U.S. Appl. No. 14/582,776, dated Jan. 12, 2018, 10 pages.
Notice of Allowance from U.S. Appl. No. 14/582,878, dated Jan. 10, 2018, 11 pages.
Notice of Allowance from U.S. Appl. No. 14/582,776, dated May 8, 2018, 10 pages.
Notice of Allowance from U.S. Appl. No. 14/582,878, dated Apr. 25, 2018, 9 pages.
Zhao L., et al., "SEL-TM: Selective Eager-Lazy Management for Improved Concurrency in Transactional Memory," May 2012, IEEE 26th International Parallel and Distributed Processing Symposium, 12 pages.

* cited by examiner

| OPCODE | EXPLICIT OPERAND(S) |
|---|---|
| 701 YBEGIN | DISPLACEMENT |
| 703 YBEGIN | DSX STATUS REGISTER, DISPLACEMENT |
| 705 YBEGIN | DSX NEST COUNT REGISTER, DISPLACEMENT |
| 707 YBEGIN | DSX STATUS REGISTER, DSX NEXT COUNT REGISTER, DISPLACEMENT |
| 709 YBEGIN | DSX STATUS REGISTER, DSX NEST COUNT REGISTER, RTM STATUS REGISTER, DISPLACEMENT |

FIG. 7

```
YBEGIN DISPLACEMENT
IF (RTM_ACTIVE)
  GOTO XBEGIN
IF(DSX_NESTING_COUNT < MAX_DSX_NESTING_COUNT)
  DSX_NEST_COUNT++
IF(DSX_NEST_COUNT ==1)
  FALLBACK_IP = CALC_AND_FAULT_CHECK_IP (RIP, DISPLACEMENT)
  DSX_ACTIVE = 1
ENTER_DSX_STATE(REGISTER, MEMORY TRACKING)
FI
ELSE
YABORT
FI
```

FIG. 9

| OPCODE | EXPLICIT OPERAND(S) |
|---|---|
| 1101 YBEGIN WITH STRIDE | DISPLACEMENT, STRIDE |
| 1103 YBEGIN WITH STRIDE | DSX STATUS REGISTER, DISPLACEMENT, STRIDE |
| 1105 YBEGIN WITH STRIDE | DSX NEST COUNT REGISTER, DISPLACEMENT, STRIDE |
| 1107 YBEGIN WITH STRIDE | DSX STATUS REGISTER, DSX NEXT COUNT REGISTER, DISPLACEMENT, STRIDE |
| 1109 YBEGIN WITH STRIDE | DSX STATUS REGISTER, DSX NEST COUNT REGISTER, RTM STATUS REGISTER, DISPLACEMENT, STRIDE |

FIG. 11

| OPCODE | EXPLICIT OPERAND(S) |
|---|---|
| 1401 YCONTINUE | |
| 1403 YCONTINUE | DSX STATUS REGISTER |
| 1405 YCONTINUE | DSX NEST COUNT REGISTER |
| 1407 YCONTINUE | DSX STATUS REGISTER, DSX NEXT COUNT REGISTER |

FIG. 14

| OPCODE | EXPLICIT OPERAND(S) |
|---|---|
| 1801 YABORT | |
| 1803 YABORT | DSX STATUS REGISTER |
| 1805 YABORT | DSX STATUS REGISTER, RTM STATUS REGISTER |

FIG. 18

```
YABORT
IF(RTM_ACTIVE)
  GOTO XABORT
IF(!DSX_ACTIVE)
  NOP
ELSE
DSX_ABORT_PROCESSING
DSX_ACTIVE = 0
```

FIG. 20

| OPCODE | EXPLICIT OPERAND(S) |
|---|---|
| 2201 YTEST | |
| 2203 YTEST | DSX STATUS REGISTER |
| 2205 YTEST | FLAG REGISTER |
| 2207 YTEST | DSX STATUS REGISTER, FLAG REGISTER |

FIG. 22

```
YTEST
If (DSX_ACTIVE)
 then ZF=0
ELSE
 ZF=1
```

FIG. 23

| OPCODE | EXPLICIT OPERAND(S) |
|---|---|
| 2501 YEND | |
| 2503 YEND | DSX STATUS REGISTER |
| 2505 YEND | DSX NEST COUNT REGISTER |
| 2507 YEND | DSX STATUS REGISTER, DSX NEXT COUNT REGISTER |
| 2509 YEND | DSX STATUS REGISTER, DSX NEST COUNT REGISTER, RTM STATUS REGISTER |

FIG. 25

```
YEND
IF (RTM_ACTIVE)
GOTO XEND
IF ( ! DSX_ACTIVE)
#GP
ELSE
DSX_NEST_COUNT - -
IF (DSX_NEST_COUNT == 0 )
TRY TO COMMIT TRANSACTION
IF (FAIL)
GOTO RTM_ABORT
ELSE
DSX_ACTIVE = 0
```

FIG. 27

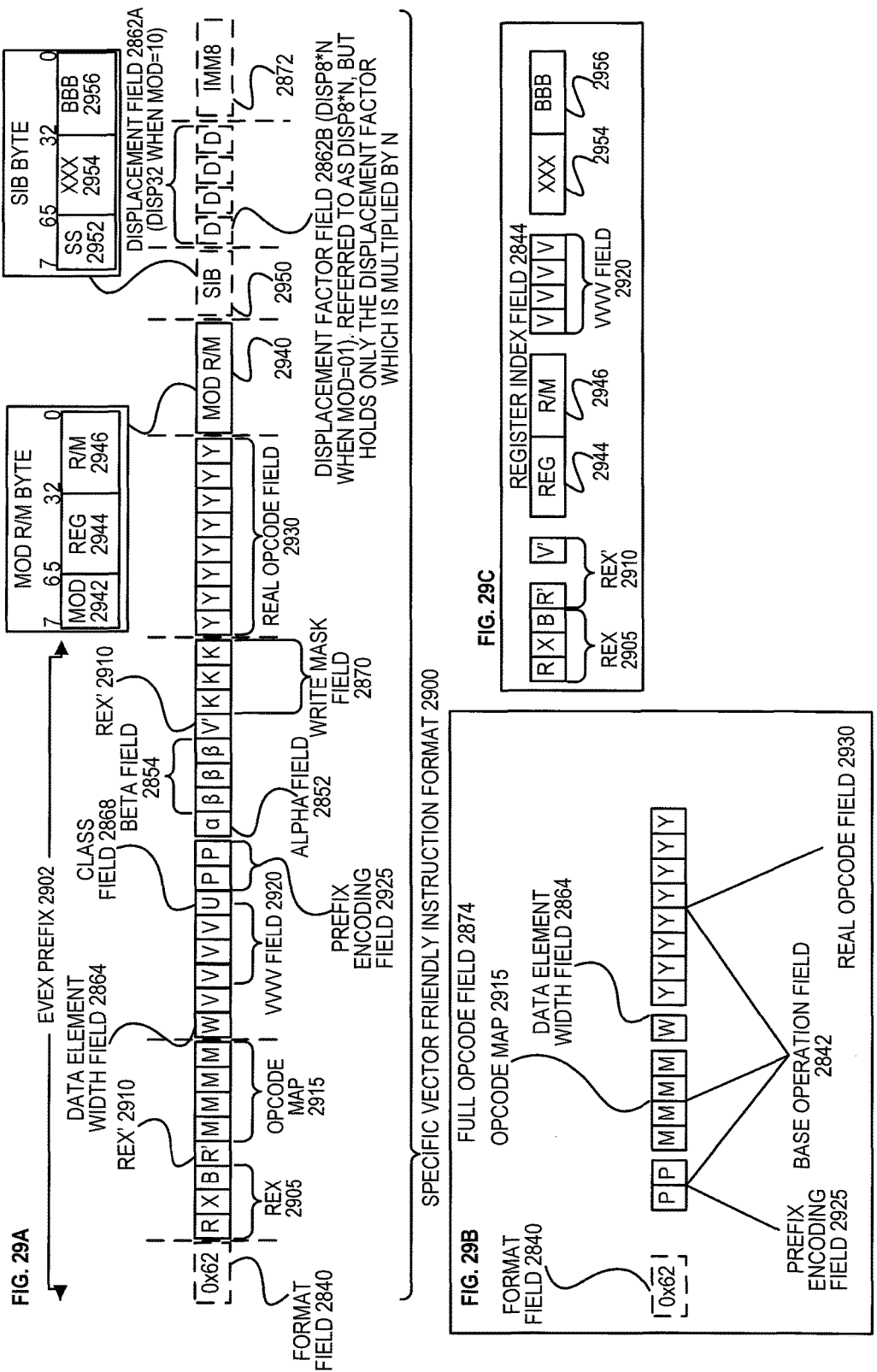

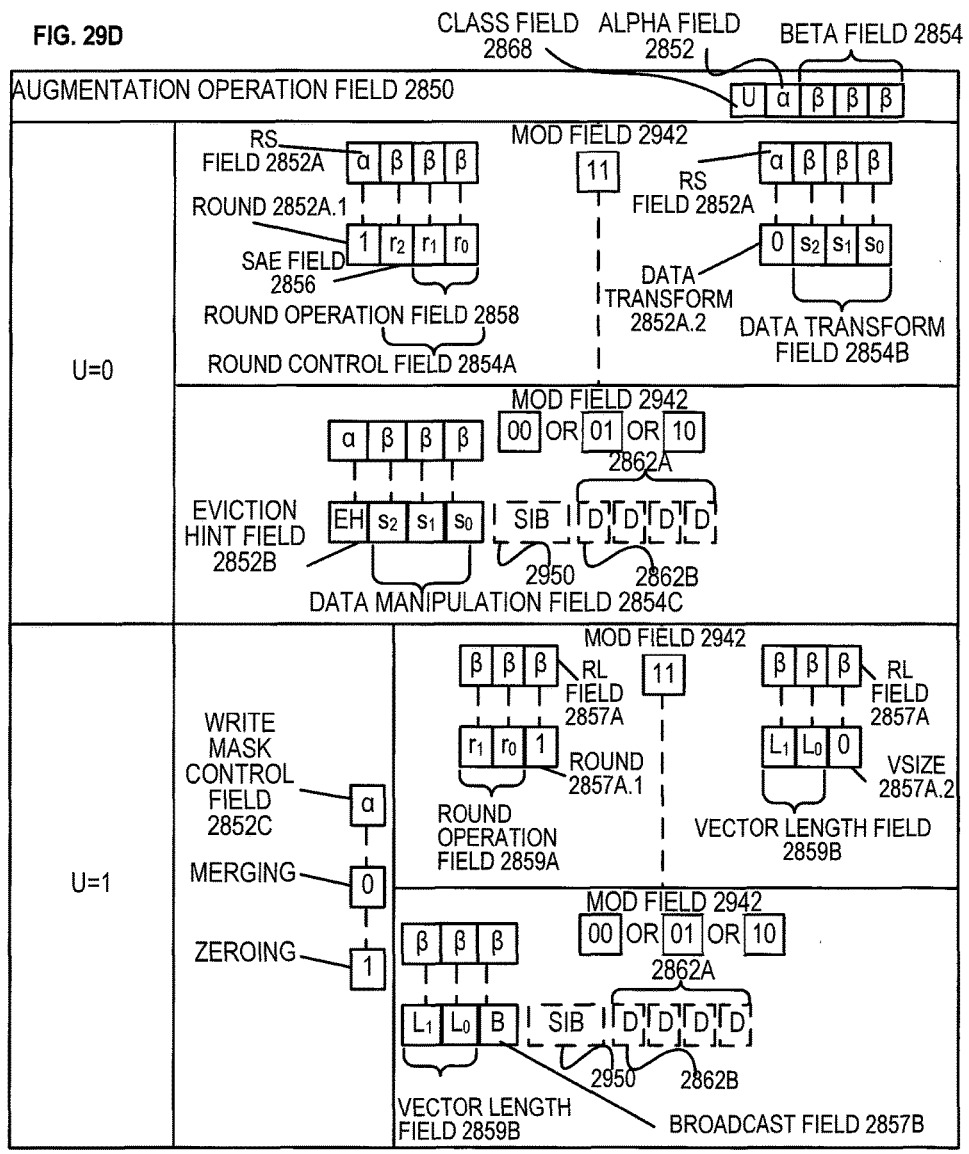

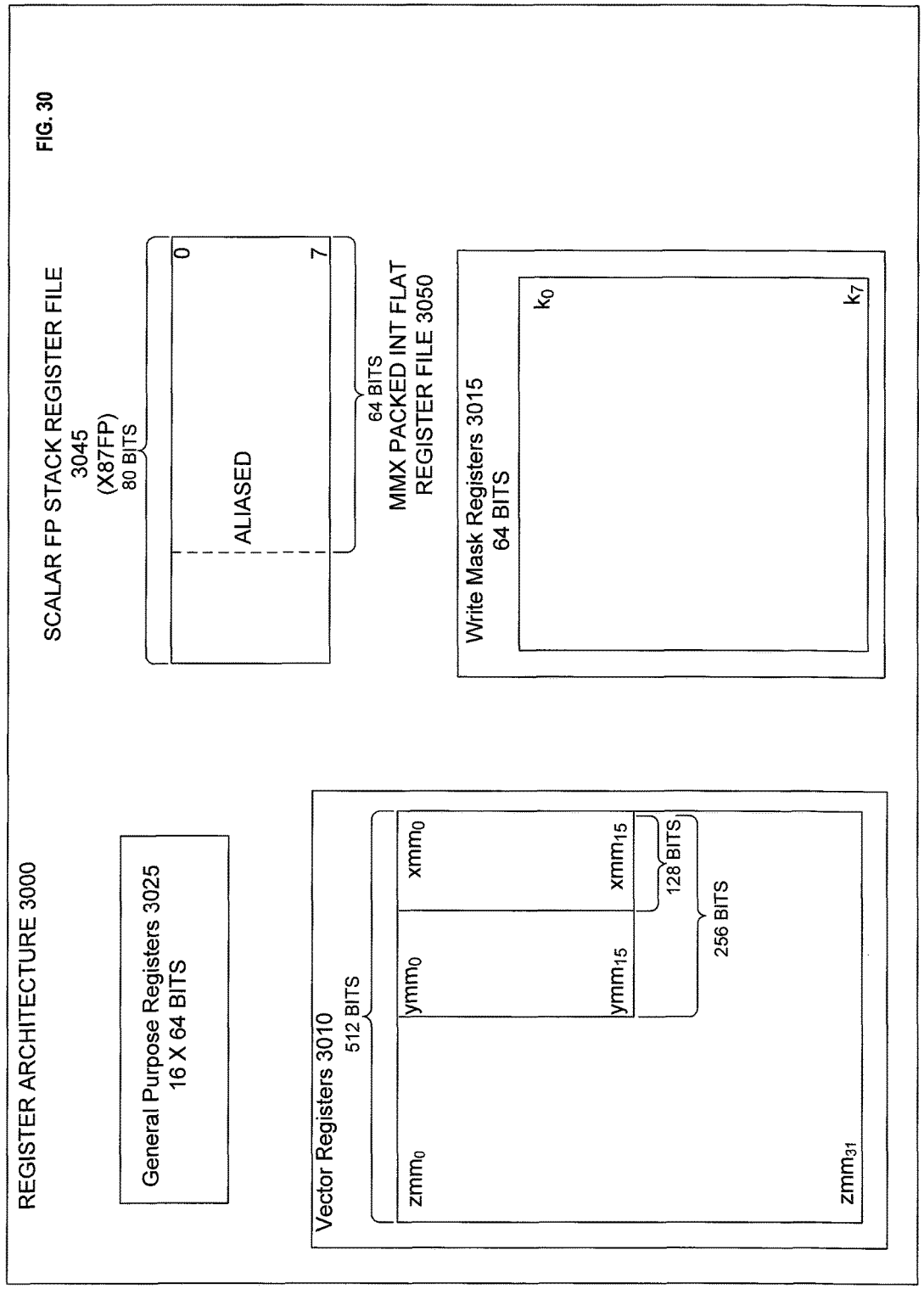

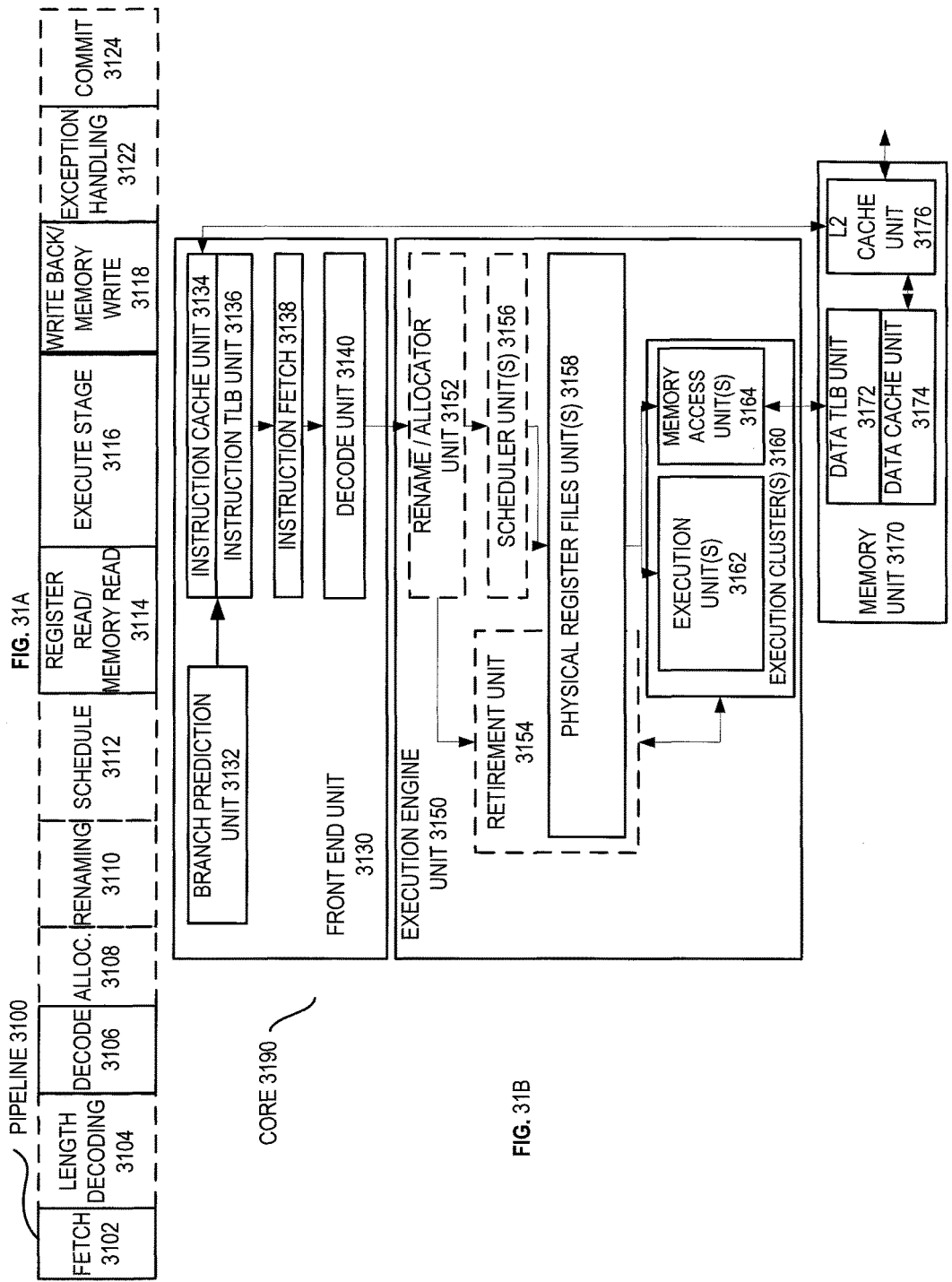

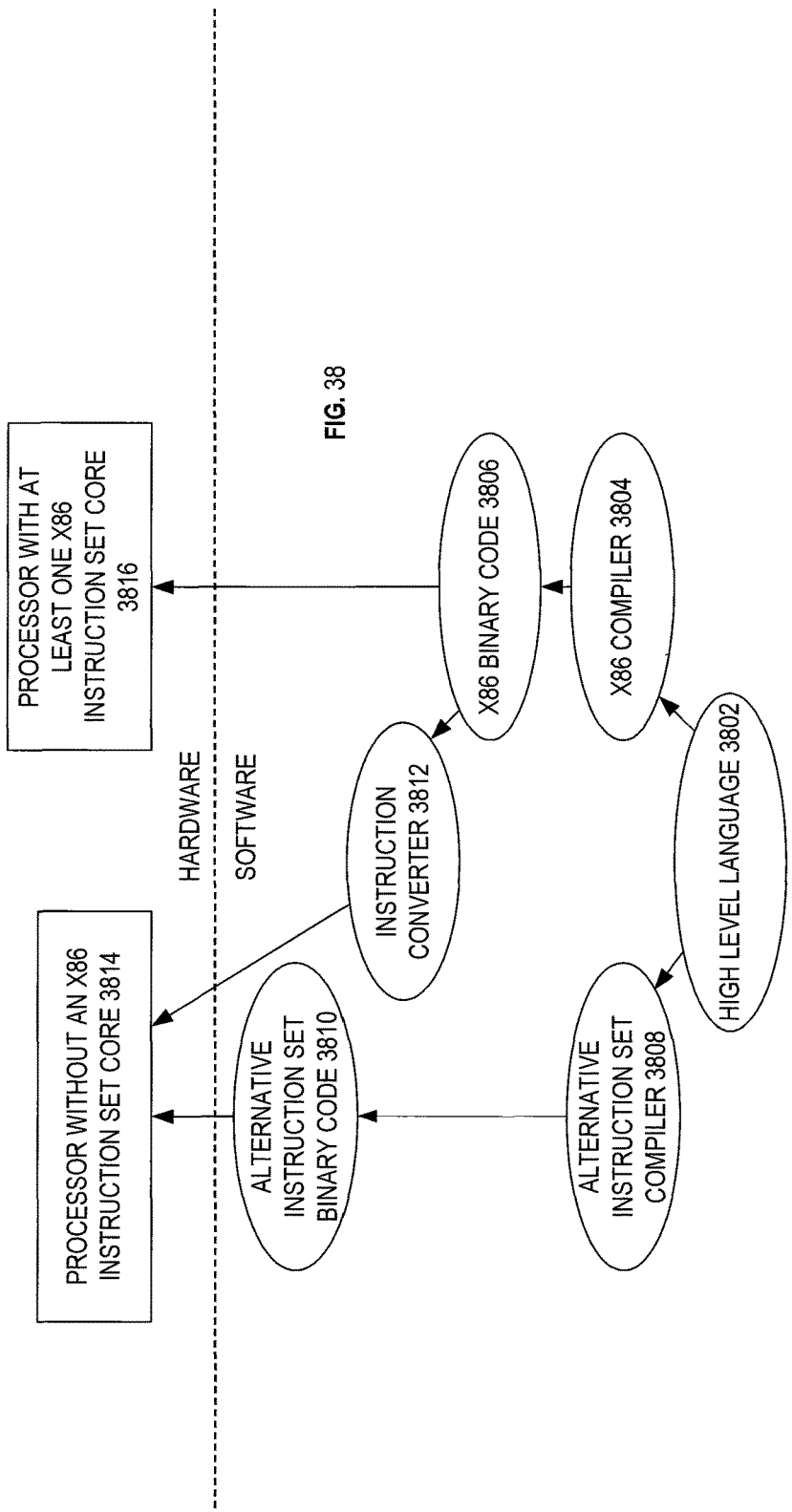

SYSTEMS, APPARATUSES, AND METHODS FOR DATA SPECULATION EXECUTION

FIELD OF INVENTION

The field of invention relates generally to computer processor architecture, and, more specifically, speculative execution.

BACKGROUND

Vectorizing loops containing possible cross-iteration dependences is notoriously difficult. An exemplary loop of this type is:

```
for (i = 0; i < N; i++) {
    A[i] = B[C[i]];
}
```

A naïve (and incorrect) vectorization of this loop would be:

```
for (i = 0; i < N; i + = SIMD_WIDTH) {
    zmm0 = vmovdqu32 &C[i]
    k1 = kxnor k1, k1
    zmm1 = vgatherdd B, zmm0, k1
    vmovdqu &A[i], zmm1
}
```

However, if the compiler generating the vectorized version of the loop has no a priori knowledge about the addresses or alignment of A, B, and C, then the above vectorization is unsafe.

BRIEF DESCRIPTION OF THE DRAWINGS

The present invention is illustrated by way of example and not limitation in the figures of the accompanying drawings, in which like references indicate similar elements and in which:

FIG. 7 illustrates some exemplary embodiments of a YBEGIN instruction format;

FIG. 9 illustrates an example of pseudo-code showing the execution of an instruction such as a YBEGIN instruction;

FIG. 11 illustrates some exemplary embodiments of a YBEGIN WITH STRIDE instruction format;

FIG. 14 illustrates some exemplary embodiments of a YCONTINUE instruction format;

FIG. 18 illustrates some exemplary embodiments of a YABORT instruction format;

FIG. 20 illustrates an example of pseudo-code showing the execution of an instruction such as a YABORT instruction;

FIG. 22 illustrates some exemplary embodiments of a YTEST instruction format;

FIG. 23 illustrates an example of pseudo-code showing the execution of an instruction such as a YTEST instruction;

FIG. 25 illustrates some exemplary embodiments of a YEND instruction format;

FIG. 27 illustrates an example of pseudo-code showing the execution of an instruction such as a YEND instruction;

FIGS. 29A-D shows a specific vector friendly instruction format 2900 that is specific in the sense that it specifies the location, size, interpretation, and order of the fields, as well as values for some of those fields.

FIG. 30 is a block diagram of a register architecture according to one embodiment of the invention;

FIGS. 31A-B are block diagrams illustrating both an exemplary in-order pipeline and an exemplary register renaming, out-of-order issue/execution pipeline according to embodiments of the invention;

FIG. 38 is a block diagram contrasting the use of a software instruction converter to convert binary instructions in a source instruction set to binary instructions in a target instruction set according to embodiments of the invention.

DETAILED DESCRIPTION

Figure 1:
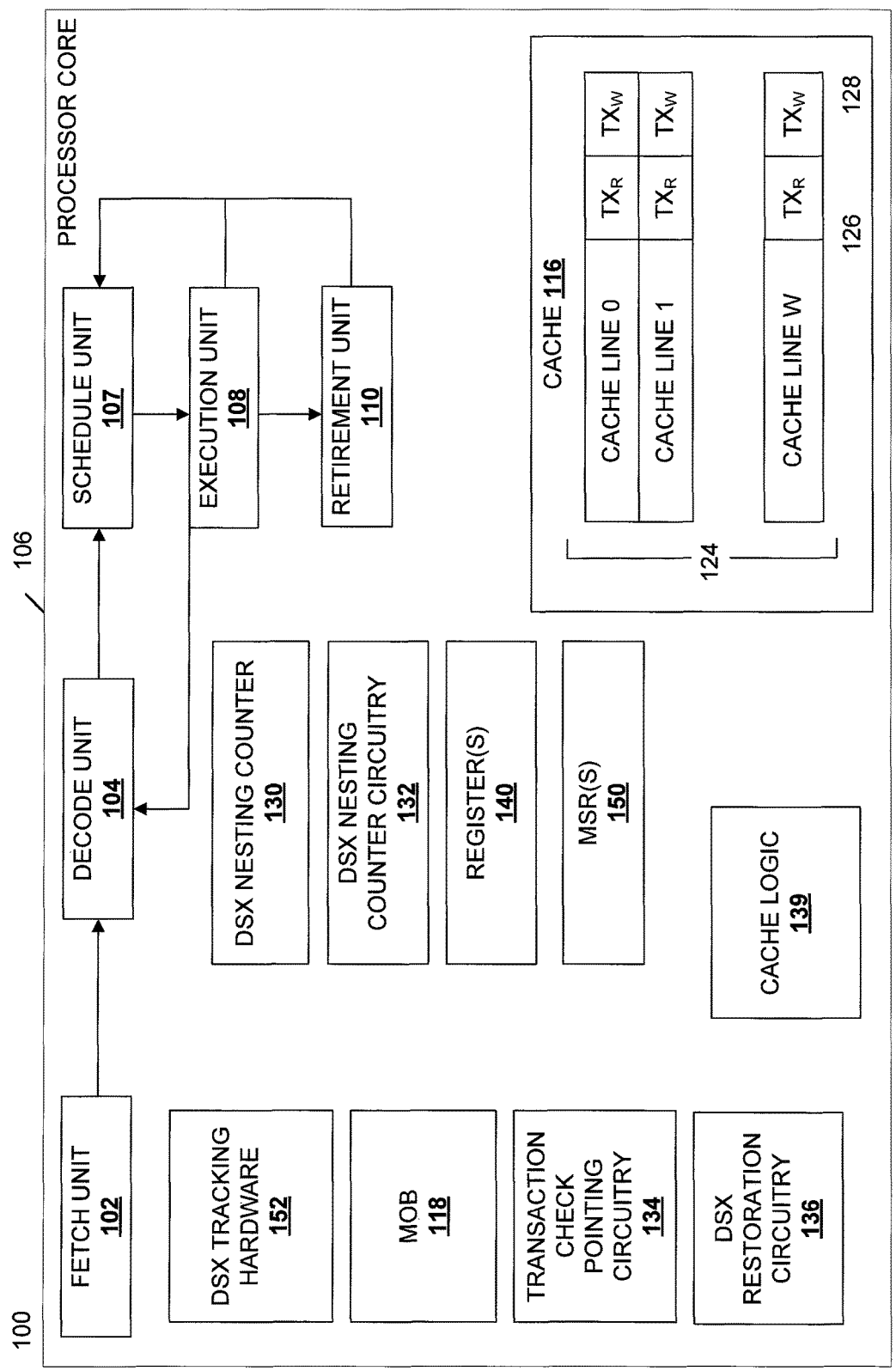
FIG. 1 is an embodiment of an exemplary block diagram of a processor core capable of executing data speculation extension (DSX) in hardware.

In the following description, numerous specific details are set forth. However, it is understood that embodiments of the invention may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Throughout this description a technique of speculative execution referred to as data speculation extension (DSX) is detailed. Included in this description is DSX hardware and new instructions that support DSX.

DSX is similar in nature to restricted transactional memory (RTM) implementations, but simpler. For example, a DSX region does not require an implied fence. Rather, normal load/store ordering rules are maintained. Moreover, the DSX region does not set any configuration in the processor forcing atomic behavior for loads, whereas in RTM, loads and stores of a transaction are treated atomically (committed upon completion of the transaction). Additionally, loads are not buffered as they are in RTM. However, stores are buffered and committed at once when speculation is no longer needed. These stores may be buffered in dedicated speculative execution storage or in shared registers or memory locations depending upon the embodiment. In some embodiments, speculative vectorization only happens on a single thread which means there is no need to protect against interferences from other threads.

In the previously detailed vectorized loop, there would need to be dynamic checks for safety. For example, an assurance that writes to A in a given vector iteration do not overlap elements in B or C that, in the scalar loop, are read in later iterations. Embodiments below detail handling vectorization cases through the use of speculation. A speculative version indicates that each loop iteration should be executed speculatively (e.g., using instructions detailed below), and that hardware should help to perform the address checks. Instead of relying on the hardware to be solely responsible for the address checks (which requires very expensive hardware), the detailed approach uses software to provide information to assist the hardware, enabling a much cheaper hardware solution without impacting execution time or placing too much burden on the programmer or compiler.

Unfortunately, with vectorization there may be an ordering violation. Looking back at the scalar loop example detailed above:

```
for (i = 0; i < N; i++) {
    A[i] = B[C[i]];
}
```

During the first four iterations of this loop, the following memory operations will occur in the following order:
Read C[0]
Read B[C[0]]
Write A[0]
Read C[1]
Read B[C[1]]
Write A[1]
Read C[2]
Read B[C[2]]
Write A[2]
Read C[3]
Read B[C[3]]
Write A[3]

The distance (in number of operations) between accesses to the same array is three and it is also the number of speculative memory instructions in the loop once it is vectorized (made into SIMD). That distance is called a "stride." It is also the number of memory instructions in the loop that will have address checks performed on them once the loop is vectorized. In some embodiments, this stride is conveyed to the address tracking hardware via a special instruction at the start of the loop (detailed below). In some embodiments, that instruction also clears the address tracking hardware.

Detailed herein are new instructions (DSX memory instructions) used in DSX in cases such as vectorized loop execution. Each DSX memory instruction (such as loads, stores, gathers, and scatters) includes an operand to be used during DSX that indicates a position within the DSX execution (e.g., a position in a loop being executed). In some embodiments, the operand is an immediate (e.g., an 8-bit immediate) with a numerical value of encoded order in the immediate. In other embodiments, the operand is a register or memory location storing a numerical value of encoded order.

Additionally, in some embodiments these instructions have a different opcode than their normal counterpart. These instructions may be scalar or superscalar (e.g., SIMD or MIMD). Examples of some of these instructions are found below where the mneumonic of the opcode includes an "S" (which is underlined below) to indicate that it is a speculative version and the imm8 is an immediate operand that is used to indicate a position of execution (e.g., a position in a loop being executed):
VMOVSDQA32 zmm1 {k1}{z}, mV, imm8//speculative SIMD load
VMOVS xmm1, m32, imm8//speculative scalar load
VSCATTERSDPS vm32z {k1}, zmm1, imm8//speculative scatter Of course, other instructions may also utilize the detailed operand and opcode mneumonic (and underlying opcode) change such as logical (AND, OR, XOR, etc.) and data manipulation (add, subtract, etc.) instructions.

In a vectorized version (assuming a SIMD width of four packed data elements) of the above scalar example, the order of memory operations is:
Read C[0], C[1], C[2], C[3]
Read B[C[0]], B[C[1]], B[C[2]], B[C[3]]
Write A[0], A[1], A[2], A[3]

This order may lead to an incorrect execution if, for example, B[C[1]] overlaps with A[0]. In the original scalar order, the read of B[C[1]] happens after the write to A[0], but in the vectorized execution it happens before.

Using speculative memory instructions for the operations in the loop that might lead to incorrect execution helps deal with this problem. As will be detailed, each speculative memory instruction notifies a DSX tracking hardware (detailed below) of its position within the loop body:

```
for (i = 0; i < N; i += SIMD_WIDTH) {
    zmm0 = vmovsdqu32 &C[i], 0 // tells address tracker this is instruction 0
    k1 = kxnor k1, k1
    zmm1 = vgathersdd B, zmm0, k1, 1 // tell address tracker this is
    instruction 1
    vmovsdqu &A[i], zmm1, 2 // tell address tracker this is instruction 2
}
```

The loop position information provided by each speculative memory operation can be combined with the stride to reconstruct the scalar memory operation. As speculative memory instructions execute, an identifier (id) is computed by the DSX hardware tracker for each element (id=sequence number+stride*element number within the SIMD operation). The hardware tracker uses the sequence number, the calculated id, and the address and size of each packed data element to determine if there was an ordering violation (i.e., if the element overlaps with another and was read or written out of order).

Unrolling the individual memory operations that comprise each vector memory instruction, accumulating the stride for each unrolling, and assigning the resulting numbers as "ids", results in:
Read C[0]//id=0
Read C[1]//id=3
Read C[2]//id=6
Read C[3]//id=9
Read B[C[0]]//id=1
Read B[C[1]]//id=4
Read B[C[2]]//id=7
Read B[C[3]]//id=10
Write A[0]//id=2
Write A[1]//id=5
Write A[2]//id=8
Write A[3]//id=11

Sorting the above individual memory operations by id will reconstruct the original scalar memory ordering.

FIG. 1 is an embodiment of an exemplary block diagram of a processor core capable of executing data speculation extension (DSX) in hardware.

The processor core 106 may include a fetch unit 102 to fetch instructions for execution by the core 106. For example, the instructions may be fetched from an L1 cache or memory. Core 106 may also include a decode unit 104 to decode the fetched instruction including those detailed below. For instance, the decode unit 104 may decode the fetched instruction into a plurality of micro-operations (micro-ops).

Additionally, the core 106 may include a schedule unit 107. Schedule unit 107 may perform various operations associated with storing decoded instructions (e.g., received from the decode unit 104) until the instructions are ready for dispatch, e.g., until all source values from operands of a decoded instruction become available. In one embodiment, schedule unit 107 may schedule and/or issue (or dispatch) decoded instructions to one or more execution units 108 for execution. Execution unit 108 may include a memory execution unit, an integer execution unit, a floating-point execution unit, or other execution units. A retirement unit 110 may retire executed instructions after they are committed. In an embodiment, retirement of the executed instructions may result in processor state being committed from the execution of the instructions, physical registers used by the instructions being de-allocated, etc.

A memory order buffer (MOB) 118 may include a load buffer, a store buffer and logic to store pending memory operations that have not been loaded or written back to a main memory. In some embodiments, the MOB 118 or circuitry similar to it, stores speculative stores (writes) of a DSX region. In various embodiments, a core may include a local cache, e.g., a private cache such as cache 116 that may include one or more cache lines 124 (e.g., cache lines 0 through W and that is managed by cache circuitry 139. In an embodiment, each line of cache 116 may include a DSX read bit 126 and/or a DSX write bit 128 for each thread executing on core 106. Bits 126 and 128 may be set or cleared to indicate (load and/or store) access to the corresponding cache line by a DSX memory access request. Note that while in the embodiment of FIG. 1 each cache line 124 is shown as having a respective bit 126 and 128, other configurations are possible. For example, a DSX read bit 126 (or DSX write bit 128) may correspond to a select portion of the cache 116, such as a cache block or other portion of the cache 116. Also, the bits 126 and/or 128 may be stored in locations other than the cache 116.

To aid in executing DSX operations, core 106 may include a DSX nest counter 130 to store a value corresponding to the number of DSX starts that have been encountered with no matching DSX end. Counter 130 may be implemented as any type of a storage device such as a hardware register or a variable stored in a memory (e.g., system memory or cache 116). Core 106 may also include a DSX nest counter circuitry 132 to update the value stored in the counter 130. Core 106 may include a DSX check pointing circuitry 134 to check point (or store) the state of various components of the core 106 and a DSX restoration circuitry 136 to restore the state of various components of the core 106, e.g., on abort of a given DSX, using a fallback address that either it stores or is stored in another location such as a register 140. Additionally, core 106 may include one or more additional registers 140 that correspond to various DSX memory access requests, such as a DSX status and control register (DSXSR) to store an indication of if a DSX is active, a DSX instruction pointer (DSXXIP) (e.g., that may be an instruction pointer to an instruction at the beginning (or immediately preceding) of the corresponding DSX), and/or a DSX stack pointer (DSXSP) (e.g., that may be a stack pointer to the head of a stack that stores various states of one or more components of core 106). These registers may also be MSRs 150.

DSX address tracking hardware 152 (sometimes simply called DSX tracking hardware) tracks speculative memory accesses and detects ordering violations in a DSX. In particular, this tracking hardware 152 includes an address tracker that takes in information to reconstruct and then enforce the original scalar memory order. Typically, the inputs are the number of speculative memory instructions in the loop body that need to be tracked, and some information for each of those instructions such as: (1) a sequence number, (2) the addresses the instruction accesses, and (3) whether the instruction incurs reads or writes to memory. If two speculative memory instructions access overlapping parts of memory, the hardware tracker 152 uses this information to determine if the original scalar order of the memory operations has been changed. If so, and if either operation is a write, the hardware triggers a mis-speculation. While FIG. 1 illustrates DSX tracking hardware 152 on its own, in some embodiments this hardware is a part of other core components.

Figure 2:
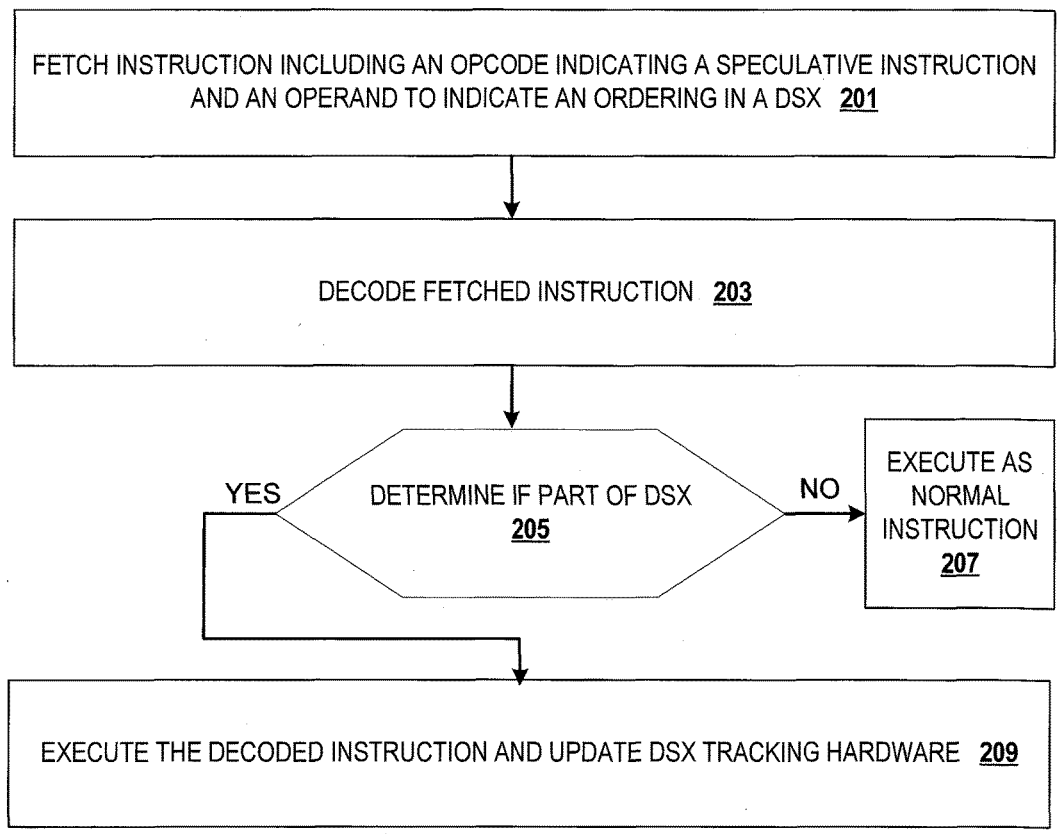
FIG. 2 illustrates an example of speculative instruction execution according to an embodiment.

FIG. 2 illustrates an example of speculative instruction execution according to an embodiment. At 201, the speculative instruction is fetched. For example, a speculative memory instruction such as those detailed above is fetched. In some embodiments, this instruction includes an opcode indicating its speculative nature and an operand to indicate an ordering in a DSX. The ordering operand may be an immediate value or a register/memory location.

The fetched speculative instruction is decoded at 203.

A determination of if the decoded speculative instruction is a part of a DSX is made at 205. For example, is a DSX indicated in the DSX status and control register (DSXSR) detailed above? When a DSX is not active, the instruction either becomes a no operation (nop) or is executed as a normal, non-speculative instruction at 207 according to an embodiment.

When a DSX is active, the speculative instruction is speculatively executed (e.g., not committed) and the DSX tracking hardware is updated at 209.

Figure 3:
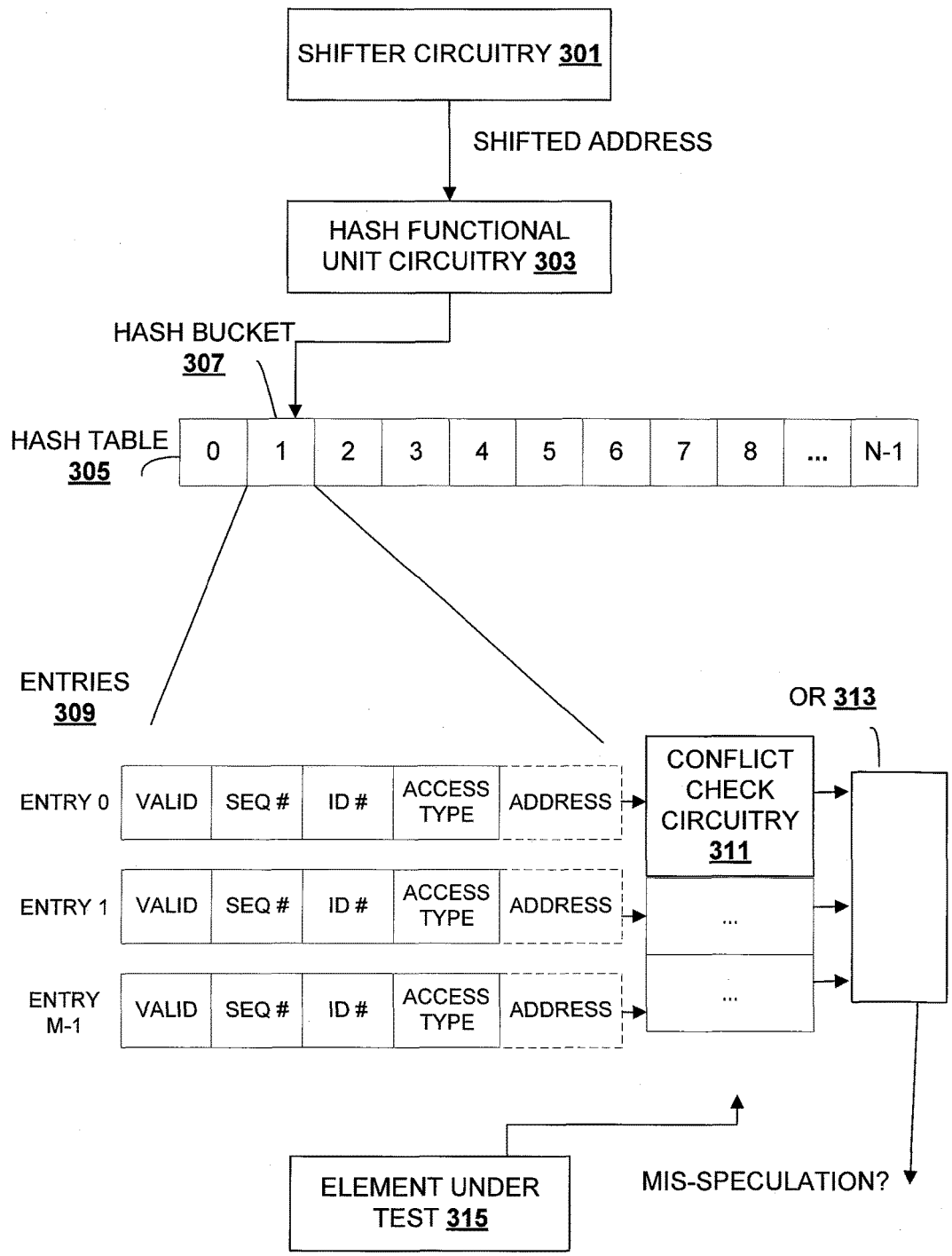
FIG. 3 illustrates a detailed embodiment of DSX tracking hardware illustrates a detailed embodiment of DSX tracking hardware.

FIG. 3 illustrates a detailed embodiment of DSX address tracking hardware. This hardware tracks speculative memory instance. Typically, an element (e.g., SIMD element) analyzed by DSX tracking hardware is broken into portions called chunks which are no more than "B" bytes in size.

Shifting circuitry 301 shifts an address (such as a starting address) of a chunk. In most embodiments, the shifting circuitry 301 performs a right shift. Typically, the right shift is by $\log_2$ B. The shifted address is subjected to a hash function performed by hash function unit circuitry 303.

The output of the hash function is an index to a hash table 305. As illustrated, the hash table 305 includes a plurality of buckets 307. In some embodiments, the hash table 305 is a Bloom filter. The hash table 305 is used to detect mis-speculation, and to record the addresses, access type, sequence numbers, and id numbers of speculatively accessed data. The hash table 305 contains N "sets" with each set containing M entries 309. Each entry 309 holds a valid bit, sequence number, id number, and access type for an element of a previously executed speculative memory instruction. In some embodiments, each entry 309 also contains a corresponding address (shown as a dashed box in the figure). Upon a DSX initiating instruction (e.g., YBEGIN and variants detailed below), all valid bits are cleared, and a "speculation active" flag is set, and on an instruction ending the DSX, the speculation active flag is cleared.

Conflict check circuitry 311 checks for a conflict per entry 309 against the element (or chunk thereof) under test 315. In some embodiments, there is a conflict when the entry 309 is valid and at least one of: i) the access type in the entry 309 is write or ii) the access type under test is write, along with one of: i) the sequence number in the entry 309 being less than the sequence number of the element under test 315, and the id number in the entry 309 being greater than the id number of the element under test 315 or ii) the sequence number in the entry 309 being greater than the sequence number of the element under test 315, and the id number in the entry 309 being less than the id number of the element under test 315.

In other words, a conflict exists when:
(Entry is valid) AND ((access type in entry=write) OR (access type under test=write)) AND (((Seq # in entry<Seq # under test) AND (id # in entry>id # under test)) OR ((Seq # in entry>Seq # under test) AND (id # in entry<id # under test)))

Note in most embodiments there is not a test for address overlap. This overlap is implied from hitting the entry in the hash table. A hit may occur where there is no address overlap, due to aliasing from the hash function and/or from the check being too coarse-grained (i.e., B being too large). However, there will be a hit when there is address overlap. So correctness is guaranteed, but there may be false positives (i.e., the hardware may detect mis-speculation where there is none). In an embodiment, the chunk address is stored in each entry 309, and an additional condition for testing for mis-speculation is applied (i.e., this is logically ANDed with the above condition) where the address in entry 309 equals the address in the element under test 315).

An OR gate 313 (or equivalent) logically ORs the results of the conflict checks. When the result of the ORing is a 1, then a mis-speculation has likely occurred and the OR gate 313 indicates that with its output.

The total storage of this embodiment is M*N entries. That means it may track up to M*N speculatively accessed data elements. In practice, however, loops are likely to have more accesses to some of the N sets than to others. If space in any set runs out, then in some embodiments a mis-speculation is triggered to guarantee correctness. Increasing M alleviates this problem, but may force more copies of the conflict checking hardware to exist. To perform all M conflict checks simultaneously (as is done in some embodiments), there are M copies of the conflict checking logic.

Choosing the B, N, M, and hash function in a certain way, allows for the structure to be organized in a very similar manner as the L1 data cache. In particular, let B be the cache line size, N be the number of sets in the L1 data cache, M be the associativity of the L1 data cache, and let the hash function be the least significant bits of the address (after the right shift). This structure will have the same number of entries and organization as the L1 data cache, which may simplify its implementation.

Finally, note that an alternative embodiment uses separate Bloom filters for reads and writes, to avoid having to store the access type information, and to avoid having to check the access type during the conflict checks. Instead, for reads, the embodiment performs conflict checks against only the "write" filter, and if there is no mis-speculation, inserts the element into the "read" filter. Similarly, for writes, the embodiment performs conflict checks against both the "read" and "write" filters, and if there is no mis-speculation, inserts the element into the "write" filter.

Figure 4:
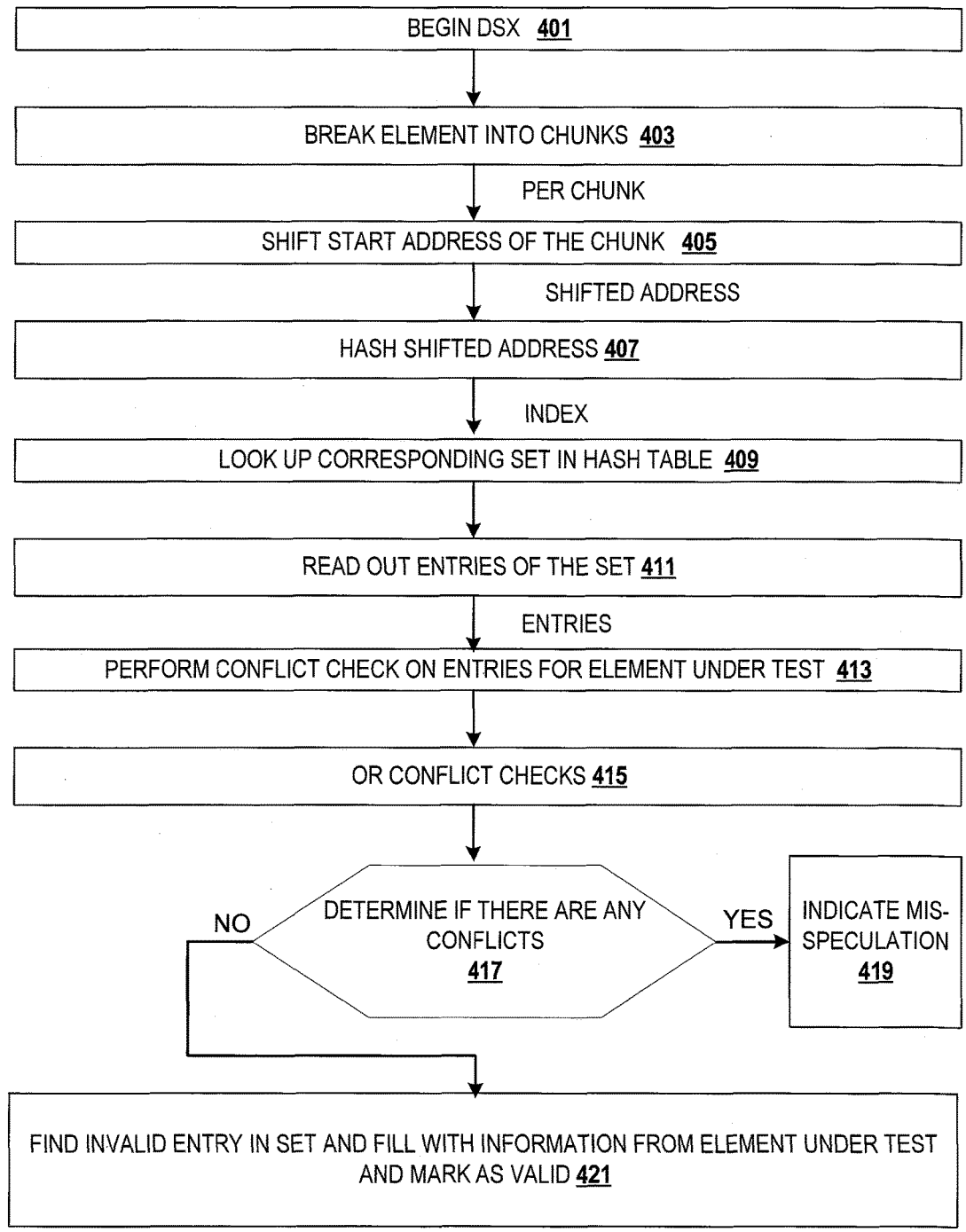
FIG. 4 illustrates an exemplary method of DSX misspeculation detection performed by DSX tracking hardware.

FIG. 4 illustrates an exemplary method of DSX mis-speculation detection performed by DSX tracking hardware. At 401, DSX is started or a previous speculative iteration is committed. For example, a YBEGIN instruction is executed. The execution of this instruction clears the valid bits in the entries 309 and sets a speculation active flag (if not already set) in a status register (such as the DSX status register detailed earlier). A speculative memory instruction is executed after the DSX is started and provides data elements under test.

At 403, the data element under test from the speculative memory instruction is broken into chunks of no more than B bytes. The hash table is accessed at a granularity of B bytes (i.e., the low bits of an address are discarded). If elements are large enough and/or are not aligned, they may cross a B byte boundary and, if so, the element is broken into multiple chunks.

Per chunk, the following (405-421) are performed. The start address of the chunk is right shifted by $\log_2$B. The shifted address is hashed at 407 to generate an index value.

Using the index value, a look-up of a corresponding set of the hash table is made at 409 and all entries of the set are read out at 411.

For each read out entry, a conflict check against the element under test (such as that described above) is performed at 413. An ORing of all of the conflict checks is performed at 415. If any check indicates a conflict at 417 (such that the OR is a 1), then an indication of mis-speculation is made at 419. The DSX is typically aborted at this time. If there is no mis-speculation, then at 421 an invalid entry in the set is found and filled with the information for the element under test and marked valid. If no invalid entries exist, a mis-speculation is triggered.

Figure 5A:
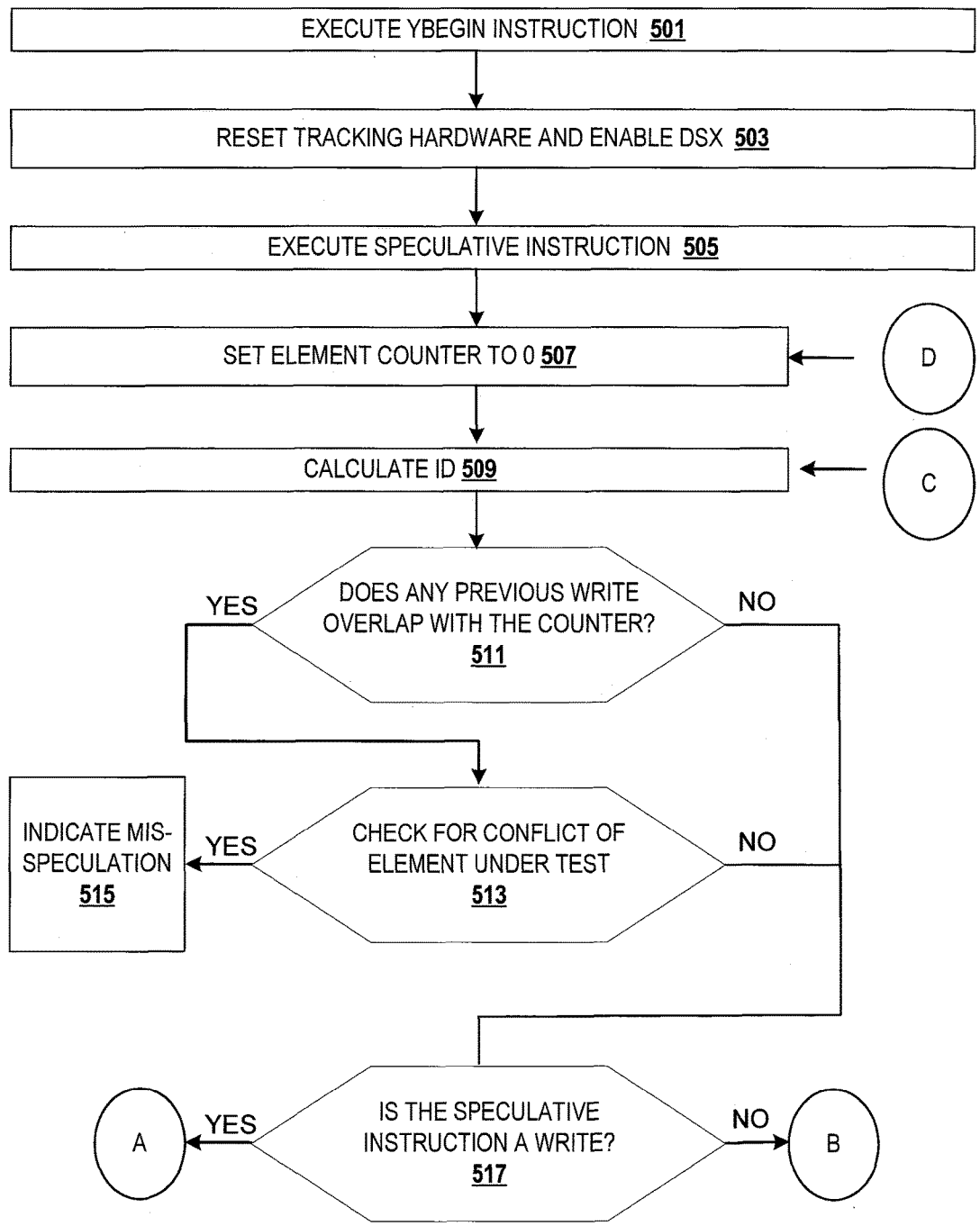
FIGS. 5(A)-(B) illustrate an exemplary method of DSX mis-speculation detection performed by DSX tracking hardware.
Figure 5B:
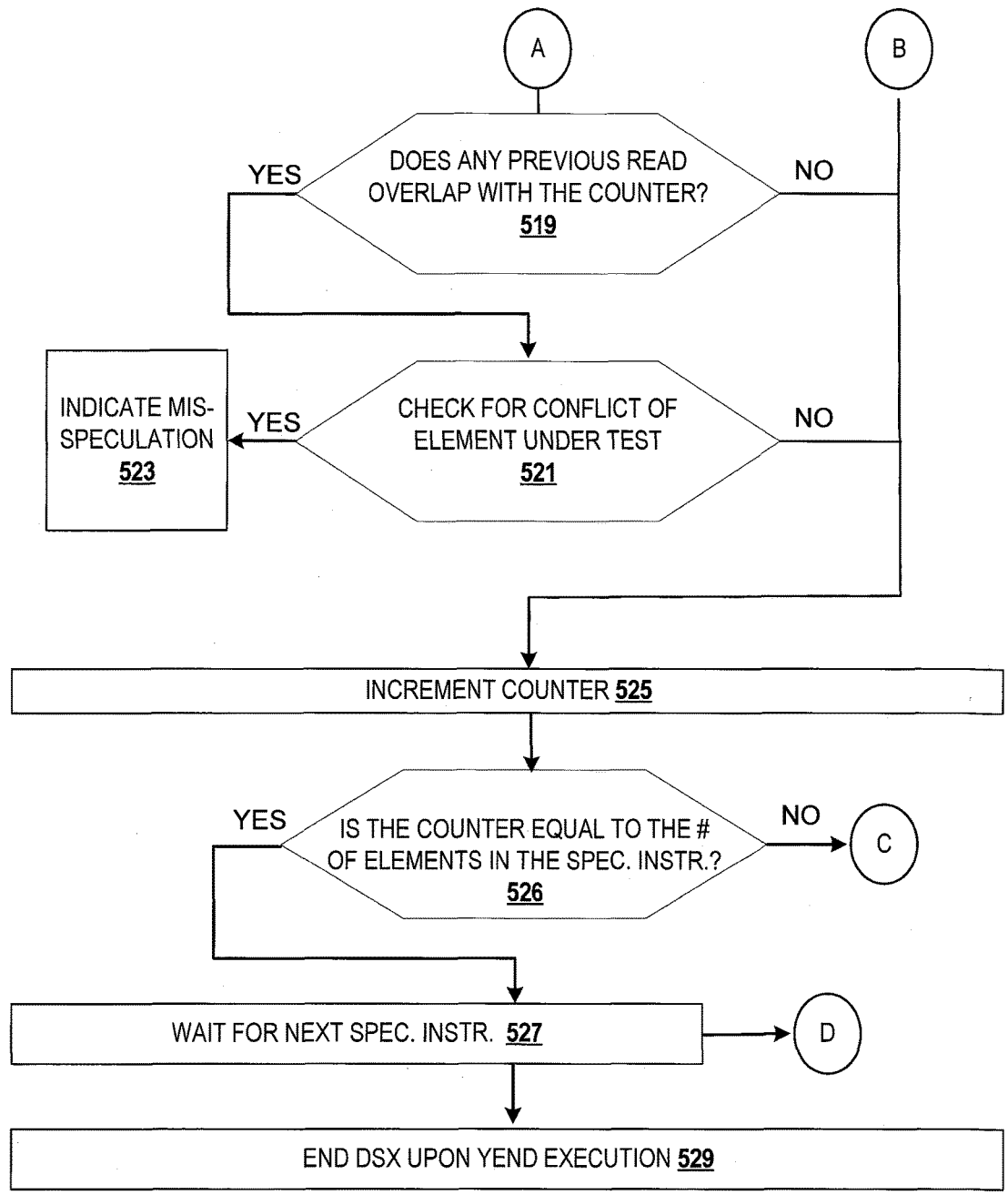

FIGS. 5(A)-(B) illustrate an exemplary method of DSX mis-speculation detection performed by DSX tracking hardware. At 501, DSX is started or a previous speculative iteration is committed. For example, a YBEGIN instruction is executed.

The execution of this instruction resets the tracking hardware by clearing the valid bits in the entries 309 and sets a speculation active flag (if not already set) in a status register (such as the DSX status register detailed earlier) at 503.

At 505, a speculative memory instruction is executed. Examples of these instructions are detailed above. A counter which is an element number under test (e) from the speculative instruction is set to zero at 507 and an id is calculated (id=sequence number+stride*e) at 509.

A determination of if any previous write overlaps with the counter value e is made at 511. This acts as a dependency check against previous stores (writes). For any overlapping writes, at 513 a conflict check is performed. In some embodiments, this conflict check is looking to see if: i) the sequence number in the entry 309 is less than the sequence number of the element under test 315, and the id number in the entry 309 is greater than the id number of the element under test 315, or ii) the sequence number in the entry 309 is greater than the sequence number of the element under test 315, and the id number in the entry 309 is less than the id number of the element under test 315.

If there is a conflict, then a mis-speculation is triggered at 515. If not, or if there were not previous writes that overlapped, then a determination of if the speculative memory instruction is a write is made at 517.

If yes, then a determination of any previous read overlaps with the counter value e is made at 519. This acts as a dependency check against previous loads (reads). For any overlapping reads, at 521 a conflict check is performed. In some embodiments, this conflict check is looking to see if i) the sequence number in the entry 309 being less than the sequence number of the element under test 315, and the id number in the entry 309 being greater than the id number of the element under test 315, or ii) the sequence number in the entry 309 being greater than the sequence number of the element under test 315, and the id number in the entry 309 being less than the id number of the element under test 315.

If there is a conflict, then a mis-speculation is triggered at 523. If not, or if there were not previous reads that overlapped, then the counter e is incremented at 525.

A determination of if the counter e is equal to the number of elements in the speculative memory instruction is made at 526. In other words, have all elements been evaluated? If no, then another id is calculated at 509. If yes, then the hardware waits for another instruction to execute at 527. When the next instruction is another speculative memory instruction, then the counter is reset at 507. When the next instruction is YBEGIN, then the hardware is reset, etc. at 503. When the next instruction is YEND, then the DSX is disabled at 529.

YBEGIN Instruction

Figure 6:
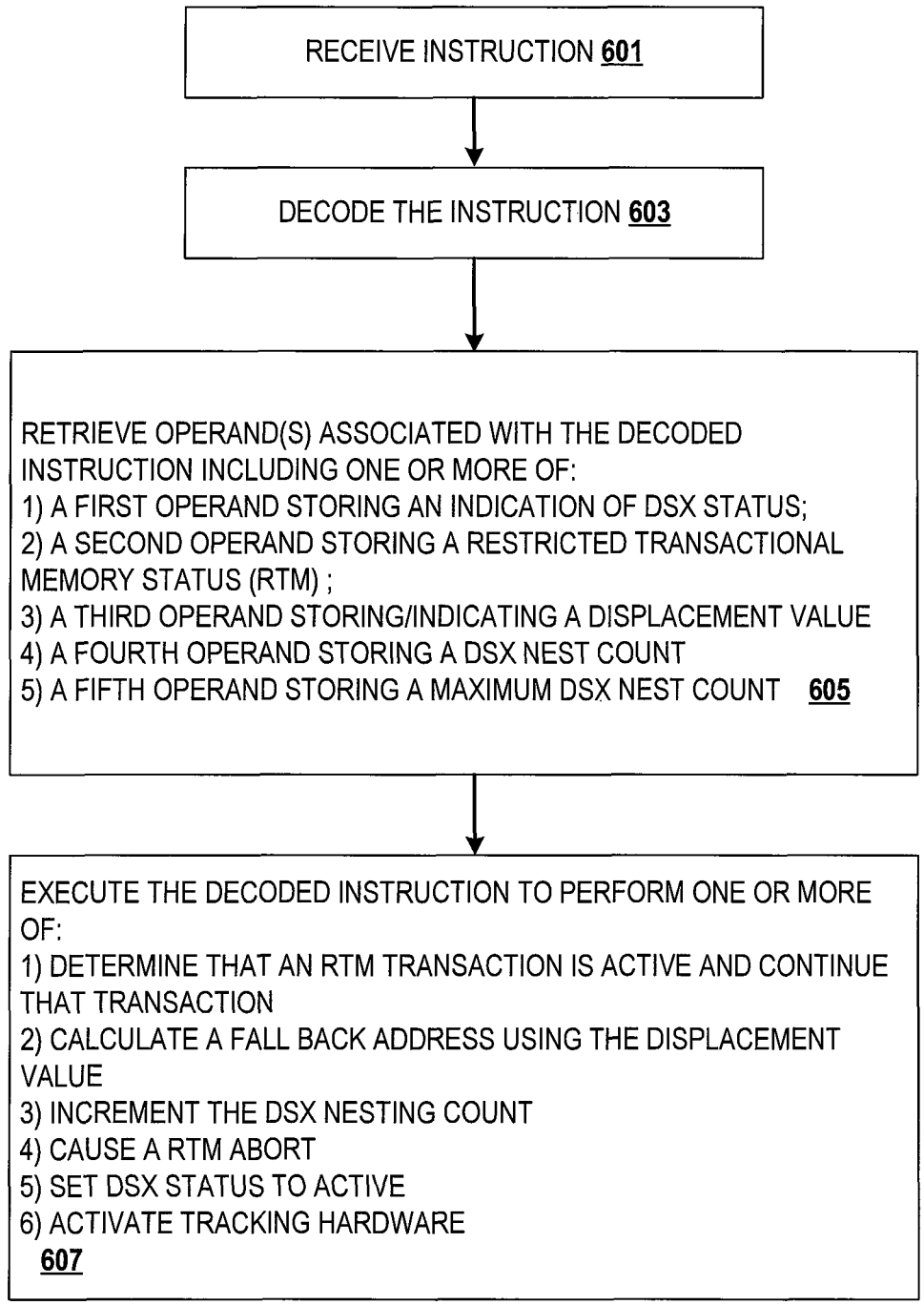
FIG. 6 illustrates an embodiment of an execution of an instruction for beginning DSX.

FIG. 6 illustrates an embodiment of an execution of an instruction for beginning DSX. As will be detailed herein, this instruction is referred to as "YBEGIN" and is used to signal the beginning of a DSX region. Of course, the instruction may be referred to by another name. In some embodiments, this execution is performed on one more hardware cores of a hardware device such as a central processing unit (CPU), graphics processing unit (GPU), accelerated processing unit (APU), digital signal processor (DSP), etc. In other embodiments, the execution of the instruction is an emulation.

At 601, a YBEGIN instruction is received/fetched. For example, the instruction is fetched from memory into an instruction cache or fetched from an instruction cache. The fetched instruction may take one of several forms as detailed below.

FIG. 7 illustrates some exemplary embodiments of a YBEGIN instruction format. In an embodiment, the YBEGIN instruction includes an opcode (YBEGIN) and a single operand to provide a displacement for a fallback address which is where program execution should go to handle a mis-speculation as shown in 701. In essence, the displacement value is a portion of the fallback address. In some embodiments, this displacement value is provided as an immediate operand. In other embodiments, this displacement value is stored in a register or memory location operand. Depending upon the YBEGIN implementation implicit operands for a DSX status register, a nesting count register, and/or a RTM status register are used. As detailed earlier, the DSX status register may be a dedicated register, a flag in a register not dedicated to DSX status (such as an overall status register like a flag register), etc.

In another embodiment, the YBEGIN instruction includes not only an opcode and displacement operand, but also an explicit operand for DSX status such as a DSX status register as shown in 703. Depending upon the YBEGIN implementation implicit operands for a nesting count register and/or a RTM status register are used. As detailed earlier, the DSX status register may be a dedicated register, a flag in a register not dedicated to DSX status (such as an overall status register like a flag register), etc.

In another embodiment, the YBEGIN instruction includes not only an opcode and displacement operand, but also an explicit operand for DSX nesting count such as a DSX nest count register as shown in 705. As detailed earlier, the DSX nest count may be a dedicated register, a flag in a register not dedicated to DSX nest count (such as an overall status register). Depending upon the YBEGIN implementation implicit operands for a DSX status register and/or a RTM status register are used. As detailed earlier, the DSX status register may be a dedicated register, a flag in a register not dedicated to DSX status (such as an overall status register like a flag register), etc.

In another embodiment, the YBEGIN instruction includes not only an opcode and displacement operand, but also explicit operands for DSX status such as a DSX status register and DSX nesting count such as a DSX nest count register as shown in 707. As detailed earlier, the DSX status register may be a dedicated register, a flag in a register not dedicated to DSX status (such as an overall status register like a flag register, etc.), and the DSX nest count may be a dedicated register, a flag in a register not dedicated to DSX nest count (such as an overall status register. Depending upon the YBEGIN implementation an implicit operand for a RTM status register is used. As detailed earlier, the DSX status register may be a dedicated register, a flag in a register not dedicated to DSX status (such as an overall status register like a flag register), etc.

In another embodiment, the YBEGIN instruction includes not only an opcode and displacement operand, but explicit operands for DSX status such as a DSX status register, DSX nesting count such as a DSX nest count register, and RTM status as shown in 709. As detailed earlier, the DSX status register may be a dedicated register, a flag in a register not dedicated to DSX status (such as an overall status register like a flag register, etc., and the DSX nest count may be a dedicated register, a flag in a register not dedicated to DSX nest count (such as an overall status register).

Of course other variants of YBEGIN are possible. For example, instead of providing a displacement value, the instruction includes the fallback address itself in either an immediate, register, or memory location.

Turning back to FIG. 6, the fetched/received YBEGIN instruction is decoded at 603. In some embodiments, the instruction is decoded by a hardware decoder such as those detailed later. In some embodiments, the instruction is decoded into micro-operations (micro-ops). For example, some CISC based machines typically use micro-operations that are derived from a macro-instruction. In other embodiments, the decoding is a part of a software routine such as a just-in-time compilation.

At 605, any operand associated with the decoded instruction is retrieved. For example, the data from one or more of a DSX register, DSX nest count register, and/or a RTM status register are retrieved.

The decoded YBEGIN instruction is executed at 607. In embodiments where the instruction is decoded into micro-ops, these micro-ops are executed. The execution of the decoded instruction causes the hardware to do one or more of the following acts to be performed: 1) determine that an RTM transaction is active and continue that transaction; 2) calculate a fallback address using the displacement value added to the instruction pointer of the YBEGIN instruction; 3) increment the DSX nesting count; 4) abort; 5) set DSX status to active; and/or 6) reset DSX tracking hardware.

Typically, upon an instance of an YBEGIN instruction, if there is not an active RTM transaction, then the DSX status is set to active, the DSX nest count is incremented (if the count is less than a max), the DSX tracking hardware is reset (for example, as detailed above), and a fallback address is calculated using the displacement value to start a DSX region. As detailed earlier, a status for a DSX is typically stored in an accessible location such as a register such as the DSX status and control register (DSXSR) discussed above with respect to FIG. 1. However, other means such as a DSX status flag in a non-dedicated control/status register (such as a FLAGS register) may be utilized. Resetting of the DSX tracking hardware was also previously described. As detailed earlier, a status for a DSX is typically stored in an accessible location such as a register such as the DSX status and control register (DSXSR) discussed above with respect to FIG. 1. However, other means such as a DSX status flag in a non-dedicated control/status register (such as a FLAGS register) may be utilized. This register may be checked by the hardware of the core to determine if a DSX was indeed taking place.

If there was some reason that the DSX cannot start, then one or more of the other potential actions takes place. For example, in some embodiments of processors that support RTM, if a RTM transaction was active then there should not have been a DSX active in the first place and the RTM is pursued. If there is something wrong with the set up of the DSX in the first place (nest count not correct), then an abort will take place. Additionally, in some embodiments, if there was no DSX then a fault is generated and no operations (a NOP) are performed. Regardless of which act is performed, in most embodiments after that act the DSX state is reset (if it was set) to indicate that there is no pending DSX.

Figure 8:
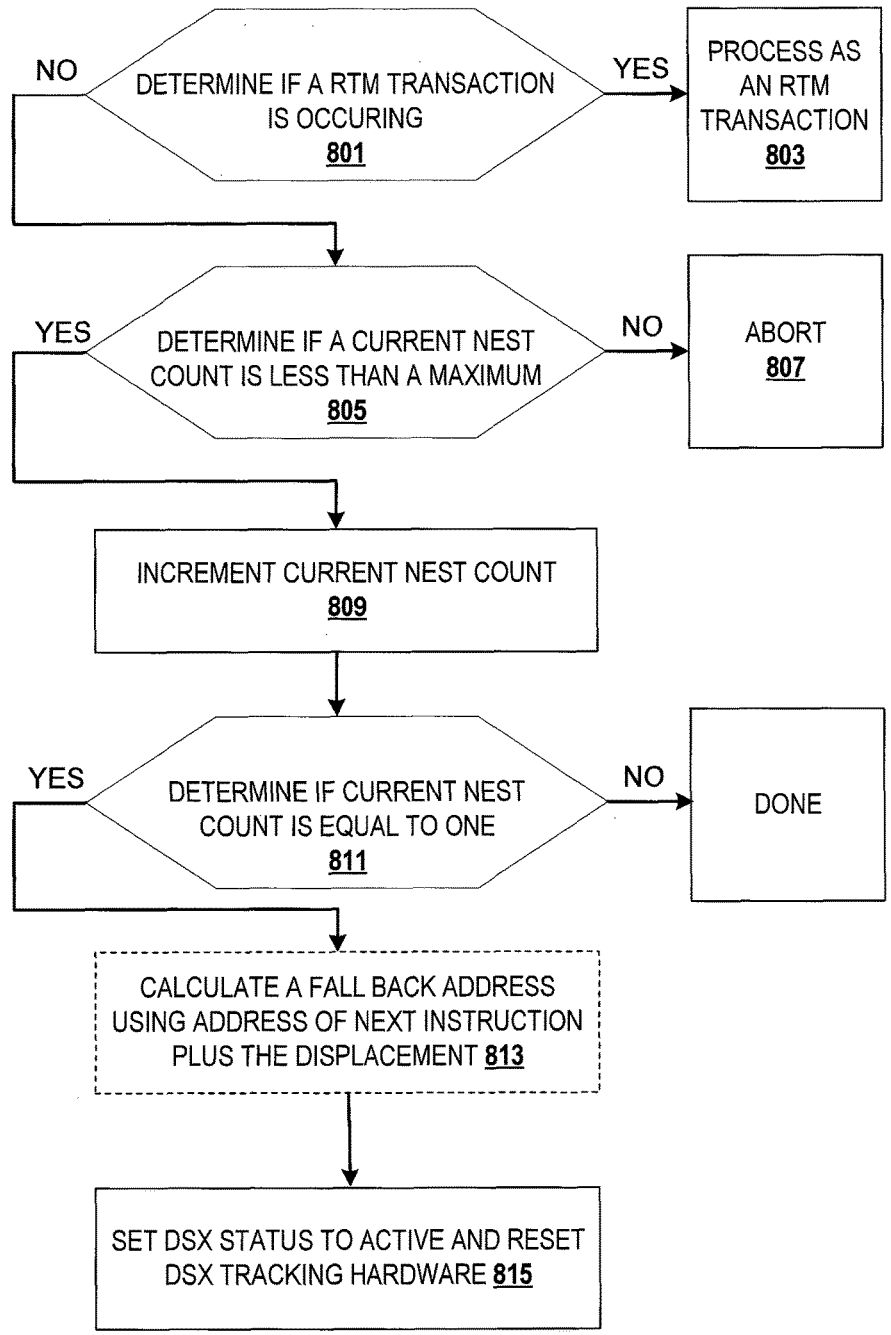
FIG. 8 illustrates a detailed embodiment of an execution of an instruction such as a YBEGIN instruction.

FIG. 8 illustrates a detailed embodiment of an execution of an instruction such as a YBEGIN instruction. For example, in some embodiments this flow is box 607 of FIG. 6. In some embodiments, this execution is performed on one more hardware cores of a hardware device such as a central processing unit (CPU), graphics processing unit (GPU), accelerated processing unit (APU), digital signal processor (DSP), etc. In other embodiments, the execution of the instruction is an emulation.

In some embodiments, for example in a processor that supports RTM transactions, a determination of if a RTM transaction is occurring is made at 801. For example, in some embodiments of processors that support RTM, if a RTM transaction was active then there should not have been a DSX active in the first place. In this instance, something went wrong in the RTM transaction and its ending procedures should be activated. Typically, RTM transaction status is stored in a register such as a RTM control and status register. The hardware of the processor evaluates the contents of this register to determine if there is an RTM transaction occurring. When there is an RTM transaction occurring, the RTM transaction continues to process at 803.

When there is not an RTM transaction occurring, or RTM is not supported, a determination of if a current DSX nest count is less than a maximum nest count is made at 805. In some embodiments, a nest count register to store the current nest count is provided by the YBEGIN instruction as an operand. Alternatively, a dedicated nest count register may exist in hardware to be used to store the current nest count. The maximum nest count is the maximum number of DSX starts (e.g., via a YBEGIN instruction) that can occur without a corresponding DSX end (e.g., via a YEND instruction).

When the current DSX nest count is greater than the maximum, an abort occurs at 807. In some embodiments, an abort triggers a rollback using restoration circuitry such as DSX restoration circuitry 135. In other embodiments, a YABORT instruction is executed as detailed below which not only performs a rollback to the fallback address, but also discards speculatively stored writes and resets the current nest count and sets the DSX status to inactive. As detailed above, DSX status is typically stored in a control register such as a DSX status and control register (DSXSR) shown in FIG. 1. However, other means such as a DSX status flag in a non-dedicated control/status register (such as a FLAGS register) may be utilized.

When the current nest count is not greater than the maximum, the current DSX nest count is incremented at 809.

A determination of if a current DSX nest count is equal to one is made at 811. When it is, in some embodiments, a fallback address is calculated by adding the displacement value provided by the YBEGIN instruction to the address of the instruction following the YBEGIN instruction at 813. In embodiments where the YBEGIN instruction provided the fallback address, then this calculation is not necessary.

At 815, the DSX status is set to active (if it needs to be) and the DSX tracking hardware is reset (for example, as detailed above). For example, as detailed earlier, a status for a DSX is typically stored in an accessible location such as a register such as the DSX status and control register (DSXSR) discussed above with respect to FIG. 1. However, other means such as a DSX status flag in a non-dedicated control/status register (such as a FLAGS register) may be utilized. This register may be checked by the hardware of the core to determine if a DSX was indeed taking place.

FIG. 9 illustrates an example of pseudo-code showing the execution of an instruction such as a YBEGIN instruction.

YBEGIN with Stride Instruction

Figure 10:
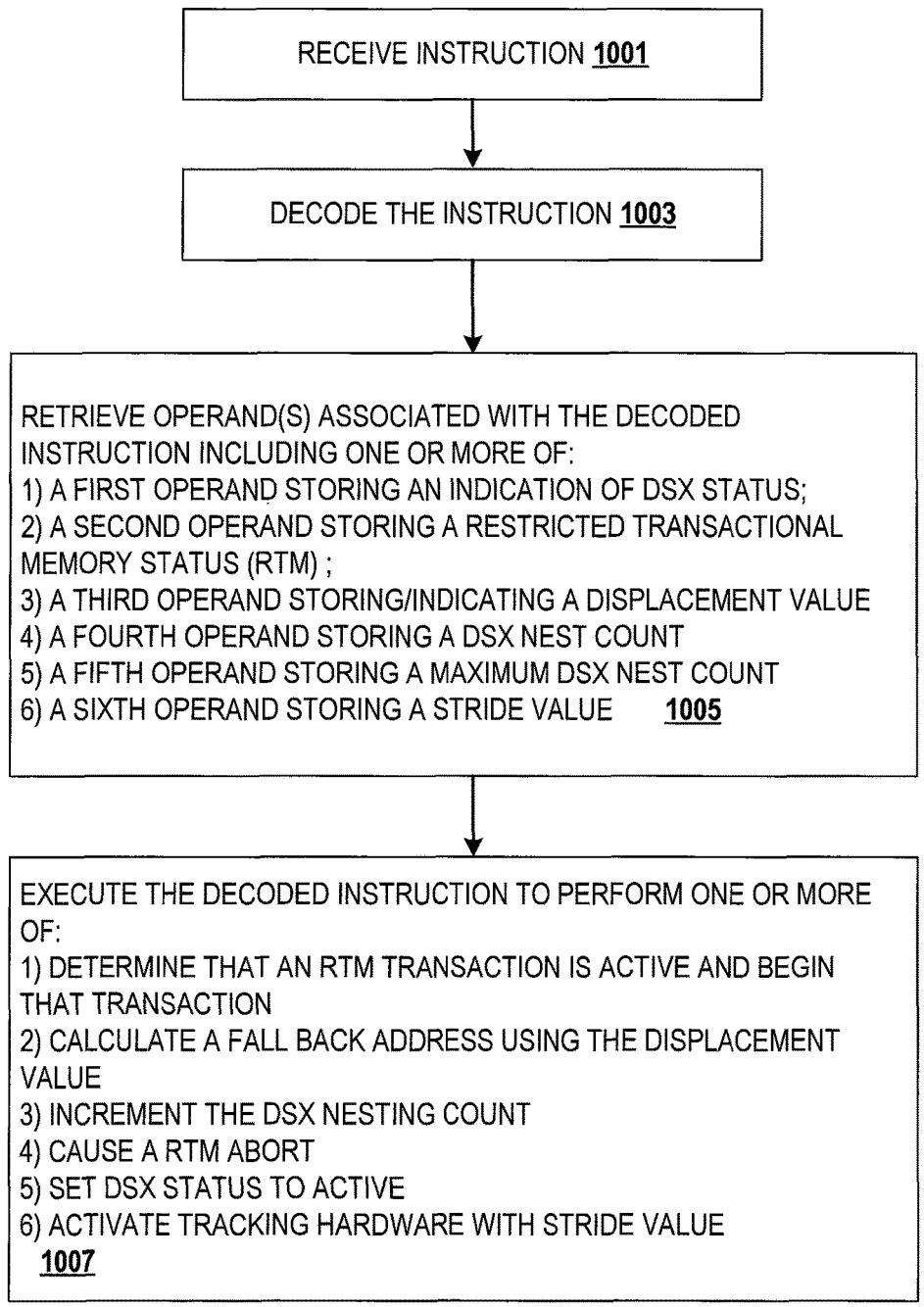
FIG. 10 illustrates an embodiment of an execution of an instruction for beginning DSX.

FIG. 10 illustrates an embodiment of an execution of an instruction for beginning DSX. As will be detailed herein, this instruction is referred to as "YBEGIN WITH STRIDE" and is used to signal the beginning of a DSX region. Of course, the instruction may be referred to by another name. In some embodiments, this execution is performed on one more hardware cores of a hardware device such as a central processing unit (CPU), graphics processing unit (GPU), accelerated processing unit (APU), digital signal processor (DSP), etc. In other embodiments, the execution of the instruction is an emulation.

At 1001, a YBEGIN WITH STRIDE instruction is received/fetched. For example, the instruction is fetched from memory into an instruction cache or fetched from an instruction cache. The fetched instruction may take one of several forms as detailed below.

FIG. 11 illustrates some exemplary embodiments of a YBEGIN WITH STRIDE instruction format. In an embodiment, the YBEGIN WITH STRIDE instruction includes an opcode (YBEGIN WITH STRIDE) and an operand to provide a displacement for a fallback address which is where program execution should go to handle a mis-speculation and a stride value operand as shown in 1101. In essence, the displacement is a portion of the fallback address. In some embodiments, the displacement is provided as an immediate operand. In other embodiments, the displacement value is stored in a register or memory location operand. In some embodiments, the stride is provided as an immediate operand. In other embodiments, the stride is stored in a register or memory location operand. Depending upon the YBEGIN WITH STRIDE implementation implicit operands for a DSX status register, a nesting count register, and/or a RTM status register are used.

In another embodiment, the YBEGIN WITH STRIDE instruction includes not only an opcode and displacement operand and a stride value operand, but also an explicit operand for DSX status such as a DSX status register as shown in 1103. In some embodiments, the displacement is provided as an immediate operand. In other embodiments, the displacement value is stored in a register or memory location operand. In some embodiments, the stride is provided as an immediate operand. In other embodiments, the stride is stored in a register or memory location operand. As detailed earlier, the DSX status register may be a dedicated register, a flag in a register not dedicated to DSX status (such as an overall status register like a flag register), etc. Depending upon the YBEGIN WITH STRIDE implementation implicit operands for a nesting count register and/or a RTM status register are used.

In another embodiment, the YBEGIN WITH STRIDE instruction includes not only an opcode, a displacement operand and a stride value operand, and a stride value operand, but also an explicit operand for DSX nesting count such as a DSX nest count register as shown in 1105. In some embodiments, the displacement is provided as an immediate operand. In other embodiments, the displacement value is stored in a register or memory location operand. In some embodiments, the stride is provided as an immediate operand. In other embodiments, the stride is stored in a register or memory location operand. As detailed earlier, the DSX nest count may be a dedicated register, a flag in a register not dedicated to DSX nest count (such as an overall status register). Depending upon the YBEGIN WITH STRIDE implementation implicit operands for a DSX status register and/or a RTM status register are used.

In another embodiment, the YBEGIN WITH STRIDE instruction includes not only an opcode, displacement operand and a stride value operand, but also explicit operands for DSX status such as a DSX status register and DSX nesting count such as a DSX nest count register as shown in 1107. In some embodiments, the displacement is provided as an immediate operand. In other embodiments, the displacement value is stored in a register or memory location operand. In some embodiments, the stride is provided as an immediate operand. In other embodiments, the stride is stored in a register or memory location operand. As detailed earlier, the DSX status register may be a dedicated register, a flag in a register not dedicated to DSX status (such as an overall status register like a flag register, etc.), and the DSX nest count may be a dedicated register, a flag in a register not dedicated to DSX nest count (such as an overall status register. Depending upon the YBEGIN WITH STRIDE implementation an implicit operand for a RTM status register are used.

In another embodiment, the YBEGIN WITH STRIDE instruction includes not only an opcode, displacement operand and a stride value operand, but explicit operands for DSX status such as a DSX status register, DSX nesting count such as a DSX nest count register, and a RTM status register as shown in 409. In some embodiments, the displacement is provided as an immediate operand. In other embodiments, the displacement value is stored in a register or memory location operand. In some embodiments, the stride is provided as an immediate operand. In other embodiments, the stride is stored in a register or memory location operand. As detailed earlier, the DSX status register may be a dedicated register, a flag in a register not dedicated to DSX status (such as an overall status register like a flag register, etc., and the DSX nest count may be a dedicated register, a flag in a register not dedicated to DSX nest count (such as an overall status register).

Of course other variants of YBEGIN WITH STRIDE are possible. For example, instead of providing a displacement value, the instruction includes the fallback address itself in either an immediate, register, or memory location.

Turning back to FIG. 10, the fetched/received YBEGIN WITH STRIDE instruction is decoded at 1003. In some embodiments, the instruction is decoded by a hardware decoder such as those detailed later. In some embodiments, the instruction is decoded into micro-operations (micro-ops). For example, some CISC based machines typically use micro-operations that are derived from a macro-instruction. In other embodiments, the decoding is a part of a software routine such as a just-in-time compilation.

At 1005, any operand associated with the decoded YBEGIN WITH STRIDE instruction is retrieved. For example, the data from one or more of a DSX register, DSX nest count register, and/or a RTM status register are retrieved.

The decoded YBEGIN WITH STRIDE instruction is executed at 1007. In embodiments where the instruction is decoded into micro-ops, these micro-ops are executed. The execution of the decoded instruction causes the hardware to do one or more of the following acts to be performed: 1) determine that an RTM transaction is active and begin that transaction; 2) calculate a fallback address using the displacement value added to the instruction pointer of the YBEGIN WITH STRIDE instruction; 3) increment the DSX nesting count; 4) abort; 5) set DSX status to active; 6) reset DSX tracking hardware; and/or 7) provides the stride value to the DSX hardware tracker.

Typically, upon a first instance of an YBEGIN WITH STRIDE instruction, if there is not an active RTM transaction, then the DSX status is set to active, the DSX tracking hardware is reset (for example, as detailed above using the provided stride value), and a fallback address is calculated using the displacement value to start a DSX region. As detailed earlier, a status for a DSX is typically stored in an accessible location such as a register such as the DSX status and control register (DSXSR) discussed above with respect to FIG. 1. However, other means such as a DSX status flag in a non-dedicated control/status register (such as a FLAGS register) may be utilized. Resetting of the DSX tracking hardware was also previously described.

Typically, upon an instance of an YBEGIN WITH STRIDE instruction, if there is not an active RTM transaction, then the DSX status is set to active, the DSX nest count is incremented (if the count is less than a max), the DSX tracking hardware is reset (for example, as detailed above using the provided stride), and a fallback address is calculated using the displacement value to start a DSX region. As detailed earlier, a status for a DSX is typically stored in an accessible location such as a register such as the DSX status and control register (DSXSR) discussed above with respect to FIG. 1. However, other means such as a DSX status flag in a non-dedicated control/status register (such as a FLAGS register) may be utilized. Resetting of the DSX tracking hardware was also previously described. As detailed earlier, a status for a DSX is typically stored in an accessible location such as a register such as the DSX status and control register (DSXSR) discussed above with respect to FIG. 1. However, other means such as a DSX status flag in a non-dedicated control/status register (such as a FLAGS register) may be utilized. This register may be checked by the hardware of the core to determine if a DSX was indeed taking place.

If there was some reason that the DSX cannot start, then one or more of the other potential actions takes place. For example, in some embodiments of processors that support RTM, if a RTM transaction was active then there should not have been a DSX active in the first place and the RTM is pursued. If there is something wrong with the set up of the DSX in the first place (nest count not correct), then an abort will take place. Additionally, in some embodiments, if there was no DSX then a fault is generated and no operations (a NOP) are performed. Regardless of which act is performed, in most embodiments after that act the DSX state is reset (if it was set) to indicate that there is no pending DSX.

Figure 12:
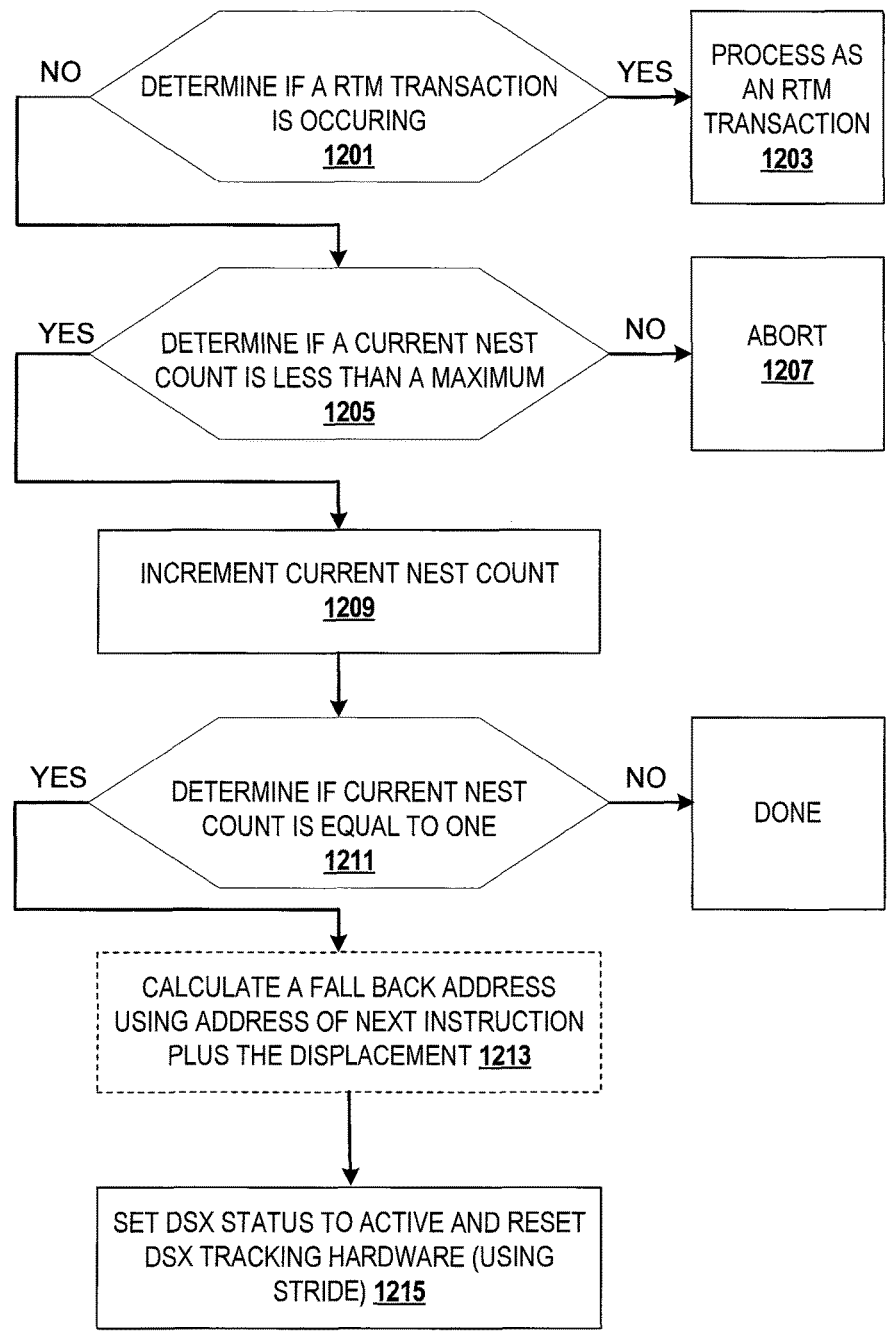
FIG. 12 illustrates a detailed embodiment of an execution of an instruction such as a YBEGIN WITH STRIDE instruction.

FIG. 12 illustrates a detailed embodiment of an execution of an instruction such as a YBEGIN WITH STRIDE instruction. For example, in some embodiments this flow is box 1007 of FIG. 10. In some embodiments, this execution is performed on one more hardware cores of a hardware device such as a central processing unit (CPU), graphics processing unit (GPU), accelerated processing unit (APU), digital signal processor (DSP), etc. In other embodiments, the execution of the instruction is an emulation.

In some embodiments, for example in a processor that supports RTM transactions, a determination of if a RTM transaction is occurring is made at 1201. For example, in some embodiments of processors that support RTM, if a RTM transaction was active then there should not have been a DSX active in the first place. In this instance, something went wrong in the RTM transaction and its ending procedures should be activated. Typically, RTM transaction status is stored in a register such as a RTM control and status register. The hardware of the processor evaluates the contents of this register to determine if there is an RTM transaction occurring. When there is an RTM transaction occurring, the RTM transaction continues to process 1203.

When there is not an RTM transaction occurring, or RTM is not supported, a determination of if a current DSX nest count is less than a maximum nest count is made at 1205. In some embodiments, a nest count register to store the current nest count is provided by the YBEGIN WITH STRIDE instruction as an operand. Alternatively, a dedicated nest count register may exist in hardware to be used to store the current nest count. The maximum nest count is the maximum number of DSX starts (e.g., via a YBEGIN instruction) that can occur without a corresponding DSX end (e.g., via a YEND instruction).

When the current nest count is greater than the maximum, an abort occurs at 1207. In some embodiments, an abort triggers a rollback. In other embodiments, a YABORT is performed as detailed below which not only performs a rollback to the fallback address, but also discards speculatively stored writes and resets the current nest count and sets the DSX status to inactive. As detailed above, DSX status is typically stored in a control register such as a DSX status and control register (DSXSR) shown in FIG. 1. However, other means such as a DSX status flag in a non-dedicated control/status register (such as a FLAGS register) may be utilized.

When the current nest count is not greater than the maximum, the current DSX nest count is incremented at 1209.

A determination of if a current DSX nest count is equal to one is made at 1211. When it is, in some embodiments, a fallback address is calculated by adding the displacement value provided by the YBEGIN WITH STRIDE instruction to the address of the instruction following the YBEGIN WITH STRIDE instruction at 1213. In embodiments where the YBEGIN WITH STRIDE instruction provided the fallback address, then this calculation is not necessary.

At 1215, the DSX status is set to active (if it needs to be) and the DSX tracking hardware is reset (for example, as detailed above including using the provided stride value). For example, as detailed earlier, a status for a DSX is typically stored in an accessible location such as a register such as the DSX status and control register (DSXSR) discussed above with respect to FIG. 1. However, other means such as a DSX status flag in a non-dedicated control/status register (such as a FLAGS register) may be utilized. This register may be checked by the hardware of the core to determine if a DSX was indeed taking place.

YCONTINUE Instruction

As a DSX comes to an end (for example, an iteration of a loop has run its course) without any issues, in some embodiments an instruction (YEND) is executed to indicate the end of a speculative region as detailed below. In short, the execution of this instruction causes the commitment of a current speculative state (all writes that have not been written) and an exit from the current speculative region as will be discussed below. Another iteration of the loop may then be started by calling for another YBEGIN.

However, in some embodiments, an optimization to this cycle of YBEGIN, YEND, YBEGIN, etc. is available through the use of a continue instruction to commit a current loop iteration when speculation is no longer needed (e.g., when there is no conflict between stores). The continue instruction also starts a new speculative loop iteration without the need for calling a YBEGIN.

Figure 13:
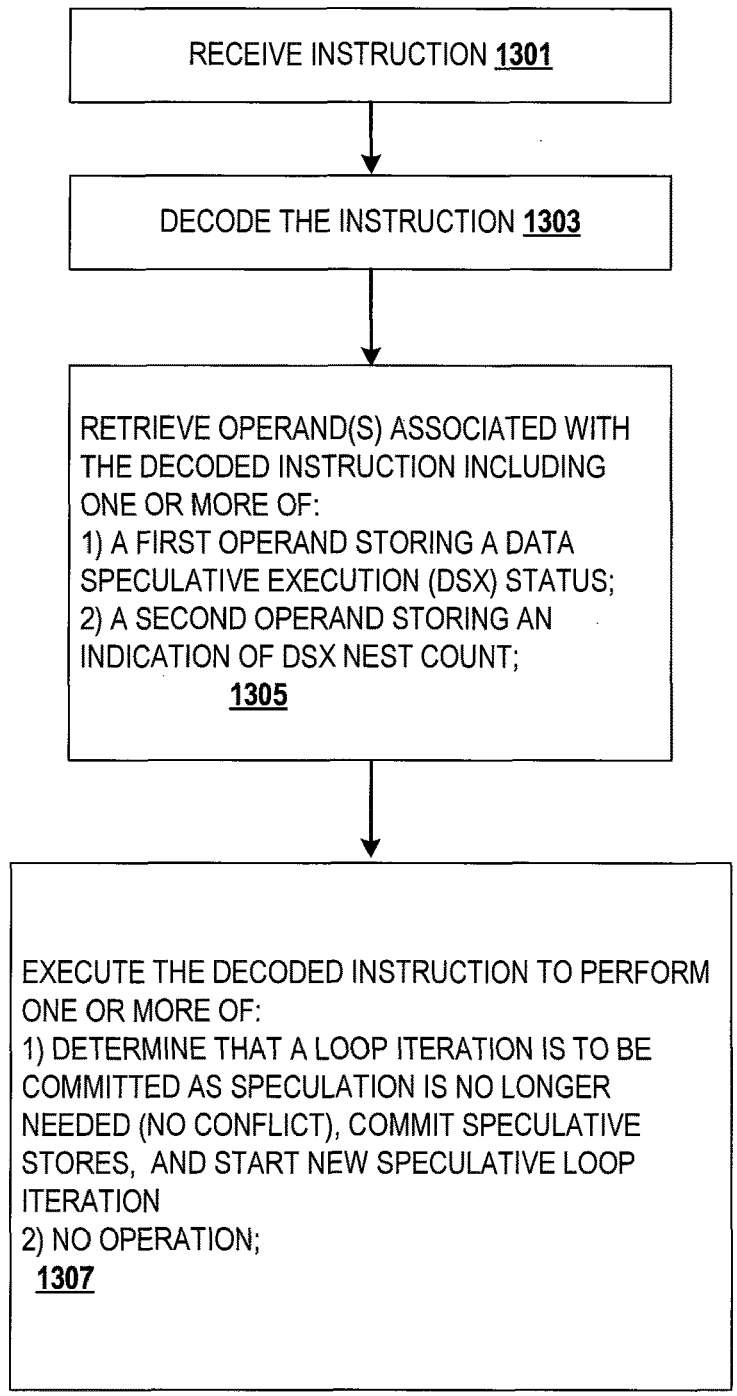
FIG. 13 illustrates an embodiment of an execution of an instruction for continuing a DSX without ending it.

FIG. 13 illustrates an embodiment of an execution of an instruction for continuing a DSX without ending it. As will be detailed herein, this instruction is referred to as "YCON- TINUE" and is used to signal the end of a transaction. Of course, the instruction may be referred to by another name.

In some embodiments, this execution is performed on one more hardware cores of a hardware device such as a central processing unit (CPU), graphics processing unit (GPU), accelerated processing unit (APU), digital signal processor (DSP), etc. In other embodiments, the execution of the instruction is an emulation.

At 1301, an YCONTINUE instruction is received/fetched. For example, the instruction is fetched from memory into an instruction cache or fetched from an instruction cache. The fetched instruction may take one of several forms.

FIG. 14 illustrates some exemplary embodiments of a YCONTINUE instruction format. In an embodiment, the YCONTINUE instruction includes an opcode (YCONTINUE), but no explicit operands as shown in 1401. Depending upon the YCONTINUE implementation implicit operands for a DSX status register and nesting count register. As detailed earlier, the DSX nest count may be a dedicated register, a flag in a register not dedicated to DSX nest count (such as an overall status register), etc. Additionally, the DSX status register may be a dedicated register, a flag in a register not dedicated to DSX status (such as an overall status register like a flag register), etc.

In another embodiment, the YCONTINUE instruction includes not only an opcode, but an explicit operand for DSX status such as a DSX status register as shown in 1403. Depending upon the YCONTINUE implementation an implicit operand for nesting count register is used. As detailed earlier, the DSX nest count may be a dedicated register, a flag in a register not dedicated to DSX nest count (such as an overall status register), etc. Additionally, the DSX status register may be a dedicated register, a flag in a register not dedicated to DSX status (such as an overall status register like a flag register), etc.

In another embodiment, the YCONTINUE instruction includes not only an opcode, but an explicit operand for DSX nesting count such as a DSX nest count register as shown in 1405. Depending upon the YCONTINUE implementation implicit operand for a DSX status register is used. As detailed earlier, the DSX nest count may be a dedicated register, a flag in a register not dedicated to DSX nest count (such as an overall status register), etc. Additionally, the DSX status register may be a dedicated register, a flag in a register not dedicated to DSX status (such as an overall status register like a flag register), etc.

In another embodiment, the YCONTINUE instruction includes not only an opcode, but an explicit operand for DSX status such as a DSX status register and DSX nesting count such as a DSX nest count register as shown in 1407. As detailed earlier, the DSX nest count may be a dedicated register, a flag in a register not dedicated to DSX nest count (such as an overall status register), etc. Additionally, the DSX status register may be a dedicated register, a flag in a register not dedicated to DSX status (such as an overall status register like a flag register), etc.

Turning back to FIG. 13, the fetched/received YCONTINUE instruction is decoded at 1303. In some embodiments, the instruction is decoded by a hardware decoder such as those detailed later. In some embodiments, the instruction is decoded into micro-operations (micro-ops). For example, some CISC based machines typically use micro-operations that are derived from a macro-instruction. In other embodiments, the decoding is a part of a software routine such as a just-in-time compilation.

At 1305, any operand associated with the decoded YCONTINUE instruction is retrieved. For example, the data from one or more of a DSX register and DSX nest count register are retrieved.

The decoded YCONTINUE instruction is executed at 1307. In embodiments where the instruction is decoded into micro-ops, these micro-ops are executed. The execution of the decoded instruction causes the hardware to do one or more of the following acts to be performed: 1) determine that make speculative writes associated with the DSX are to be committed as speculation is no longer needed and commit them, and start new speculative loop iteration (such as new DSX region); and/or 2) no operation.

The first of these acts (making speculative writes final and starting a new speculative loop iteration) may be performed by DSX checking hardware detailed earlier. In this act all of the speculative writes associated with the loop iteration of the DSX are committed (stored such that they are accessible outside of the DSX), but unlike a YEND instruction, the DSX status is not set to indicate that a DSX does not exist. For example, all writes associated with the DSX (such as stored in cache, registers, or memory) are committed such that they are finalized and visible outside of the DSX. Typically, a DSX commit will not happen unless the DSX nest count is one. Otherwise, in some embodiments, then a nop is performed.

If a DSX is not active, then a nop may be performed in some embodiments.

Figure 15:
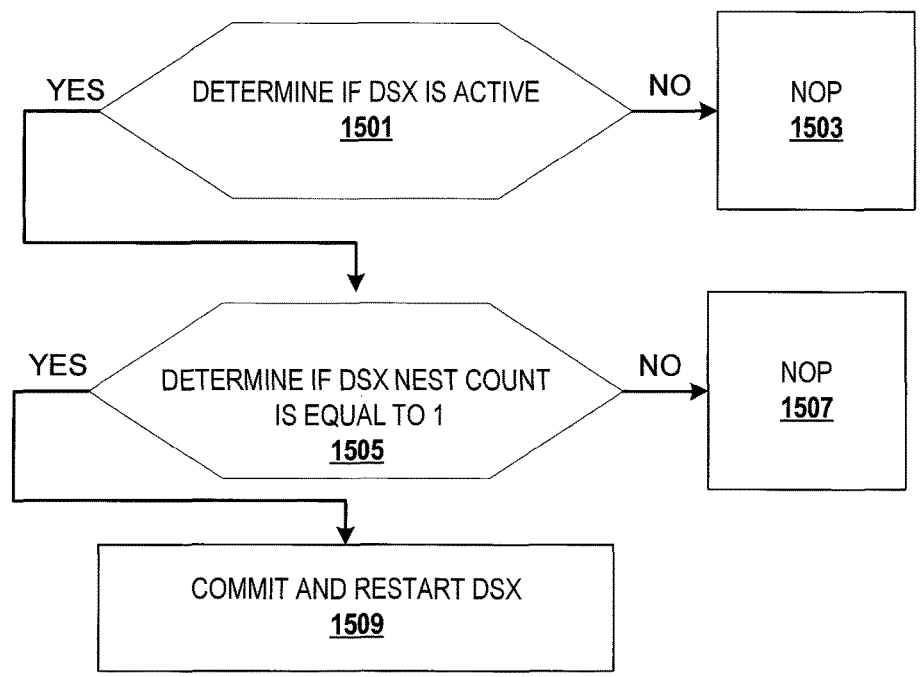
FIG. 15 illustrates a detailed embodiment of an execution of an instruction such as a YCONTINUE instruction.

FIG. 15 illustrates a detailed embodiment of an execution of an instruction such as a YCONTINUE instruction. For example, in some embodiments this flow is box 1307 of FIG. 13. In some embodiments, this execution is performed on one more hardware cores of a hardware device such as a central processing unit (CPU), graphics processing unit (GPU), accelerated processing unit (APU), digital signal processor (DSP), etc. In other embodiments, the execution of the instruction is an emulation.

A determination of if a DSX is active is made at 1501. As detailed above, DSX status is typically stored in a control register such as a DSX status and control register (DSXSR) shown in FIG. 1. However, other means such as a DSX status flag in a non-dedicated control/status register (such as a FLAGS register) may be utilized. Regardless of where the status is stored, the location is checked by the hardware of the processor to determine if a DSX was indeed taking place.

When there is not a DSX occurring, a no op is performed at 1503.

When there is a DSX occurring, a determination of if the DSX nest count is equal to one is made at 1505. As detailed above, DSX nest count is typically stored in a nesting count register. When the DSX nest count is not one, a nop is performed at 507. When the DSX nest count is one, a commit and DSX restart is done at 1509. When a commit and DSX restart happens, in some embodiments, one or more of the following occur: 1) DSX tracking hardware is reset (for example, as detailed above), 2) a fallback address is calculated, and 3) a commit of speculatively executed instructions (writes) of a previous speculative region is made.

Figure 16:
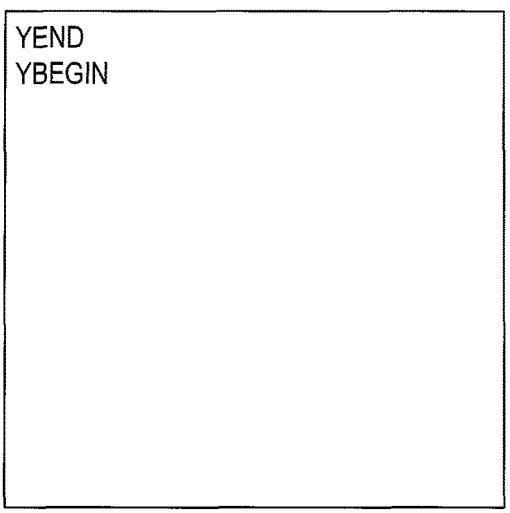
FIG. 16 illustrates an example of pseudo-code showing the execution of an instruction such as a YCONTINUE instruction.

FIG. 16 illustrates an example of pseudo-code showing the execution of an instruction such as a YCONTINUE instruction.

YBORT Instruction

Figure 17:
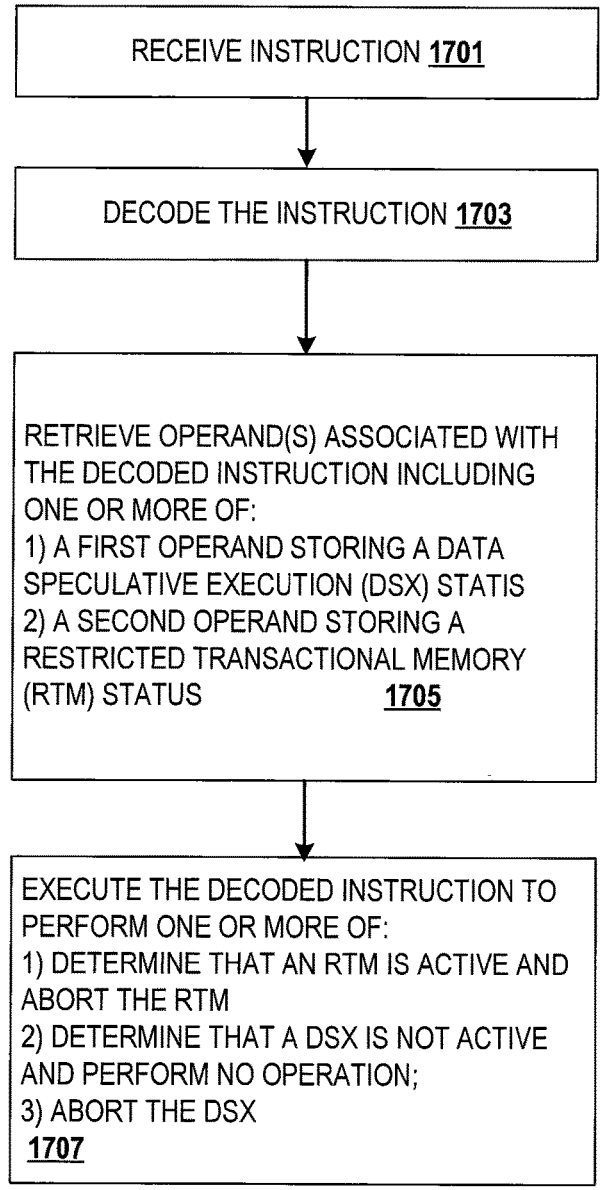
FIG. 17 illustrates an embodiment of an execution of an instruction for aborting a DSX.

At times there are issues within a DSX that require the DSX to abort (such as a mis-speculation). FIG. 17 illustrates an embodiment of an execution of an instruction for aborting a DSX. As will be detailed herein, this instruction is referred to as "YABORT." Of course, the instruction may be referred to by another name. In some embodiments, this execution is performed on one more hardware cores of a hardware device such as a central processing unit (CPU), graphics processing unit (GPU), accelerated processing unit (APU), digital signal processor (DSP), etc. In other embodiments, the execution of the instruction is an emulation.

At 1701, a YABORT instruction is received/fetched. For example, the instruction is fetched from memory into an instruction cache or fetched from an instruction cache. The fetched instruction may take one of several forms as detailed below.

FIG. 18 illustrates some exemplary embodiments of a YABORT instruction format. In an embodiment, the YABORT instruction includes only an opcode (YABORT) as shown in 1801. Depending upon the YABORT implementation implicit operands for a DSX status register and/or a RTM status register are used. As detailed earlier, the DSX status register may be a dedicated register, a flag in a register not dedicated to DSX status (such as an overall status register like a flag register), etc.

In another embodiment, the YABORT instruction includes not only an opcode, but also an explicit operand for a DSX status register such as a DSX status register as shown in 1803. As detailed earlier, the DSX status register may be a dedicated register, a flag in a register not dedicated to DSX status (such as an overall status register like a flag register), etc. Depending upon the YABORT implementation an implicit operands for a RTM status register is used.

In another embodiment, the YABORT instruction includes not only an opcode, but also explicit operands for a DSX status register such as a DSX status register as and a RTM status register as shown in 1805. As detailed earlier, the DSX status register may be a dedicated register, a flag in a register not dedicated to DSX status (such as an overall status register like a flag register), etc.

Turning back to FIG. 17, the fetched/received YABORT instruction is decoded at 1703. In some embodiments, the instruction is decoded by a hardware decoder such as those detailed later. In some embodiments, the instruction is decoded into micro-operations (micro-ops). For example, some CISC based machines typically use micro-operations that are derived from a macro-instruction. In other embodiments, the decoding is a part of a software routine such as a just-in-time compilation.

At 1705, any operand associated with the decoded YABORT instruction is retrieved. For example, the data from one or more of a DSX register and/or a RTM status register are retrieved.

The decoded YABORT instruction is executed at 1707. In embodiments where the instruction is decoded into micro-ops, these micro-ops are executed. The execution of the decoded instruction causes the hardware to do one or more of the following acts to be performed: 1) determine that an RTM transaction is active and abort the RTM transaction; 2) determine that a DSX is not active and perform a no operation; and/or 3) abort the DSX by resetting any DSX nest count, discarding all speculatively executed writes, setting the DSX status to inactive, and rolling back execution to a fallback address.

Regarding the first act, RTM status is typically stored in a RTM status and control register. When this register indicates that an RTM transaction is taking place, an YABORT instruction should not have been executed. As such, there was an issue with the RTM transaction and it should abort.

Regarding the second and third acts, as detailed earlier, a status for a DSX is typically stored in an accessible location such as a register such as the DSX status and control register (DSXSR) discussed above with respect to FIG. 1. However, other means such as a DSX status flag in a non-dedicated control/status register (such as a FLAGS register) may be utilized. This register may be checked by the hardware of the core to determine if a DSX was indeed taking place. When there is no DSX indicated by this register, then there would be no reason to execute a YABORT instruction and as such a no operation (or similar operation) is performed. When there is a DSX indicated by this register, then DSX abort processing occurs including resetting the DSX tracking hardware, discarding all stored speculatively executed writes, and resetting the DSX status to be inactive, and rolling back execution.

Figure 19:
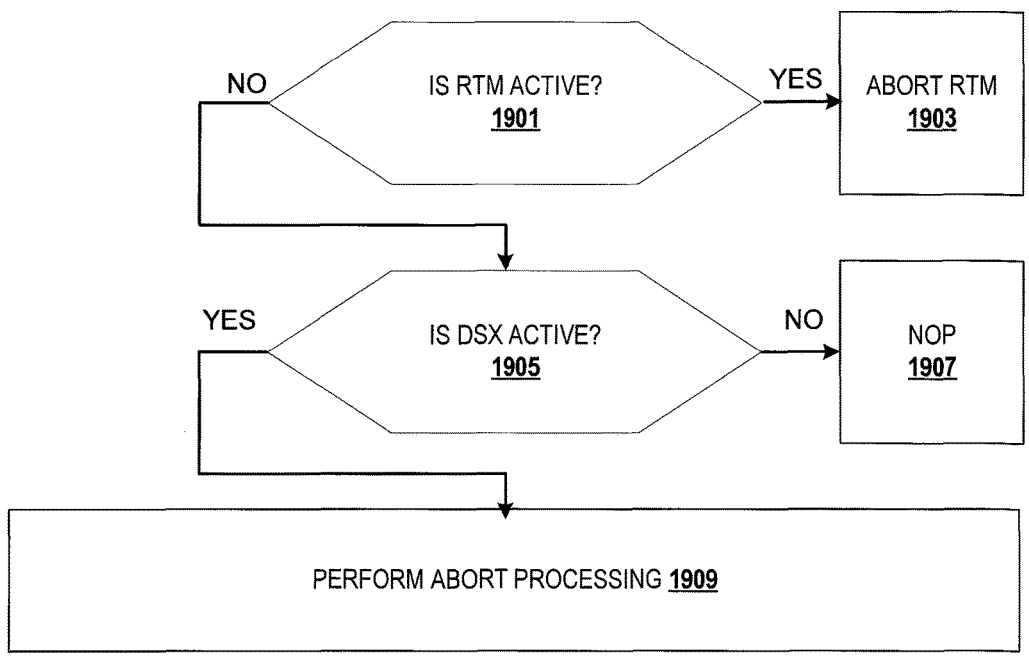
FIG. 19 illustrates a detailed embodiment of an execution of an instruction such as a YABORT instruction.

FIG. 19 illustrates a detailed embodiment of an execution of an instruction such as a YABORT instruction. For example, in some embodiments this flow is box 1707 of FIG. 17. In some embodiments, this execution is performed on one more hardware cores of a hardware device such as a central processing unit (CPU), graphics processing unit (GPU), accelerated processing unit (APU), digital signal processor (DSP), etc. In other embodiments, the execution of the instruction is an emulation.

In some embodiments, for example in a processor that supports RTM transactions, a determination of if a RTM transaction is occurring is made at 1901. For example, in some embodiments of processors that support RTM, if a RTM transaction was active then there should not have been a DSX active in the first place. In this instance, something went wrong in the RTM transaction and its ending procedures should be activated. Typically, RTM transaction status is stored in a register such as a RTM control and status register. The hardware of the processor evaluates the contents of this register to determine if there is an RTM transaction occurring. When there is an RTM transaction occurring, the RTM transaction continues to process 1903.

When there is not an RTM transaction occurring, or RTM is not supported, a determination of if a DSX is active is made at 1905. A status for a DSX is typically stored in an accessible location such as the DSX status and control register (DSXSR) discussed above with respect to FIG. 1. However, other means such as a DSX status flag in a non-dedicated control/status register (such as a FLAGS register) may be utilized. This register may be checked by the hardware of the core to determine if a DSX was taking place.

When there is no DSX indicated by this register, then a nop is performed at 1907. When there is a DSX indicated by this register, then DSX abort processing occurs at 1909 including resetting the DSX tracking hardware, discarding all stored speculatively executed writes, and resetting the DSX status to be inactive, and rolling back execution.

FIG. 20 illustrates an example of pseudo-code showing the execution of an instruction such as a YABORT instruction.

YTEST Instruction

Figure 21:
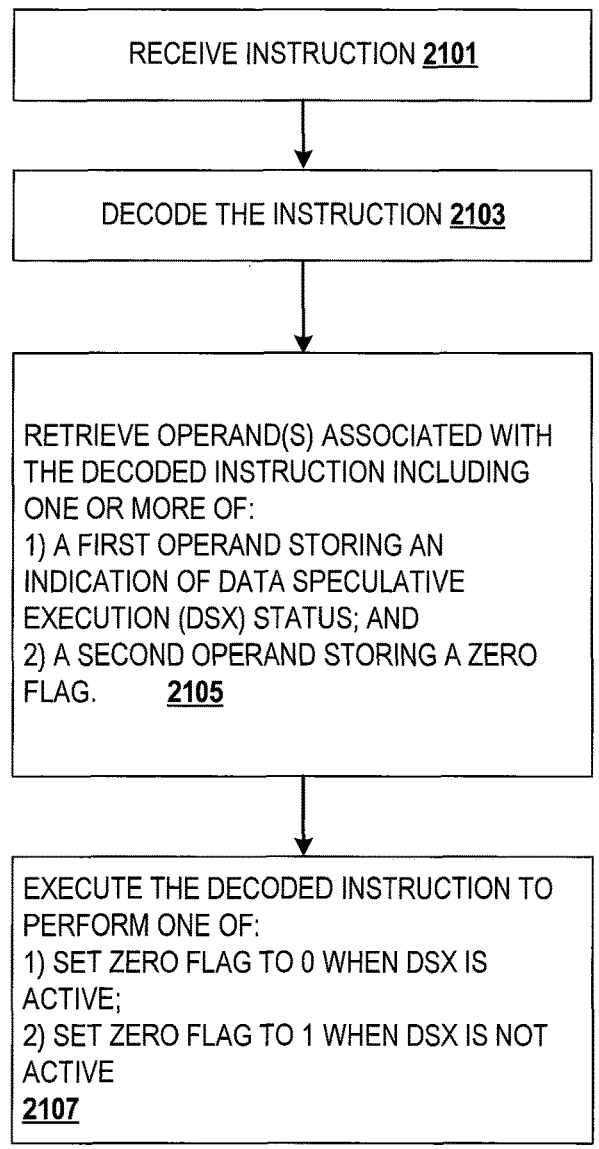
FIG. 21 illustrates an embodiment of an execution of an instruction for testing the status of DSX.

Generally it is desirable for software to know if a DSX is active or not before starting a new DSX speculative region. FIG. 21 illustrates an embodiment of an execution of an instruction for testing the status of DSX. As will be detailed herein, this instruction is referred to as "YTEST" and is used to provide an indication of DSX active through the use of a flag. Of course, the instruction may be referred to by another name.

In some embodiments, this execution is performed on one more hardware cores of a hardware device such as a central processing unit (CPU), graphics processing unit (GPU), accelerated processing unit (APU), digital signal processor (DSP), etc. In other embodiments, the execution of the instruction is an emulation.

At 2101, a YTEST instruction is received/fetched. For example, the instruction is fetched from memory into an instruction cache or fetched from an instruction cache. The fetched instruction may take one of several forms. FIG. 22 illustrates some exemplary embodiments of a YTEST instruction format. In an embodiment, the YTEST instruction includes an opcode (YTEST), but no explicit operands as shown in 2201. Implicit operands for DSX status register and a flag register are used. As detailed earlier, the DSX status register may be a dedicated register, a flag in a register not dedicated to DSX status (such as an overall status register like a flag register, etc.). Exemplary flag registers include an EFLAGS register. In particular, the flag register is to store a zero flag (ZF).

In another embodiment, the YTEST instruction includes not only an opcode, but an explicit operand for DSX status such as a DSX status register as shown in 2203. As detailed earlier, the DSX status register may be a dedicated register, a flag in a register not dedicated to DSX status (such as an overall status register like a flag register, etc.). An implicit operand for a flag register is used. Exemplary flag registers include an EFLAGS register. In particular, the flag register is to store a zero flag (ZF).

In another embodiment, the YTEST instruction includes not only an opcode, but an explicit operand for a flag register as shown in 2205. Exemplary flags registers include an EFLAGS register. In particular, the flag register is to store a zero flag (ZF). An implicit operand for a DSX status register is used. As detailed earlier, the DSX status register may be a dedicated register, a flag in a register not dedicated to DSX status (such as an overall status register like a flag register, etc.).

In another embodiment, the YTEST instruction includes not only an opcode, but an explicit operand for DSX status such as a DSX status register and a flag register as shown in 2207. As detailed earlier, the DSX status register may be a dedicated register, a flag in a register not dedicated to DSX status (such as an overall status register like a flag register, etc.). An implicit operand for a flag register is used. Exemplary flag registers include an EFLAGS register. In particular, the flag register is to store a zero flag (ZF).

Turning back to FIG. 21, the fetched/received YTEST instruction is decoded at 2103. In some embodiments, the instruction is decoded by a hardware decoder such as those detailed later. In some embodiments, the instruction is decoded into micro-operations (micro-ops). For example, some CISC based machines typically use micro-operations that are derived from a macro-instruction. In other embodiments, the decoding is a part of a software routine such as a just-in-time compilation.

At 2105, any operand associated with the decoded YTEST instruction is retrieved. For example, the data from the DSX status register is retrieved.

The decoded YTEST instruction is executed at 2107. In embodiments where the instruction is decoded into micro-ops, these micro-ops are executed. The execution of the decoded instruction causes the hardware to do one or more of the following acts to be performed: 1) determine that the DSX status register indicates that a DSX is active and if so set the zero flag in the flag register to 0 or 2) determine that the DSX status register indicates that a DSX is not active and if so set the zero flag in the flag register to 1. Of course, while the zero flag is used to show DSX active status, other flags are used depending upon the embodiment.

Figure 23:
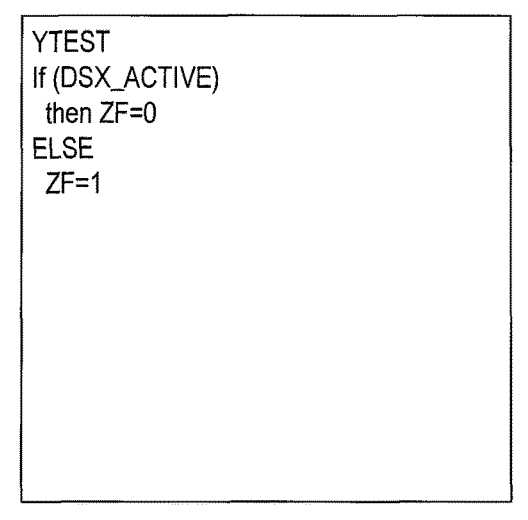

FIG. 23 illustrates an example of pseudo-code showing the execution of an instruction such as a YTEST instruction.

YEND Instruction

As a DSX comes to an end (for example, an iteration of a loop has run its course) without any issues, in some embodiments an instruction is executed to indicate the end of a speculative region. In short, the execution of this instruction causes the commitment of a current speculative state (all writes that have not been written) and an exit from the current speculative region.

Figure 24:
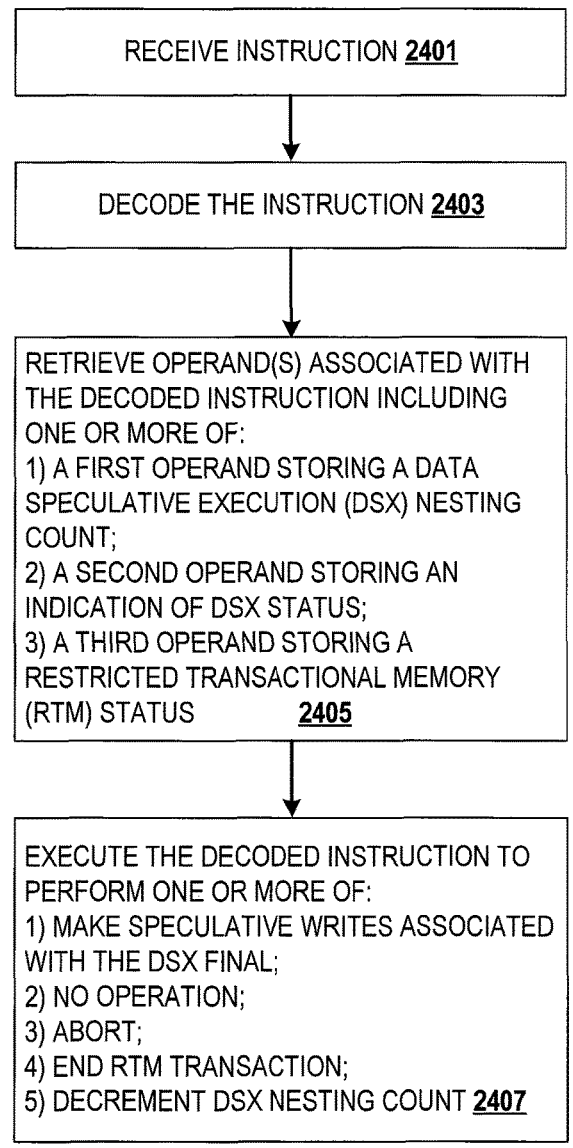
FIG. 24 illustrates an embodiment of an execution of an instruction for ending a DSX.

FIG. 24 illustrates an embodiment of an execution of an instruction for ending a DSX. As will be detailed herein, this instruction is referred to as "YEND" and is used to signal the end of a DSX. Of course, the instruction may be referred to by another name.

In some embodiments, this execution is performed on one more hardware cores of a hardware device such as a central processing unit (CPU), graphics processing unit (GPU), accelerated processing unit (APU), digital signal processor (DSP), etc. In other embodiments, the execution of the instruction is an emulation.

At 2401, a YEND instruction is received/fetched. For example, the instruction is fetched from memory into an instruction cache or fetched from an instruction cache. The fetched instruction may take one of several forms. FIG. 25 illustrates some exemplary embodiments of a YEND instruction format. In an embodiment, the YEND instruction includes an opcode (YEND), but no explicit operands as shown in 2501. Depending upon the YEND implementation implicit register operands for DSX status, nesting count, and/or RTM status are used.

In another embodiment, the YEND instruction includes not only an opcode, but an explicit operand for DSX status such as a DSX status register as shown in 2503. As detailed earlier, the DSX status register may be a dedicated register, a flag in a register not dedicated to DSX status (such as an overall status register like a flag register, etc.). Depending upon the YEND implementation implicit register operands for nesting count and/or RTM status are used.

In another embodiment, the YEND instruction includes not only an opcode, but an explicit operand for DSX nesting count such as a DSX nest count register as shown in 2505. As detailed earlier, the DSX nest count may be a dedicated register, a flag in a register not dedicated to DSX nest count (such as an overall status register). Depending upon the YEND implementation implicit register operands for DSX status and/or RTM status are used.

In another embodiment, the YEND instruction includes not only an opcode, but an explicit operand for DSX status such as a DSX status register and DSX nesting count such as a DSX nest count register as shown in 2507. As detailed earlier, the DSX status register may be a dedicated register, a flag in a register not dedicated to DSX status (such as an overall status register like a flag register, etc.), and the DSX nest count may be a dedicated register, a flag in a register not dedicated to DSX nest count (such as an overall status register). Depending upon the YEND implementation an implicit operand for a RTM status register is used.

In another embodiment, the YEND instruction includes not only an opcode, but an explicit operand for DSX status such as a DSX status register, DSX nesting count such as a DSX nest count register, and RTM status as shown in 2509. As detailed earlier, the DSX status register may be a dedicated register, a flag in a register not dedicated to DSX status (such as an overall status register like a flag register, etc.), and the DSX nest count may be a dedicated register, a flag in a register not dedicated to DSX nest count (such as an overall status register).

Turning back to FIG. 24, the fetched/received YEND instruction is decoded at 2403. In some embodiments, the instruction is decoded by a hardware decoder such as those detailed later. In some embodiments, the instruction is decoded into micro-operations (micro-ops). For example, some CISC based machines typically use micro-operations that are derived from a macro-instruction. In other embodiments, the decoding is a part of a software routine such as a just-in-time compilation.

At 2405, any operand associated with the decoded YEND instruction is retrieved. For example, the data from one or more of a DSX register, DSX nest count register, and/or a RTM status register are retrieved.

The decoded YEND instruction is executed at 2407. In embodiments where the instruction is decoded into micro-ops, these micro-ops are executed. The execution of the decoded instruction causes the hardware to do one or more of the following acts to be performed: 1) make speculative writes associated with the DSX final (commit them); 2) signal a fault (such as a general protection fault) and perform no operation; 3) abort the DSX; and/or 4) end a RTM transaction.

The first of these acts (making speculative writes final) causes all of the speculative writes associated with the DSX to be committed (stored such that they are accessible outside of the DSX) and the DSX status is set to indicate that a DSX does not exist in a DSX status register. For example, all writes associated with the DSX (such as stored in cache, registers, or memory) are committed such that they are finalized and visible outside of the DSX. Typically, a DSX cannot be finalized unless the nest count for that speculation is zero. If the nest count is greater than zero, then in some embodiments, a NOP is performed.

If there was some reason that the DSX cannot be finalized, then one or more of the other three potential actions takes place. For example, in some embodiments of processors that support RTM, if a RTM transaction was active then there should not have been a DSX active in the first place. In this instance, something went wrong in the RTM transaction and its ending procedures should be activated as indicated by the fourth act above.

In some embodiments, if there was no DSX then a fault is generated and no operation (NOP) is performed. For example, as detailed earlier, a status for a DSX is typically stored in an accessible location such as a register such as the DSX status and control register (DSXSR) discussed above with respect to FIG. 1. However, other means such as a DSX status flag in a non-dedicated control/status register (such as a FLAGS register) may be utilized. This register may be checked by the hardware of the core to determine if a DSX was indeed taking place.

In some embodiments, if there is a failure in the committing of the transaction, then an abort procedure is implemented. For example, in some embodiments of processors that support RTM, the RTM abort procedures is activated.

Regardless of which act is performed, in most embodiments, after that act the DSX state is reset (if it was set) to indicate that there is no pending DSX.

Figure 26:
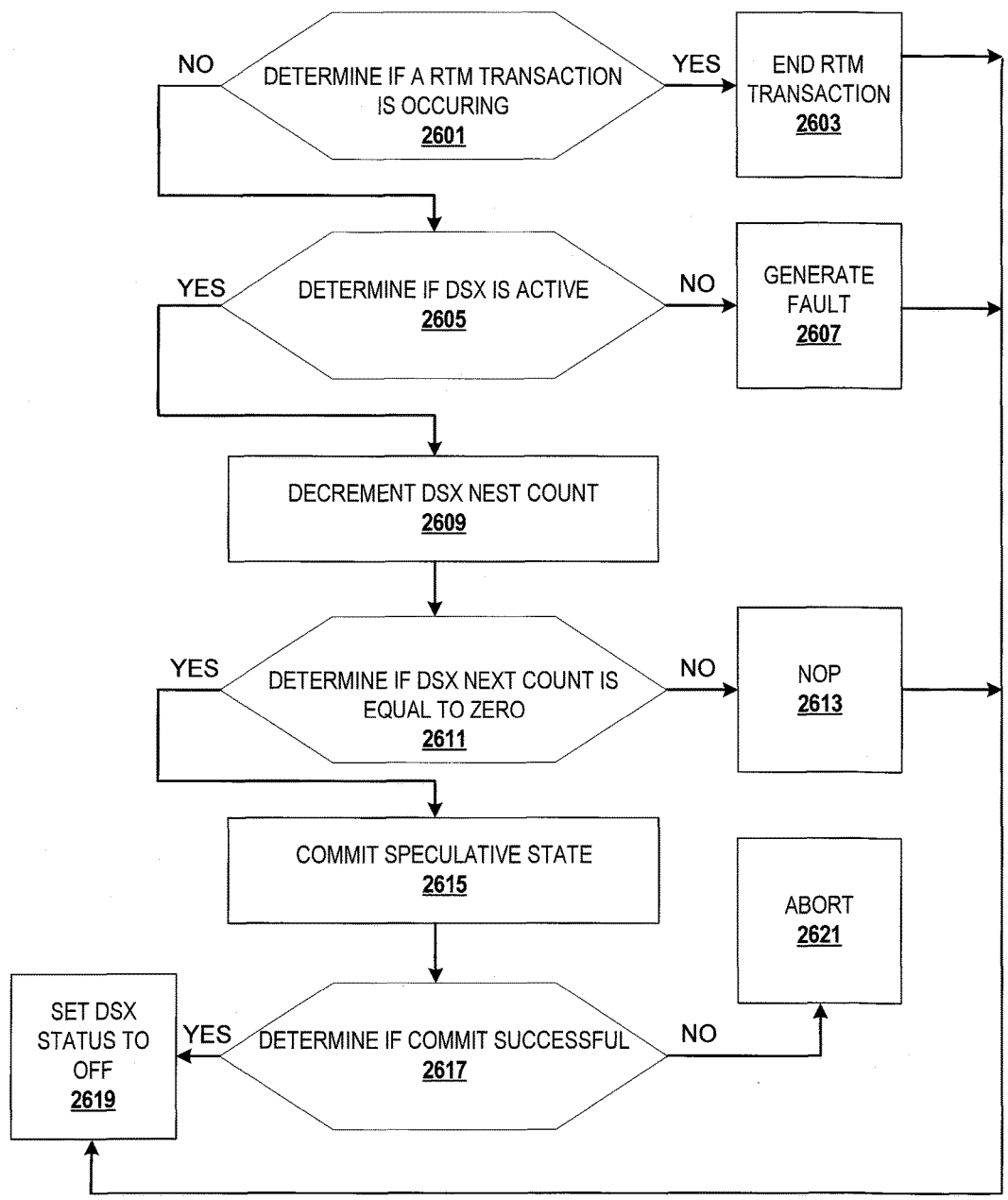
FIG. 26 illustrates a detailed embodiment of an execution of an instruction such as a YEND instruction.

FIG. 26 illustrates a detailed embodiment of an execution of an instruction such as a YEND instruction. For example, in some embodiments this flow is box 2407 of FIG. 24. In some embodiments, this execution is performed on one more hardware cores of a hardware device such as a central processing unit (CPU), graphics processing unit (GPU), accelerated processing unit (APU), digital signal processor (DSP), etc. In other embodiments, the execution of the instruction is an emulation.

In some embodiments, for example in a processor that supports RTM transactions, a determination of if a RTM transaction is occurring is made at 2601. For example, in some embodiments of processors that support RTM, if a RTM transaction was active then there should not have been a DSX active in the first place. In this instance, something went wrong in the RTM transaction and its ending procedures should be activated. Typically, RTM transaction status is stored in a register such as a RTM control and status register. The hardware of the processor evaluates the contents of this register to determine if there is an RTM transaction occurring.

When there is an RTM transaction occurring, a call to end that RTM transaction is made at 2603. For example, an instruction to end an RTM transaction is called and executed. An example of such an instruction is XEND.

When there is not an RTM transaction occurring, a determination of if a DSX is active is made at 2605. As detailed above, DSX status is typically stored in a control register such as a DSX status and control register (DSXSR) shown in FIG. 1. However, other means such as a DSX status flag in a non-dedicated control/status register (such as a FLAGS register) may be utilized. Regardless of where the status is stored, the location is checked by the hardware of the processor to determine if a DSX was indeed taking place.

When there is not a DSX occurring, a fault is generated at 2607. For example, a general protection fault is generated. Additionally, in some embodiments a no operation (nop) is performed.

When there is a DSX occurring, a DSX nest count is decremented at 2609. For example, a stored DSX nest count stored in a DSX nest count register such as detailed above is decremented.

A determination of if the DSX nest count is equal to zero is made at 2611. As detailed above, DSX nest count is typically stored in a register. When the DSX nest count is not zero, in some embodiments, a NOP is performed. When the DSX nest count is zero, the current DSX's speculative state is made final and committed at 2615.

A determination of if the commitment was successful is made at 2617. For example, was there an error in storing? If not, then the DSX is aborted at 2621. When the commitment was successful, a DSX status indication (such as stored in a DSX status and control register) is set to indicate that there is no DSX active at 2619. In some embodiments, the setting of this indication occurs after the generation of a fault 2607 or the abort of the DSX 2621.

FIG. 27 illustrates an example of pseudo-code showing the execution of an instruction such as a YEND instruction.

Discussed below are embodiments of instruction formats and execution resources to execute the above described instructions.

An instruction set includes one or more instruction formats. A given instruction format defines various fields (number of bits, location of bits) to specify, among other things, the operation to be performed (opcode) and the operand(s) on which that operation is to be performed. Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to the Advanced Vector Extensions (AVX) (AVX1 and AVX2) and using the Vector Extensions (VEX) coding scheme, has been, has been released and/or published (e.g., see Intel® 64 and IA-32 Architectures Software Developers Manual, October 2011; and see Intel® Advanced Vector Extensions Programming Reference, June 2011).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 28A:
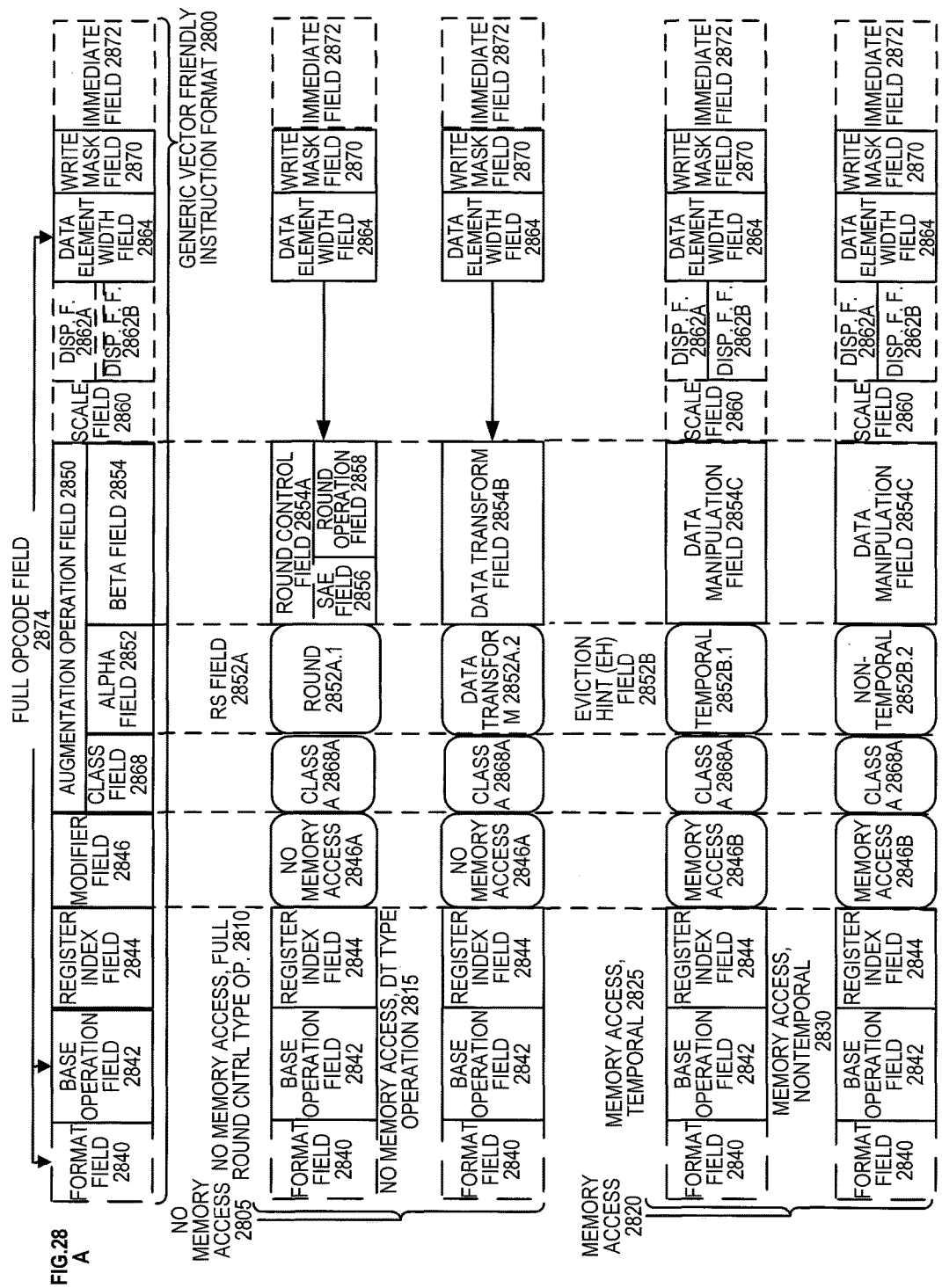
FIGS. 28A-28B are block diagrams illustrating a generic vector friendly instruction format and instruction templates thereof according to embodiments of the invention.
Figure 28B:
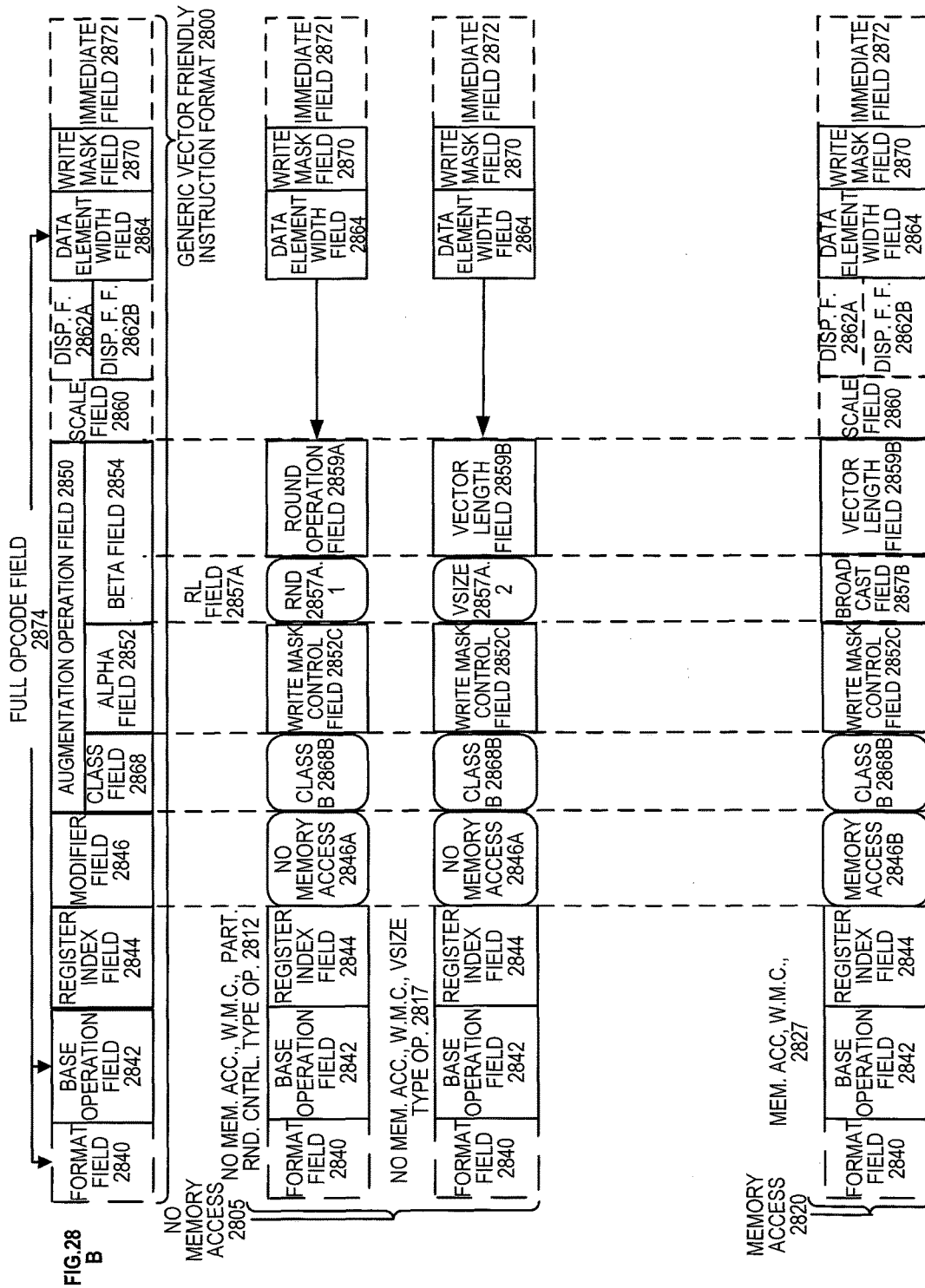

FIGS. 28A-28B are block diagrams illustrating a generic vector friendly instruction format and instruction templates thereof according to embodiments of the invention. FIG. 28A is a block diagram illustrating a generic vector friendly instruction format and class A instruction templates thereof according to embodiments of the invention; while FIG. 28B is a block diagram illustrating the generic vector friendly instruction format and class B instruction templates thereof according to embodiments of the invention. Specifically, a generic vector friendly instruction format 2800 for which are defined class A and class B instruction templates, both of which include no memory access 2805 instruction templates and memory access 2820 instruction templates. The term generic in the context of the vector friendly instruction format refers to the instruction format not being tied to any specific instruction set.

While embodiments of the invention will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 28A include: 1) within the no memory access 2805 instruction templates there is shown a no memory access, full round control type operation 2810 instruction template and a no memory access, data transform type operation 2815 instruction template; and 2) within the memory access 2820 instruction templates there is shown a memory access, temporal 2825 instruction template and a memory access, non-temporal 2830 instruction template. The class B instruction templates in FIG. 28B include: 1) within the no memory access 2805 instruction templates there is shown a no memory access, write mask control, partial round control type operation 2812 instruction template and a no memory access, write mask control, vsize type operation 2817 instruction template; and 2) within the memory access 2820 instruction templates there is shown a memory access, write mask control 2827 instruction template.

The generic vector friendly instruction format 2800 includes the following fields listed below in the order illustrated in FIGS. 28A-28B.

Format field 2840—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 2842—its content distinguishes different base operations.

Register index field 2844—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 2846—its content distinguishes occurrences of instructions in the generic vector instruction format that specify memory access from those that do not; that is, between no memory access 2805 instruction templates and memory access 2820 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 2850—its content distinguishes which one of a variety of different operations to be performed in addition to the base operation. This field is context specific. In one embodiment of the invention, this field is divided into a class field 2868, an alpha field 2852, and a beta field 2854. The augmentation operation field 2850 allows common groups of operations to be performed in a single instruction rather than 2, 3, or 4 instructions.

Scale field 2860—its content allows for the scaling of the index field's content for memory address generation (e.g., for address generation that uses $2^{scale}*\text{index}+\text{base}$).

Displacement Field 2862A—its content is used as part of memory address generation (e.g., for address generation that uses $2^{scale}$*index+base+displacement).

Displacement Factor Field 2862B (note that the juxtaposition of displacement field 2862A directly over displacement factor field 2862B indicates one or the other is used)—its content is used as part of address generation; it specifies a displacement factor that is to be scaled by the size of a memory access (N)—where N is the number of bytes in the memory access (e.g., for address generation that uses $2^{scale}$*index+base+scaled displacement). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 2874 (described later herein) and the data manipulation field 2854C. The displacement field 2862A and the displacement factor field 2862B are optional in the sense that they are not used for the no memory access 2805 instruction templates and/or different embodiments may implement only one or none of the two.

Data element width field 2864—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 2870—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 2870 allows for partial vector operations, including loads, stores, arithmetic, logical, etc. While embodiments of the invention are described in which the write mask field's 2870 content selects one of a number of write mask registers that contains the write mask to be used (and thus the write mask field's 2870 content indirectly identifies that masking to be performed), alternative embodiments instead or additional allow the mask write field's 2870 content to directly specify the masking to be performed.

Immediate field 2872—its content allows for the specification of an immediate. This field is optional in the sense that is it not present in an implementation of the generic vector friendly format that does not support immediate and it is not present in instructions that do not use an immediate.

Class field 2868—its content distinguishes between different classes of instructions. With reference to FIGS. 28A-B, the contents of this field select between class A and class B instructions. In FIGS. 28A-B, rounded corner squares are used to indicate a specific value is present in a field (e.g., class A 2868A and class B 2868B for the class field 2868 respectively in FIGS. 28A-B).

Instruction Templates of Class A

In the case of the non-memory access 2805 instruction templates of class A, the alpha field 2852 is interpreted as an RS field 2852A, whose content distinguishes which one of the different augmentation operation types are to be performed (e.g., round 2852A.1 and data transform 2852A.2 are respectively specified for the no memory access, round type operation 2810 and the no memory access, data transform type operation 2815 instruction templates), while the beta field 2854 distinguishes which of the operations of the specified type is to be performed. In the no memory access 2805 instruction templates, the scale field 2860, the displacement field 2862A, and the displacement scale filed 2862B are not present.

No-Memory Access Instruction Templates—Full Round Control Type Operation

In the no memory access full round control type operation 2810 instruction template, the beta field 2854 is interpreted as a round control field 2854A, whose content(s) provide static rounding. While in the described embodiments of the invention the round control field 2854A includes a suppress all floating point exceptions (SAE) field 2856 and a round operation control field 2858, alternative embodiments may support may encode both these concepts into the same field or only have one or the other of these concepts/fields (e.g., may have only the round operation control field 2858).

SAE field 2856—its content distinguishes whether or not to disable the exception event reporting; when the SAE field's 2856 content indicates suppression is enabled, a given instruction does not report any kind of floating-point exception flag and does not raise any floating point exception handler.

Round operation control field 2858—its content distinguishes which one of a group of rounding operations to perform (e.g., Round-up, Round-down, Round-towards-zero and Round-to-nearest). Thus, the round operation control field 2858 allows for the changing of the rounding mode on a per instruction basis. In one embodiment of the invention where a processor includes a control register for specifying rounding modes, the round operation control field's 2850 content overrides that register value.

No Memory Access Instruction Templates—Data Transform Type Operation

In the no memory access data transform type operation 2815 instruction template, the beta field 2854 is interpreted as a data transform field 2854B, whose content distinguishes which one of a number of data transforms is to be performed (e.g., no data transform, swizzle, broadcast).

In the case of a memory access 2820 instruction template of class A, the alpha field 2852 is interpreted as an eviction hint field 2852B, whose content distinguishes which one of the eviction hints is to be used (in FIG. 28A, temporal 2852B.1 and non-temporal 2852B.2 are respectively specified for the memory access, temporal 2825 instruction template and the memory access, non-temporal 2830 instruction template), while the beta field 2854 is interpreted as a data manipulation field 2854C, whose content distinguishes which one of a number of data manipulation operations (also known as primitives) is to be performed (e.g., no manipulation; broadcast; up conversion of a source; and down conversion of a destination). The memory access 2820 instruction templates include the scale field 2860, and optionally the displacement field 2862A or the displacement scale field 2862B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 2852 is interpreted as a write mask control (Z) field 2852C, whose content distinguishes whether the write masking controlled by the write mask field 2870 should be a merging or a zeroing.

In the case of the non-memory access 2805 instruction templates of class B, part of the beta field 2854 is interpreted as an RL field 2857A, whose content distinguishes which one of the different augmentation operation types are to be performed (e.g., round 2857A.1 and vector length (VSIZE) 2857A.2 are respectively specified for the no memory access, write mask control, partial round control type operation 2812 instruction template and the no memory access, write mask control, VSIZE type operation 2817 instruction template), while the rest of the beta field 2854 distinguishes which of the operations of the specified type is to be performed. In the no memory access 2805 instruction templates, the scale field 2860, the displacement field 2862A, and the displacement scale filed 2862B are not present.

In the no memory access, write mask control, partial round control type operation 2810 instruction template, the rest of the beta field 2854 is interpreted as a round operation field 2859A and exception event reporting is disabled (a given instruction does not report any kind of floating-point exception flag and does not raise any floating point exception handler).

Round operation control field 2859A—just as round operation control field 2858, its content distinguishes which one of a group of rounding operations to perform (e.g., Round-up, Round-down, Round-towards-zero and Round-to-nearest). Thus, the round operation control field 2859A allows for the changing of the rounding mode on a per instruction basis. In one embodiment of the invention where a processor includes a control register for specifying rounding modes, the round operation control field's 2850 content overrides that register value.

In the no memory access, write mask control, VSIZE type operation 2817 instruction template, the rest of the beta field 2854 is interpreted as a vector length field 2859B, whose content distinguishes which one of a number of data vector lengths is to be performed on (e.g., 128, 256, or 512 byte).

In the case of a memory access 2820 instruction template of class B, part of the beta field 2854 is interpreted as a broadcast field 2857B, whose content distinguishes whether or not the broadcast type data manipulation operation is to be performed, while the rest of the beta field 2854 is interpreted the vector length field 2859B. The memory access 2820 instruction templates include the scale field 2860, and optionally the displacement field 2862A or the displacement scale field 2862B.

With regard to the generic vector friendly instruction format 2800, a full opcode field 2874 is shown including the format field 2840, the base operation field 2842, and the data element width field 2864. While one embodiment is shown where the full opcode field 2874 includes all of these fields, the full opcode field 2874 includes less than all of these fields in embodiments that do not support all of them. The full opcode field 2874 provides the operation code (opcode).

The augmentation operation field 2850, the data element width field 2864, and the write mask field 2870 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the invention, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the invention. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 29 is a block diagram illustrating an exemplary specific vector friendly instruction format according to embodiments of the invention. FIG. 29 shows a specific vector friendly instruction format 2900 that is specific in the sense that it specifies the location, size, interpretation, and order of the fields, as well as values for some of those fields. The specific vector friendly instruction format 2900 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 28 into which the fields from FIG. 29 map are illustrated.

It should be understood that, although embodiments of the invention are described with reference to the specific vector friendly instruction format 2900 in the context of the generic vector friendly instruction format 2800 for illustrative purposes, the invention is not limited to the specific vector friendly instruction format 2900 except where claimed. For example, the generic vector friendly instruction format 2800 contemplates a variety of possible sizes for the various fields, while the specific vector friendly instruction format 2900 is shown as having fields of specific sizes. By way of specific example, while the data element width field 2864 is illustrated as a one bit field in the specific vector friendly instruction format 2900, the invention is not so limited (that is, the generic vector friendly instruction format 2800 contemplates other sizes of the data element width field 2864).

The generic vector friendly instruction format 2800 includes the following fields listed below in the order illustrated in FIG. 29A.

EVEX Prefix (Bytes 0-3) 2902—is encoded in a four-byte form.

Format Field 2840 (EVEX Byte 0, bits [7:0])—the first byte (EVEX Byte 0) is the format field 2840 and it contains 0x62 (the unique value used for distinguishing the vector friendly instruction format in one embodiment of the invention).

The second-fourth bytes (EVEX Bytes 1-3) include a number of bit fields providing specific capability.

REX field 2905 (EVEX Byte 1, bits [7-5])—consists of a EVEX.R bit field (EVEX Byte 1, bit [7]—R), EVEX.X bit field (EVEX byte 1, bit [6]—X), and 2857 BEX byte 1, bit[5]—B). The EVEX.R, EVEX.X, and EVEX.B bit fields provide the same functionality as the corresponding VEX bit fields, and are encoded using 1s complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 2810—this is the first part of the REX' field 2810 and is the EVEX.R' bit field (EVEX Byte 1, bit [4]—R') that is used to encode either the upper 16 or lower 16 of the extended 32 register set. In one embodiment of the invention, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the invention do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 2915 (EVEX byte 1, bits [3:0]—mmmm)—its content encodes an implied leading opcode byte (0F, 0F 38, or 0F 3).

Data element width field 2864 (EVEX byte 2, bit [7]—W)—is represented by the notation EVEX.W. EVEX.W is used to define the granularity (size) of the datatype (either 32-bit data elements or 64-bit data elements).

EVEX.vvvv 2920 (EVEX Byte 2, bits [6:3]—vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in 1s complement form for certain vector shifts; or 3) EVEX.vvvv does not encode any operand, the field is reserved and should contain 1111b. Thus, EVEX.vvvv field 2920 encodes the 4 low-order bits of the first source register specifier stored in inverted (1s complement) form. Depending on the instruction, an extra different EVEX bit field is used to extend the specifier size to 32 registers.

EVEX.U 2868 Class field (EVEX byte 2, bit [2]—U)—If EVEX.U=0, it indicates class A or EVEX.U0; if EVEX.U=1, it indicates class B or EVEX.U1.

Prefix encoding field 2925 (EVEX byte 2, bits [1:0]—pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 2852 (EVEX byte 2, bit [7]—EH; also known as EVEX.EH, EVEX.rs, EVEX.RL, EVEX.write mask control, and EVEX.N; also illustrated with α)—as previously described, this field is context specific.

Beta field 2854 (EVEX byte 3, bits [6:4]—SSS, also known as EVEX.$s_{2-0}$, EVEX.$r_{2-0}$, EVEX.rr1, EVEX.LL0, EVEX.LLB; also illustrated with βββ)—as previously described, this field is context specific.

REX' field 2810—this is the remainder of the REX' field and is the EVEX.V' bit field (EVEX Byte 3, bit [3]—V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 2870 (EVEX byte 3, bits [2:0]—kkk)—its content specifies the index of a register in the write mask registers as previously described. In one embodiment of the invention, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 2930 (Byte 4) is also known as the opcode byte. Part of the opcode is specified in this field.

MOD R/M Field 2940 (Byte 5) includes MOD field 2942, Reg field 2944, and R/M field 2946. As previously described, the MOD field's 2942 content distinguishes between memory access and non-memory access operations. The role of Reg field 2944 can be summarized to two situations: encoding either the destination register operand or a source register operand, or be treated as an opcode extension and not used to encode any instruction operand. The role of R/M field 2946 may include the following: encoding the instruction operand that references a memory address, or encoding either the destination register operand or a source register operand.

Scale, Index, Base (SIB) Byte (Byte 6)—As previously described, the scale field's 2850 content is used for memory address generation. SIB.xxx 2954 and SIB.bbb 2956—the contents of these fields have been previously referred to with regard to the register indexes Xxxx and Bbbb.

Displacement field 2862A (Bytes 7-10)—when MOD field 2942 contains 10, bytes 7-10 are the displacement field 2862A, and it works the same as the legacy 32-bit displacement (disp32) and works at byte granularity.

Displacement factor field 2862B (Byte 7)—when MOD field 2942 contains 01, byte 7 is the displacement factor field 2862B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 2862B is a reinterpretation of disp8; when using displacement factor field 2862B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 2862B substitutes the legacy x86 instruction set 8-bit displacement. Thus, the displacement factor field 2862B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset).

Immediate field 2872 operates as previously described.

Full Opcode Field

FIG. 29B is a block diagram illustrating the fields of the specific vector friendly instruction format 2900 that make up the full opcode field 2874 according to one embodiment of the invention. Specifically, the full opcode field 2874 includes the format field 2840, the base operation field 2842, and the data element width (W) field 2864. The base operation field 2842 includes the prefix encoding field 2925, the opcode map field 2915, and the real opcode field 2930.

Register Index Field

FIG. 29C is a block diagram illustrating the fields of the specific vector friendly instruction format 2900 that make up the register index field 2844 according to one embodiment of the invention. Specifically, the register index field 2844 includes the REX field 2905, the REX' field 2910, the MODR/M.reg field 2944, the MODR/M.r/m field 2946, the VVVV field 2920, xxx field 2954, and the bbb field 2956.

Augmentation Operation Field

FIG. 29D is a block diagram illustrating the fields of the specific vector friendly instruction format 2900 that make up the augmentation operation field 2850 according to one embodiment of the invention. When the class (U) field 2868 contains 0, it signifies EVEX.U0 (class A 2868A); when it contains 1, it signifies EVEX.U1 (class B 2868B). When U=0 and the MOD field 2942 contains 11 (signifying a no memory access operation), the alpha field 2852 (EVEX byte 3, bit [7]—EH) is interpreted as the rs field 2852A. When the rs field 2852A contains a 1 (round 2852A.1), the beta field 2854 (EVEX byte 3, bits [6:4]—SSS) is interpreted as the round control field 2854A. The round control field 2854A includes a one bit SAE field 2856 and a two bit round operation field 2858. When the rs field 2852A contains a 0 (data transform 2852A.2), the beta field 2854 (EVEX byte 3, bits [6:4]—SSS) is interpreted as a three bit data transform field 2854B. When U=0 and the MOD field 2942 contains 00, 01, or 10 (signifying a memory access operation), the alpha field 2852 (EVEX byte 3, bit [7]—EH) is interpreted as the eviction hint (EH) field 2852B and the beta field 2854 (EVEX byte 3, bits [6:4]—SSS) is interpreted as a three bit data manipulation field 2854C.

When U=1, the alpha field 2852 (EVEX byte 3, bit [7]—EH) is interpreted as the write mask control (Z) field 2852C. When U=1 and the MOD field 2942 contains 11 (signifying a no memory access operation), part of the beta field 2854 (EVEX byte 3, bit [4]—$S_0$) is interpreted as the RL field 2857A; when it contains a 1 (round 2857A.1) the rest of the beta field 2854 (EVEX byte 3, bit [6-5]—$S_{2-1}$) is interpreted as the round operation field 2859A, while when the RL field 2857A contains a 0 (VSIZE 2857.A2) the rest of the beta field 2854 (EVEX byte 3, bit [6-5]—$S_{2-1}$) is interpreted as the vector length field 2859B (EVEX byte 3, bit [6-5]—$L_{1-0}$). When U=1 and the MOD field 2942 contains 00, 01, or 10 (signifying a memory access operation), the beta field 2854 (EVEX byte 3, bits [6:4]—SSS) is interpreted as the vector length field 2859B (EVEX byte 3, bit [6-5]—$L_{1-0}$) and the broadcast field 2857B (EVEX byte 3, bit [4]—B).

Exemplary Register Architecture

FIG. 30 is a block diagram of a register architecture 3000 according to one embodiment of the invention. In the embodiment illustrated, there are 32 vector registers 3010 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 2900 operates on these overlaid register file as illustrated in the below tables.

| Adjustable Vector Length | Class | Operations | Registers |
| --- | --- | --- | --- |
| Instruction Templates that do not include the vector length field 2859B | A (FIG. 28A; U = 0) | 2810, 2815, 2825, 2830 | zmm registers (the vector length is 64 byte) |
|  | B (FIG. 28B; U = 1) | 2812 | zmm registers (the vector length is 64 byte) |
| Instruction templates that do include the vector length field 2859B | B (FIG. 28B; U = 1) | 2817, 2827 | zmm, ymm, or xmm registers (the vector length is 64 byte, 32 byte, or 16 byte) depending on the vector length field 2859B |

In other words, the vector length field 2859B selects between a maximum length and one or more other shorter lengths, where each such shorter length is half the length of the preceding length; and instructions templates without the vector length field 2859B operate on the maximum vector length. Further, in one embodiment, the class B instruction templates of the specific vector friendly instruction format 2900 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 3015—in the embodiment illustrated, there are 8 write mask registers (k0 through k7), each 64 bits in size. In an alternate embodiment, the write mask registers 3015 are 16 bits in size. As previously described, in one embodiment of the invention, the vector mask register k0 cannot be used as a write mask; when the encoding that would normally indicate k0 is used for a write mask, it selects a hardwired write mask of 0xFFFF, effectively disabling write masking for that instruction.

General-purpose registers 3025—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 3045, on which is aliased the MMX packed integer flat register file 3050—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 31A is a block diagram illustrating both an exemplary in-order pipeline and an exemplary register renaming, out-of-order issue/execution pipeline according to embodiments of the invention. FIG. 31B is a block diagram illustrating both an exemplary embodiment of an in-order architecture core and an exemplary register renaming, out-of-order issue/execution architecture core to be included in a processor according to embodiments of the invention. The solid lined boxes in FIGS. 31A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 31A, a processor pipeline 3100 includes a fetch stage 3102, a length decode stage 3104, a decode stage 3106, an allocation stage 3108, a renaming stage 3110, a scheduling (also known as a dispatch or issue) stage 3112, a register read/memory read stage 3114, an execute stage 3116, a write back/memory write stage 3118, an exception handling stage 3122, and a commit stage 3124.

FIG. 31B shows processor core 3190 including a front end unit 3130 coupled to an execution engine unit 3150, and both are coupled to a memory unit 3170. The core 3190 may be a reduced instruction set computing (RISC) core, a complex instruction set computing (CISC) core, a very long instruction word (VLIW) core, or a hybrid or alternative core type. As yet another option, the core 3190 may be a special-purpose core, such as, for example, a network or communication core, compression engine, coprocessor core, general purpose computing graphics processing unit (GPGPU) core, graphics core, or the like.

The front end unit 3130 includes a branch prediction unit 3132 coupled to an instruction cache unit 3134, which is coupled to an instruction translation lookaside buffer (TLB) 3136, which is coupled to an instruction fetch unit 3138, which is coupled to a decode unit 3140. The decode unit 3140 (or decoder) may decode instructions, and generate as an output one or more micro-operations, micro-code entry points, microinstructions, other instructions, or other control signals, which are decoded from, or which otherwise reflect, or are derived from, the original instructions. The decode unit 3140 may be implemented using various different mechanisms. Examples of suitable mechanisms include, but are not limited to, look-up tables, hardware implementations, programmable logic arrays (PLAs), microcode read only memories (ROMs), etc. In one embodiment, the core 3190 includes a microcode ROM or other medium that stores microcode for certain macroinstructions (e.g., in decode unit 3140 or otherwise within the front end unit 3130). The decode unit 3140 is coupled to a rename/allocator unit 3152 in the execution engine unit 3150.

The execution engine unit 3150 includes the rename/allocator unit 3152 coupled to a retirement unit 3154 and a set of one or more scheduler unit(s) 3156. The scheduler unit(s) 3156 represents any number of different schedulers, including reservations stations, central instruction window, etc. The scheduler unit(s) 3156 is coupled to the physical register file(s) unit(s) 3158. Each of the physical register file(s) units 3158 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 3158 comprises a vector registers unit, a write mask registers unit, and a scalar registers unit. These register units may provide architectural vector registers, vector mask registers, and general purpose registers. The physical register file(s) unit(s) 3158 is overlapped by the retirement unit 3154 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 3154 and the physical register file(s) unit(s) 3158 are coupled to the execution cluster(s) 3160. The execution cluster(s) 3160 includes a set of one or more execution units 3162 and a set of one or more memory access units 3164. The execution units 3162 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 3156, physical register file(s) unit(s) 3158, and execution cluster(s) 3160 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 3164). It should also be understood that where separate pipelines are used, one or more of these pipelines may be out-of-order issue/execution and the rest in-order.

The set of memory access units 3164 is coupled to the memory unit 3170, which includes a data TLB unit 3172 coupled to a data cache unit 3174 coupled to a level 2 (L2) cache unit 3176. In one exemplary embodiment, the memory access units 3164 may include a load unit, a store address unit, and a store data unit, each of which is coupled to the data TLB unit 3172 in the memory unit 3170. The instruction cache unit 3134 is further coupled to a level 2 (L2) cache unit 3176 in the memory unit 3170. The L2 cache unit 3176 is coupled to one or more other levels of cache and eventually to a main memory.

By way of example, the exemplary register renaming, out-of-order issue/execution core architecture may implement the pipeline 3100 as follows: 1) the instruction fetch 3138 performs the fetch and length decoding stages 3102 and 3104; 2) the decode unit 3140 performs the decode stage 3106; 3) the rename/allocator unit 3152 performs the allocation stage 3108 and renaming stage 3110; 4) the scheduler unit(s) 3156 performs the schedule stage 3112; 5) the physical register file(s) unit(s) 3158 and the memory unit 3170 perform the register read/memory read stage 3114; the execution cluster 3160 perform the execute stage 3116; 6) the memory unit 3170 and the physical register file(s) unit(s) 3158 perform the write back/memory write stage 3118; 7) various units may be involved in the exception handling stage 3122; and 8) the retirement unit 3154 and the physical register file(s) unit(s) 3158 perform the commit stage 3124.

The core 3190 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 3190 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 3134/3174 and a shared L2 cache unit 3176, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary in-Order Core Architecture

Figure 32B:
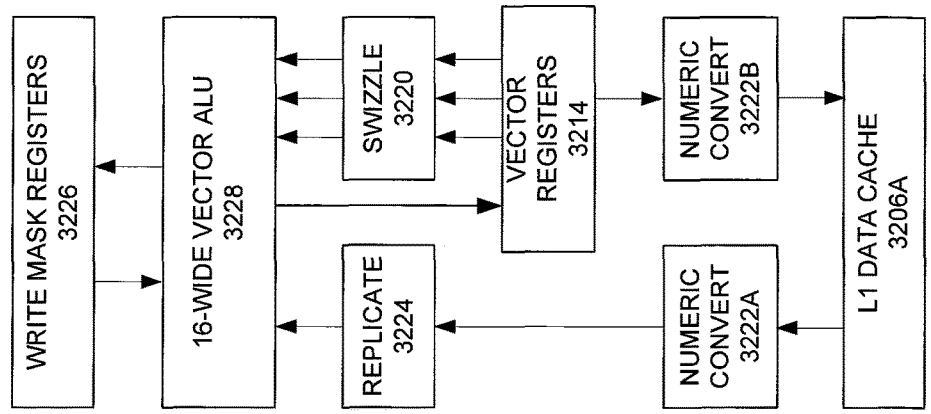
FIGS. 32A-B illustrate a block diagram of a more specific exemplary in-order core architecture, which core would be one of several logic blocks (including other cores of the same type and/or different types) in a chip.
Figure 32A:
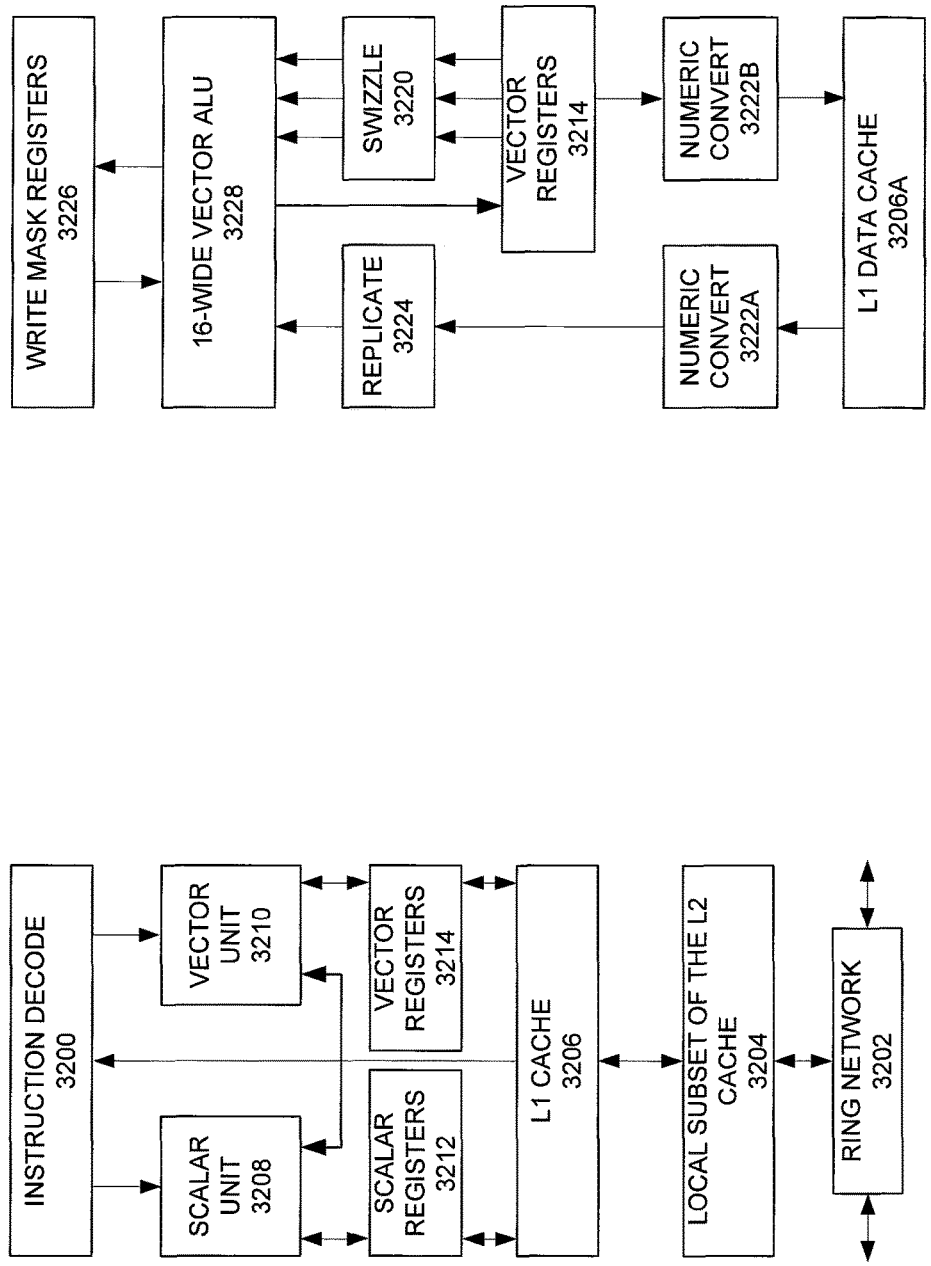

FIGS. 32A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 32A is a block diagram of a single processor core, along with its connection to the on-die interconnect network 3202 and with its local subset of the Level 2 (L2) cache 3204, according to embodiments of the invention. In one embodiment, an instruction decoder 3200 supports the x86 instruction set with a packed data instruction set extension. An L1 cache 3206 allows low-latency accesses to cache memory into the scalar and vector units. While in one embodiment (to simplify the design), a scalar unit 3208 and a vector unit 3210 use separate register sets (respectively, scalar registers 3212 and vector registers 3214) and data transferred between them is written to memory and then read back in from a level 1 (L1) cache 3206, alternative embodiments of the invention may use a different approach (e.g., use a single register set or include a communication path that allow data to be transferred between the two register files without being written and read back).

The local subset of the L2 cache 3204 is part of a global L2 cache that is divided into separate local subsets, one per processor core. Each processor core has a direct access path to its own local subset of the L2 cache 3204. Data read by a processor core is stored in its L2 cache subset 3204 and can be accessed quickly, in parallel with other processor cores accessing their own local L2 cache subsets. Data written by a processor core is stored in its own L2 cache subset 3204 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 32B is an expanded view of part of the processor core in FIG. 32A according to embodiments of the invention. FIG. 32B includes an L1 data cache 3206A part of the L1 cache 3204, as well as more detail regarding the vector unit 3210 and the vector registers 3214. Specifically, the vector unit 3210 is a 16-wide vector processing unit (VPU) (see the 16-wide ALU 3228), which executes one or more of integer, single-precision float, and double-precision float instructions. The VPU supports swizzling the register inputs with swizzle unit 3220, numeric conversion with numeric convert units 3222A-B, and replication with replication unit 3224 on the memory input. Write mask registers 3226 allow predicating resulting vector writes.

Processor with Integrated Memory Controller and Graphics

Figure 33:
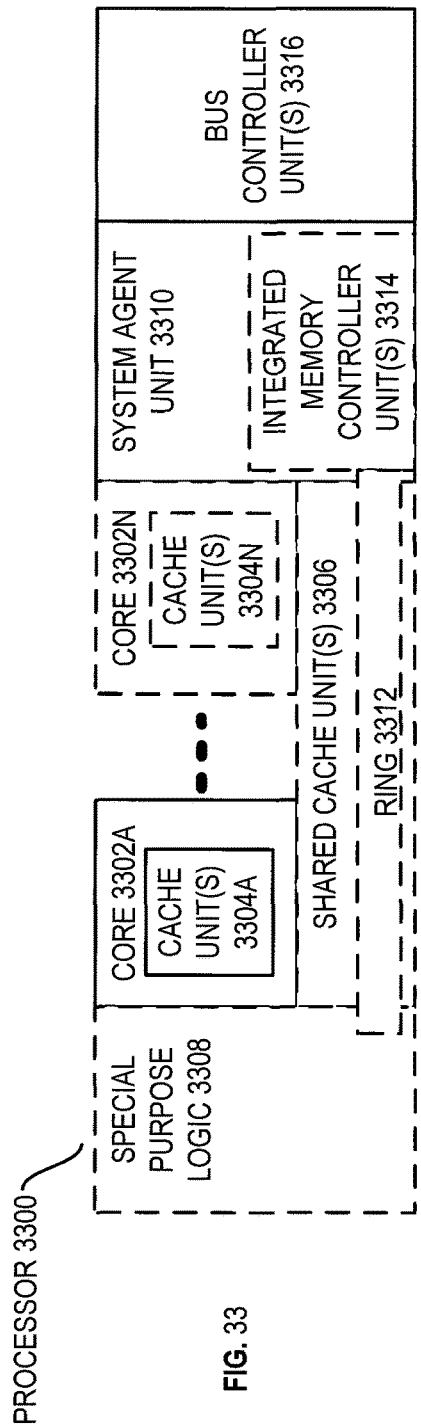
FIG. 33 is a block diagram of a processor that may have more than one core, may have an integrated memory controller, and may have integrated graphics according to embodiments of the invention.

FIG. 33 is a block diagram of a processor 3300 that may have more than one core, may have an integrated memory controller, and may have integrated graphics according to embodiments of the invention. The solid lined boxes in FIG. 33 illustrate a processor 3300 with a single core 3302A, a system agent 3310, a set of one or more bus controller units 3316, while the optional addition of the dashed lined boxes illustrates an alternative processor 3300 with multiple cores 3302A-N, a set of one or more integrated memory controller unit(s) 3314 in the system agent unit 3310, and special purpose logic 3308.

Thus, different implementations of the processor 3300 may include: 1) a CPU with the special purpose logic 3308 being integrated graphics and/or scientific (throughput) logic (which may include one or more cores), and the cores 3302A-N being one or more general purpose cores (e.g., general purpose in-order cores, general purpose out-of-order cores, a combination of the two); 2) a coprocessor with the cores 3302A-N being a large number of special purpose cores intended primarily for graphics and/or scientific (throughput); and 3) a coprocessor with the cores 3302A-N being a large number of general purpose in-order cores. Thus, the processor 3300 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 3300 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 3306, and external memory (not shown) coupled to the set of integrated memory controller units 3314. The set of shared cache units 3306 may include one or more mid-level caches, such as level 2 (L2), level 3 (L3), level 4 (L4), or other levels of cache, a last level cache (LLC), and/or combinations thereof. While in one embodiment a ring based interconnect unit 3312 interconnects the integrated graphics logic 3308, the set of shared cache units 3306, and the system agent unit 3310/integrated memory controller unit(s) 3314, alternative embodiments may use any number of well-known techniques for interconnecting such units. In one embodiment, coherency is maintained between one or more cache units 3306 and cores 3302-A-N.

In some embodiments, one or more of the cores 3302A-N are capable of multi-threading. The system agent 3310 includes those components coordinating and operating cores 3302A-N. The system agent unit 3310 may include for example a power control unit (PCU) and a display unit. The PCU may be or include logic and components needed for regulating the power state of the cores 3302A-N and the integrated graphics logic 3308. The display unit is for driving one or more externally connected displays.

The cores 3302A-N may be homogenous or heterogeneous in terms of architecture instruction set; that is, two or more of the cores 3302A-N may be capable of execution the same instruction set, while others may be capable of executing only a subset of that instruction set or a different instruction set.

Exemplary Computer Architectures

FIGS. 34-37 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 34:
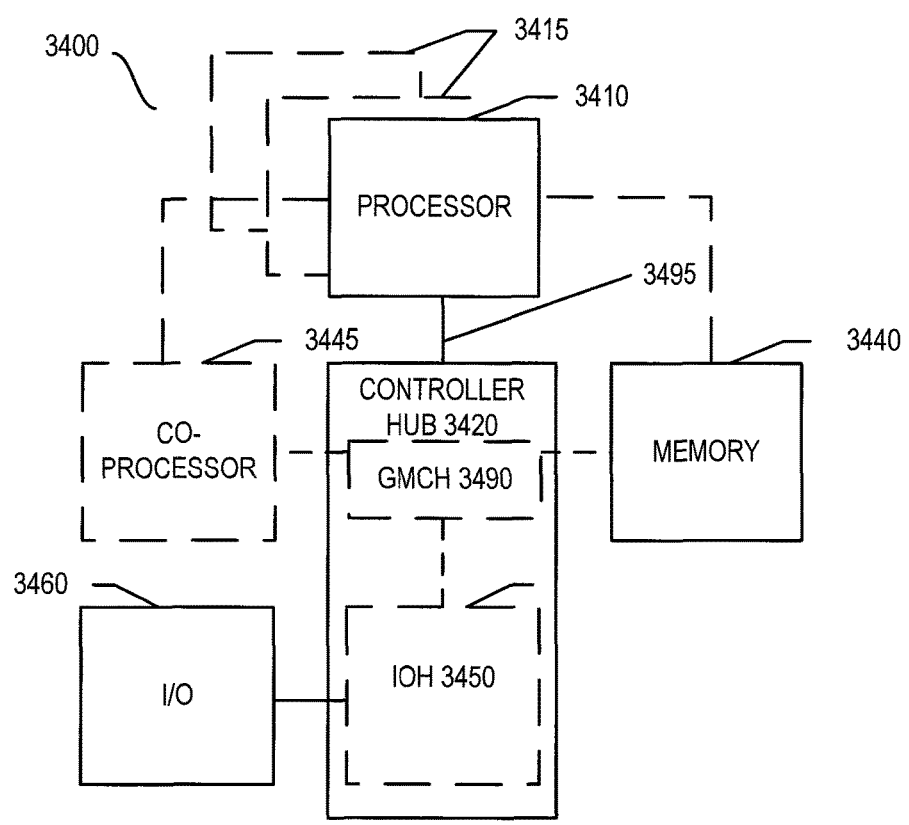
FIG. 34 shows a block diagram of a system in accordance with an embodiment of the present invention.

Referring now to FIG. 34, shown is a block diagram of a system 3400 in accordance with one embodiment of the present invention. The system 3400 may include one or more processors 3410, 3415, which are coupled to a controller hub 3420. In one embodiment the controller hub 3420 includes a graphics memory controller hub (GMCH) 3490 and an Input/Output Hub (IOH) 3450 (which may be on separate chips); the GMCH 3490 includes memory and graphics controllers to which are coupled memory 3440 and a coprocessor 3445; the IOH 3450 is couples input/output (I/O) devices 3460 to the GMCH 3490. Alternatively, one or both of the memory and graphics controllers are integrated within the processor (as described herein), the memory 3440 and the coprocessor 3445 are coupled directly to the processor 3410, and the controller hub 3420 in a single chip with the IOH 3450.

The optional nature of additional processors 3415 is denoted in FIG. 34 with broken lines. Each processor 3410, 3415 may include one or more of the processing cores described herein and may be some version of the processor 3300.

The memory 3440 may be, for example, dynamic random access memory (DRAM), phase change memory (PCM), or a combination of the two. For at least one embodiment, the controller hub 3420 communicates with the processor(s) 3410, 3415 via a multi-drop bus, such as a frontside bus (FSB), point-to-point interface such as QuickPath Interconnect (QPI), or similar connection 3495.

In one embodiment, the coprocessor 3445 is a special-purpose processor, such as, for example, a high-throughput MIC processor, a network or communication processor, compression engine, graphics processor, GPGPU, embedded processor, or the like. In one embodiment, controller hub 3420 may include an integrated graphics accelerator.

There can be a variety of differences between the physical resources 3410, 3415 in terms of a spectrum of metrics of merit including architectural, microarchitectural, thermal, power consumption characteristics, and the like.

In one embodiment, the processor 3410 executes instructions that control data processing operations of a general type. Embedded within the instructions may be coprocessor instructions. The processor 3410 recognizes these coprocessor instructions as being of a type that should be executed by the attached coprocessor 3445. Accordingly, the processor 3410 issues these coprocessor instructions (or control signals representing coprocessor instructions) on a coprocessor bus or other interconnect, to coprocessor 3445. Coprocessor(s) 3445 accept and execute the received coprocessor instructions.

Figure 35:
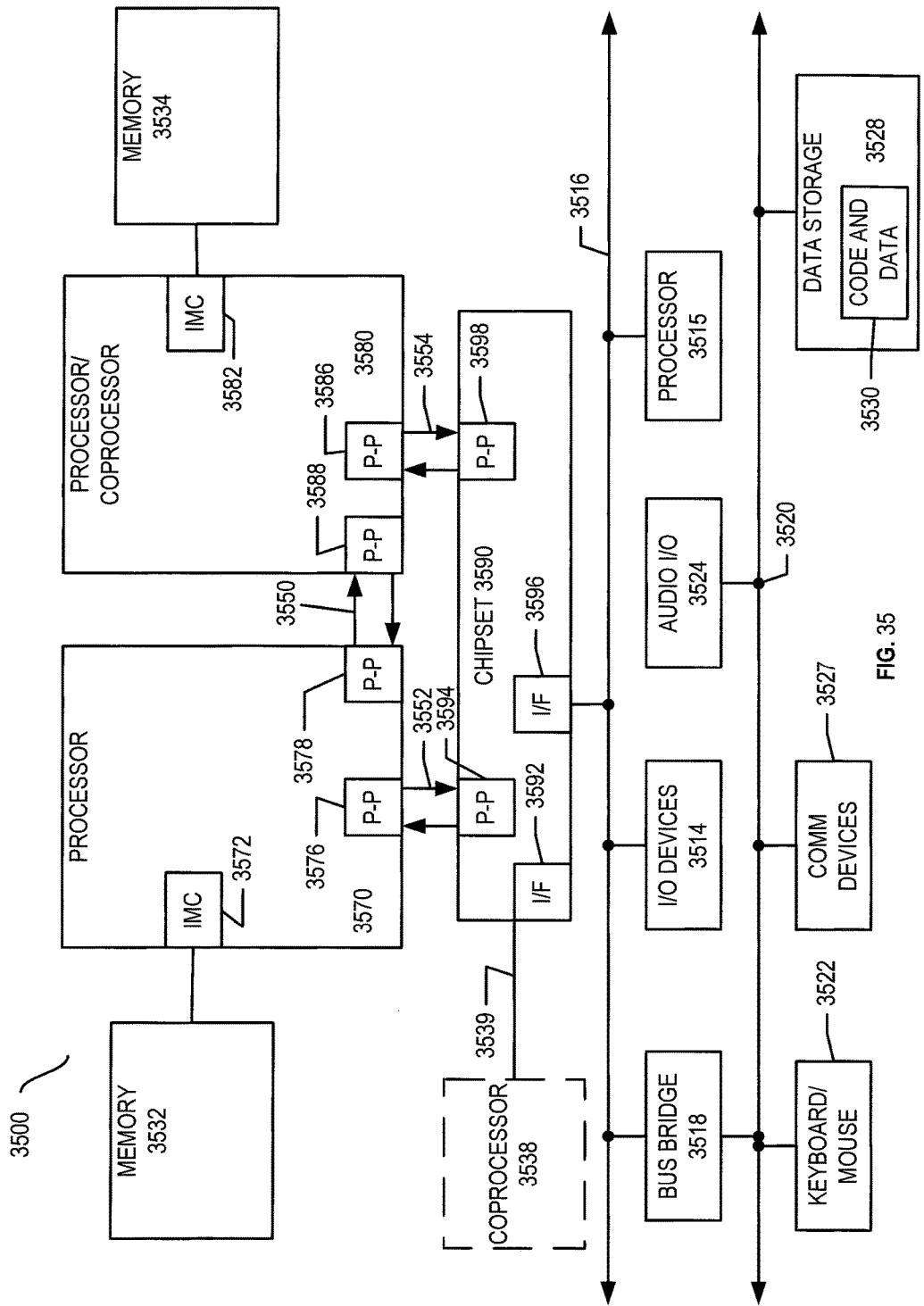
FIG. 35 shows a block diagram of a first more specific exemplary system in accordance with an embodiment of the present invention.

Referring now to FIG. 35, shown is a block diagram of a first more specific exemplary system 3500 in accordance with an embodiment of the present invention. As shown in FIG. 35, multiprocessor system 3500 is a point-to-point interconnect system, and includes a first processor 3570 and a second processor 3580 coupled via a point-to-point interconnect 3550. Each of processors 3570 and 3580 may be some version of the processor 3300. In one embodiment of the invention, processors 3570 and 3580 are respectively processors 3410 and 3415, while coprocessor 3538 is coprocessor 3445. In another embodiment, processors 3570 and 3580 are respectively processor 3410 coprocessor 3445.

Processors 3570 and 3580 are shown including integrated memory controller (IMC) units 3572 and 3582, respectively. Processor 3570 also includes as part of its bus controller units point-to-point (P-P) interfaces 3576 and 3578; similarly, second processor 3580 includes P-P interfaces 3586 and 3588. Processors 3570, 3580 may exchange information via a point-to-point (P-P) interface 3550 using P-P interface circuits 3578, 3588. As shown in FIG. 35, IMCs 3572 and 3582 couple the processors to respective memories, namely a memory 3532 and a memory 3534, which may be portions of main memory locally attached to the respective processors.

Processors 3570, 3580 may each exchange information with a chipset 3590 via individual P-P interfaces 3552, 3554 using point to point interface circuits 3576, 3594, 3586, 3598. Chipset 3590 may optionally exchange information with the coprocessor 3538 via a high-performance interface 3539. In one embodiment, the coprocessor 3538 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 3590 may be coupled to a first bus 3516 via an interface 3596. In one embodiment, first bus 3516 may be a Peripheral Component Interconnect (PCI) bus, or a bus such as a PCI Express bus or another third generation I/O interconnect bus, although the scope of the present invention is not so limited.

As shown in FIG. 35, various I/O devices 3514 may be coupled to first bus 3516, along with a bus bridge 3518 which couples first bus 3516 to a second bus 3520. In one embodiment, one or more additional processor(s) 3515, such as coprocessors, high-throughput MIC processors, GPGPU's, accelerators (such as, e.g., graphics accelerators or digital signal processing (DSP) units), field programmable gate arrays, or any other processor, are coupled to first bus 3516. In one embodiment, second bus 3520 may be a low pin count (LPC) bus. Various devices may be coupled to a second bus 3520 including, for example, a keyboard and/or mouse 3522, communication devices 3527 and a storage unit 3528 such as a disk drive or other mass storage device which may include instructions/code and data 3530, in one embodiment. Further, an audio I/O 3524 may be coupled to the second bus 3520. Note that other architectures are possible. For example, instead of the point-to-point architecture of FIG. 35, a system may implement a multi-drop bus or other such architecture.

Figure 36:
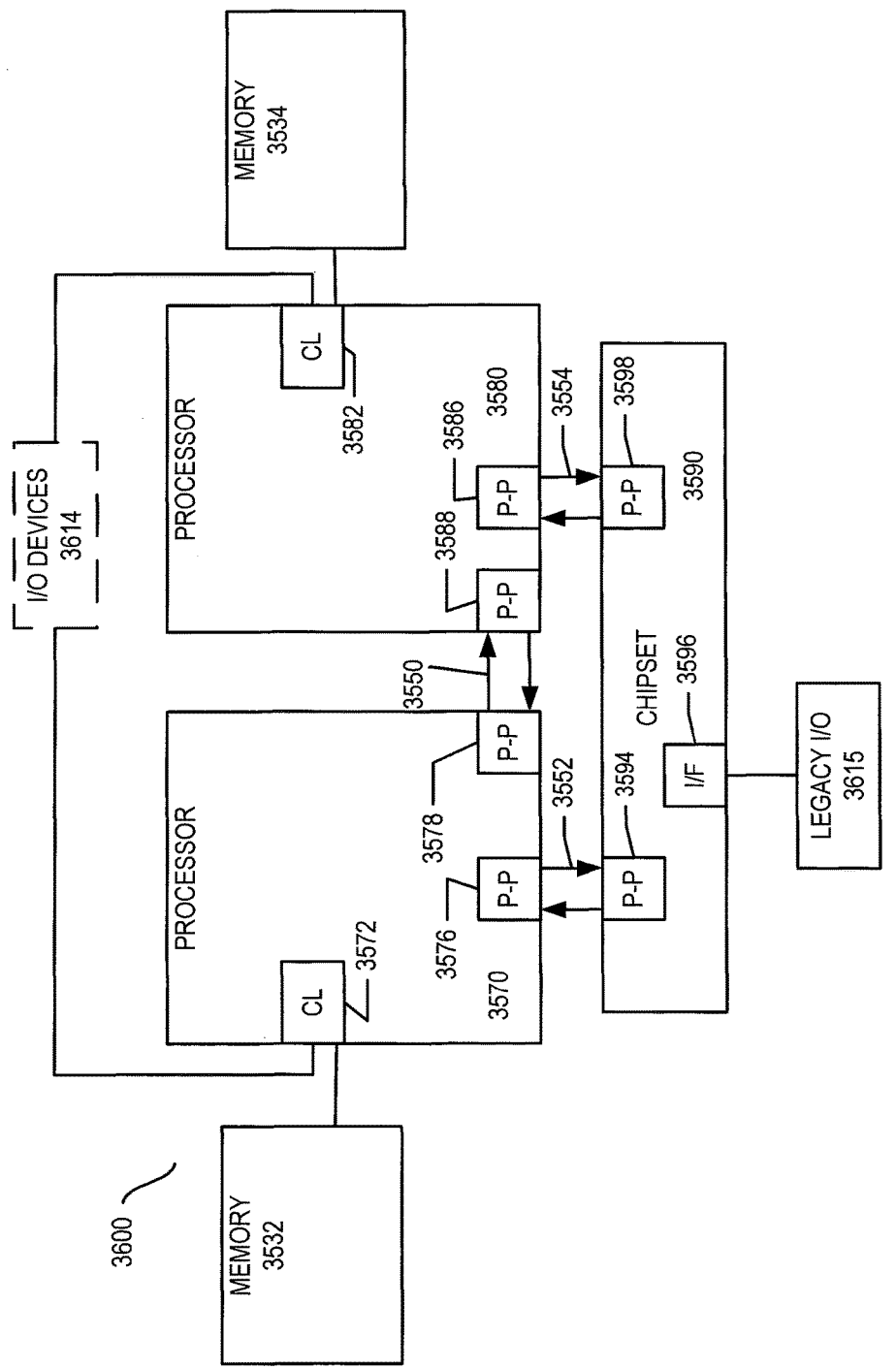
FIG. 36 shows block diagram of a second more specific exemplary system in accordance with an embodiment of the present invention.

Referring now to FIG. 36, shown is a block diagram of a second more specific exemplary system 3600 in accordance with an embodiment of the present invention. Like elements in FIGS. 35 and 36 bear like reference numerals, and certain aspects of FIG. 35 have been omitted from FIG. 36 in order to avoid obscuring other aspects of FIG. 36.

FIG. 36 illustrates that the processors 3570, 3580 may include integrated memory and I/O control logic ("CL") 3572 and 3582, respectively. Thus, the CL 3572, 3582 include integrated memory controller units and include I/O control logic. FIG. 36 illustrates that not only are the memories 3532, 3534 coupled to the CL 3572, 3582, but also that I/O devices 3614 are also coupled to the control logic 3572, 3582. Legacy I/O devices 3615 are coupled to the chipset 3590.

Figure 37:
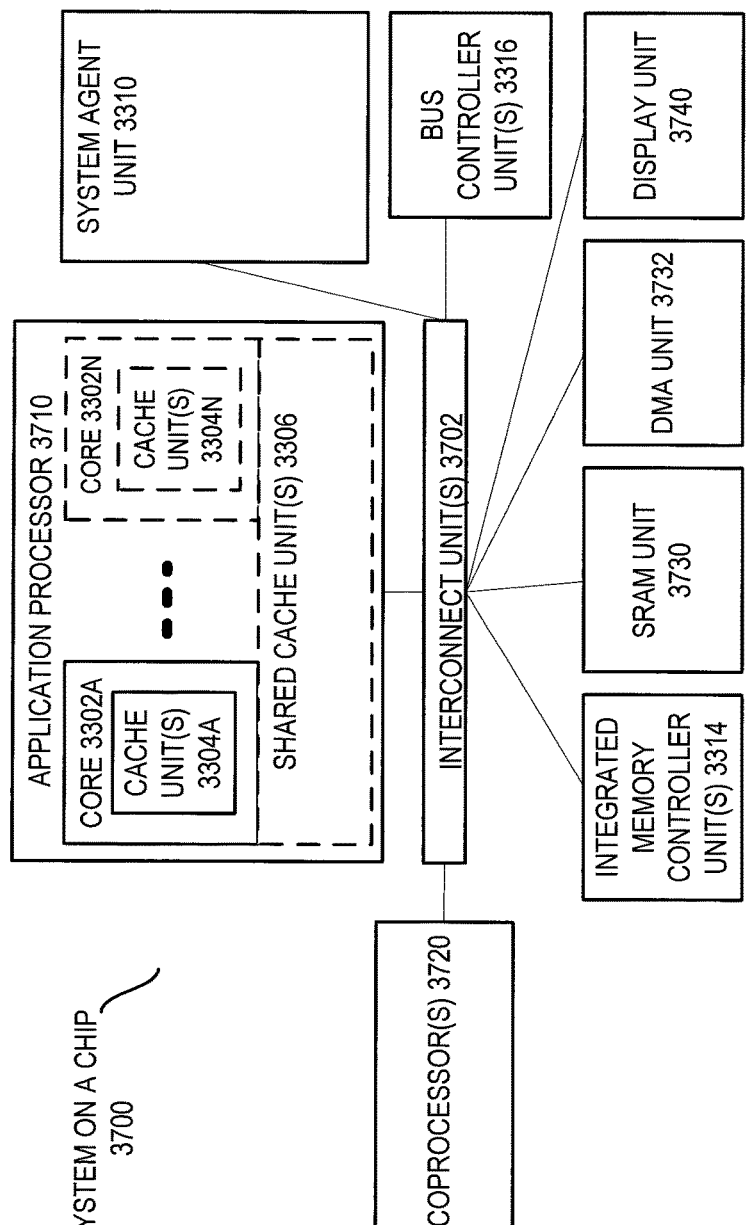
FIG. 37 shows a block diagram of a SoC in accordance with an embodiment of the present invention.

Referring now to FIG. 37, shown is a block diagram of a SoC 3700 in accordance with an embodiment of the present invention. Similar elements in FIG. 33 bear like reference numerals. Also, dashed lined boxes are optional features on more advanced SoCs. In FIG. 37, an interconnect unit(s) 3702 is coupled to: an application processor 3710 which includes a set of one or more cores 202A-N and shared cache unit(s) 3306; a system agent unit 3310; a bus controller unit(s) 3316; an integrated memory controller unit(s) 3314; a set or one or more coprocessors 3720 which may include integrated graphics logic, an image processor, an audio processor, and a video processor; an static random access memory (SRAM) unit 3730; a direct memory access (DMA) unit 3732; and a display unit 3740 for coupling to one or more external displays. In one embodiment, the coprocessor(s) 3720 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 3530 illustrated in FIG. 35, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (including binary translation, code morphing, etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 38 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 38 shows a program in a high level language 3802 may be compiled using an x86 compiler 3804 to generate x86 binary code 3806 that may be natively executed by a processor with at least one x86 instruction set core 3816. The processor with at least one x86 instruction set core 3816 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 3804 represents a compiler that is operable to generate x86 binary code 3806 (e.g., object code) that can, with or without additional linkage processing, be executed on the processor with at least one x86 instruction set core 3816. Similarly, FIG. 38 shows the program in the high level language 3802 may be compiled using an alternative instruction set compiler 3808 to generate alternative instruction set binary code 3810 that may be natively executed by a processor without at least one x86 instruction set core 3814 (e.g., a processor with cores that execute the MIPS instruction set of MIPS Technologies of Sunnyvale, Calif. and/or that execute the ARM instruction set of ARM Holdings of Sunnyvale, Calif.). The instruction converter 3812 is used to convert the x86 binary code 3806 into code that may be natively executed by the processor without an x86 instruction set core 3814. This converted code is not likely to be the same as the alternative instruction set binary code 3810 because an instruction converter capable of this is difficult to make; however, the converted code will accomplish the general operation and be made up of instructions from the alternative instruction set. Thus, the instruction converter 3812 represents software, firmware, hardware, or a combination thereof that, through emulation, simulation or any other process, allows a processor or other electronic device that does not have an x86 instruction set processor or core to execute the x86 binary code 3806.

We claim:

1. An apparatus comprising:
a hardware decoder to decode an instruction, the instruction to include an opcode to indicate execution hardware is to initiate a data speculative extension (DSX) region and a field to indicate a location of an operand to store a portion of a fallback address; and
execution hardware to execute the decoded instruction to initiate the DSX region by activating DSX tracking hardware to track speculative memory accesses and detect ordering violations in the DSX region, and storing the fallback address which is where program execution is to go to handle a mis-speculation, wherein in a DSX region stores are buffered and loads are not.

2. The apparatus of claim 1, wherein the portion of the fallback address is a displacement value to be added to an instruction pointer of an instruction immediately following the decoded instruction by the execution hardware.

3. The apparatus of claim 1, wherein the portion of the fallback address is a complete address.

4. The apparatus of claim 1, wherein the operand to store a portion of the fallback address is an immediate value.

5. The apparatus of claim 1, wherein the operand to store a portion of the fallback address is a register.

6. The apparatus of claim 1, wherein the execution hardware to further to determine that a restricted transactional memory (RTM) transaction is occurring and process the RTM transaction.

7. The apparatus of claim 1, further comprising:
a DSX nesting counter to store a value corresponding to a number of DSX region starts with no corresponding DSX region ends, wherein the execution hardware is additionally to increment the DSX nesting counter in response to the decoded instruction.

8. The apparatus of claim 1, wherein the instruction is to include implicit operands for a DSX status register and a restricted transactional memory status register.

9. A method comprising:
   decoding an instruction using a hardware decoder, the instruction to include an opcode to indicate execution hardware is to initiate a data speculative extension (DSX) region and a field to indicate a location of an operand to store a portion of a fallback address; and
   executing the decoded instruction to initiate the DSX region by activating DSX tracking hardware to track speculative memory accesses and detect ordering violations in the DSX region, and storing the fallback address which is where program execution is to go to handle a mis-speculation, wherein in a DSX region stores are buffered and loads are not.

10. The method of claim 9, wherein the portion of the fallback address is a displacement value to be added to an instruction pointer of an instruction immediately following the decoded instruction by the execution hardware.

11. The method of claim 9, wherein the portion of the fallback address is a complete address.

12. The method of claim 9, wherein the operand to store a portion of the fallback address is an immediate value.

13. The method of claim 9, wherein the operand to store a portion of the fallback address is a register.

14. The method of claim 9, wherein the executing further comprise:
   determining that a restricted transactional memory (RTM) transaction is occurring and process the RTM transaction.

15. The method of claim 9, further comprising:
   storing a value corresponding to a number of DSX region starts with no corresponding DSX region ends.

16. A non-transitory machine readable medium storing instructions which when executed by a machine cause circuitry to be fabricated, the circuitry comprising:
   a hardware decoder to decode an instruction, the instruction to include an opcode to indicate execution hardware is to initiate a data speculative extension (DSX) region and a field to indicate a location of an operand to store a portion of a fallback address; and
   execution hardware to execute the decoded instruction to initiate the DSX region by activating DSX tracking hardware to track speculative memory accesses and detect ordering violations in the DSX region, and storing the fallback address which is where program execution is to go to handle a mis-speculation, wherein in a DSX region stores are buffered and loads are not.

17. The non-transitory machine readable medium of claim 16, wherein the portion of the fallback address is a displacement value to be added to an instruction pointer of an instruction immediately following the decoded instruction by the execution hardware.

18. The non-transitory machine readable medium of claim 16, wherein the portion of the fallback address is a complete address.

19. The non-transitory machine readable medium of claim 16, wherein the operand to store a portion of the fallback address is an immediate value.

* * * * *